(12) United States Patent
Syracuse et al.

(10) Patent No.: US 10,391,867 B1
(45) Date of Patent: *Aug. 27, 2019

(54) APPARATUS HAVING ELECTRIC-FIELD ACTUATED GENERATOR FOR POWERING ELECTRICAL LOAD WITHIN VICINITY OF POWERLINES

(71) Applicant: NXP AERONAUTICS RESEARCH, LLC, Parker, CO (US)

(72) Inventors: Steven J. Syracuse, Parker, CO (US); Chad D. Tillman, Matthews, NC (US)

(73) Assignee: NXP AERONAUTICS RESEARCH, LLC, Parker, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/164,626

(22) Filed: Oct. 18, 2018

Related U.S. Application Data

(63) Continuation of application No. 16/162,681, filed on Oct. 17, 2018, which is a continuation-in-part of
(Continued)

(51) Int. Cl.
*H02J 50/05* (2016.01)
*H02J 50/00* (2016.01)
(Continued)

(52) U.S. Cl.
CPC .............. *B60L 5/005* (2013.01); *B64C 39/04* (2013.01); *B64C 39/08* (2013.01); *H02J 50/00* (2016.02);
(Continued)

(58) Field of Classification Search
CPC .................................. H02J 50/00; H02J 50/05
See application file for complete search history.

(56) References Cited

U.S. PATENT DOCUMENTS

| 3,834,654 A | 9/1974 | Miranda |
| 4,146,199 A | 3/1979 | Wenzel |

(Continued)

FOREIGN PATENT DOCUMENTS

| CN | 106248022 A | 12/2016 |
| EP | 2 530 813 A1 | 5/2012 |

(Continued)

OTHER PUBLICATIONS

Lienhard, John H., "No. 2518 Annular Wings", Engines of Our Ingenuity, <https://www.uh.edu/engines/epi2518.htm>, accessed Sep. 27, 2017 (3 pages).

(Continued)

*Primary Examiner* — Fritz M Fleming
(74) *Attorney, Agent, or Firm* — Chad D Tillman; Jeremy C Doerre; Tillman Wright, PLLC

(57) ABSTRACT

An apparatus in which electric power is generated for an electrical load from differentials in electric field strengths within a vicinity of powerlines includes: a plurality of electrodes separated and electrically insulated from one another for enabling differentials in voltage resulting from differentials in electric field strength experienced there at; and electrical components electrically connected therewith and configurable to establish one or more electric circuits whereby voltage differentials cause a current to flow through the established electric circuit for powering the electrical load. Preferably, the apparatus includes a control assembly having one or more voltage-detector components configured to detect relative voltages of the electrodes; and a processor enabled to configure—based on the detected voltages and based on voltage and electric current specifications for powering the electrical load—one or more of the electrical components to establish an electric circuit for powering the electrical load.

20 Claims, 46 Drawing Sheets

Related U.S. Application Data application No. 16/136,226, filed on Sep. 19, 2018, which is a continuation-in-part of application No. 16/134,909, filed on Sep. 18, 2018.

(60) Provisional application No. 62/682,841, filed on Jun. 9, 2018, provisional application No. 62/682,842, filed on Jun. 9, 2018, provisional application No. 62/682,843, filed on Jun. 9, 2018, provisional application No. 62/682,845, filed on Jun. 9, 2018, provisional application No. 62/682,846, filed on Jun. 9, 2018, provisional application No. 62/682,931, filed on Jun. 9, 2018.

(51) Int. Cl.
  *B60L 5/00* (2006.01)
  *B64C 39/08* (2006.01)
  *B64C 39/04* (2006.01)

(52) U.S. Cl.
  CPC ........ *H02J 50/05* (2016.02); *B64C 2201/042* (2013.01); *B64C 2201/066* (2013.01); *B64C 2201/108* (2013.01)

(56) References Cited

U.S. PATENT DOCUMENTS

| | | |
|---|---|---|
| 4,165,058 A | 8/1979 | Whitener |
| 4,390,150 A | 6/1983 | Whitener |
| 4,415,133 A | 11/1983 | Phillips |
| 4,818,990 A | 4/1989 | Fernandes |
| 5,473,233 A | 12/1995 | Stull et al. |
| 5,503,352 A | 4/1996 | Eger |
| 5,669,470 A | 9/1997 | Ross |
| 5,808,424 A | 9/1998 | Osgood |
| 6,028,973 A | 2/2000 | Schienle et al. |
| 6,421,600 B1 | 7/2002 | Ross |
| 6,431,499 B1 | 8/2002 | La Roche et al. |
| 6,470,283 B1 | 10/2002 | Edel |
| 6,626,398 B1 | 9/2003 | Cox et al. |
| 6,848,649 B2 | 2/2005 | Churchman |
| 6,879,889 B2 | 4/2005 | Ross |
| 6,900,642 B2 | 5/2005 | Zank et al. |
| 6,922,059 B2 | 7/2005 | Zank et al. |
| 6,974,106 B2 | 12/2005 | Churchman |
| 6,974,110 B2 | 12/2005 | Grandics |
| 7,282,944 B2 | 10/2007 | Gunn et al. |
| 7,286,912 B2 | 10/2007 | Rubin et al. |
| 7,318,564 B1 | 1/2008 | Marshall |
| 7,398,946 B1 | 7/2008 | Marshall |
| 7,543,780 B1 | 6/2009 | Marshall et al. |
| 7,714,536 B1 | 5/2010 | Silberg et al. |
| 7,786,894 B2 | 8/2010 | Polk et al. |
| 7,872,371 B2 | 1/2011 | Varley et al. |
| 7,920,975 B2 | 4/2011 | Hull et al. |
| 8,123,160 B2 | 2/2012 | Shepshelovich et al. |
| 8,497,781 B2 | 7/2013 | Engelhardt et al. |
| 8,508,186 B2 | 8/2013 | Morita et al. |
| 8,511,606 B1 | 8/2013 | Lutke et al. |
| 8,537,571 B2 | 9/2013 | Terasaki et al. |
| 8,767,071 B1 | 7/2014 | Marshall |
| 8,941,491 B2 | 1/2015 | Polk et al. |
| 9,037,314 B2 | 5/2015 | Waite et al. |
| 9,120,568 B2 | 9/2015 | Herman et al. |
| 9,209,525 B2 | 12/2015 | Schantz et al. |
| 9,214,827 B2 | 12/2015 | Phillips et al. |
| 9,285,222 B2 | 3/2016 | Waite et al. |
| 9,398,352 B2 | 7/2016 | Polk et al. |
| 9,421,869 B1 | 8/2016 | Ananthanarayanan et al. |
| 9,494,937 B2 | 11/2016 | Siegel et al. |
| 9,508,264 B2 | 11/2016 | Chan et al. |
| 9,564,268 B2 | 2/2017 | Dinwiddie et al. |
| 9,653,948 B2 | 5/2017 | Polu et al. |
| 9,694,685 B2 | 7/2017 | Ricci |
| 9,723,468 B2 | 8/2017 | Cho |
| 9,754,496 B2 | 9/2017 | Chan et al. |
| 9,846,153 B2 | 12/2017 | Sekelsky |
| 9,878,787 B2 | 1/2018 | Chan et al. |
| 2001/0032905 A1 | 10/2001 | Grandics |
| 2005/0178632 A1 | 8/2005 | Ross |
| 2006/0009887 A1 | 1/2006 | Rubin et al. |
| 2008/0246507 A1* | 10/2008 | Gunn ............... H02G 7/00 324/764.01 |
| 2010/0033345 A1 | 2/2010 | Polk et al. |
| 2010/0231056 A1 | 9/2010 | Varley et al. |
| 2010/0292859 A1 | 11/2010 | Terasaki et al. |
| 2010/0317978 A1 | 12/2010 | Maile |
| 2011/0028877 A1 | 11/2011 | Gupta |
| 2013/0077368 A1* | 3/2013 | Kovacich ............ H02J 50/05 363/126 |
| 2013/0147427 A1 | 6/2013 | Polu et al. |
| 2014/0253031 A1 | 9/2014 | Duge |
| 2015/0226559 A1 | 8/2015 | Waite et al. |
| 2015/0274294 A1 | 10/2015 | Dahlstrom |
| 2015/0353196 A1* | 12/2015 | van Cruyningen ... B64C 39/024 701/2 |
| 2015/0370251 A1 | 12/2015 | Siegel et al. |
| 2016/0091537 A1 | 3/2016 | Gaarder |
| 2016/0117929 A1 | 4/2016 | Chan et al. |
| 2016/0117933 A1 | 4/2016 | Chan et al. |
| 2016/0159471 A1 | 6/2016 | Chan et al. |
| 2016/0159472 A1 | 6/2016 | Chan et al. |
| 2016/0214714 A1 | 7/2016 | Sekelsky |
| 2016/0216304 A1 | 7/2016 | Sekelsky |
| 2016/0272310 A1 | 9/2016 | Chan et al. |
| 2016/0304199 A1 | 10/2016 | Chan et al. |
| 2016/0315504 A1 | 10/2016 | Ichikawa |
| 2017/0015414 A1 | 1/2017 | Chan et al. |
| 2017/0015415 A1* | 1/2017 | Chan ................ B64C 39/024 |
| 2017/0110015 A1 | 4/2017 | Sekelsky |
| 2017/0136880 A1 | 5/2017 | Ricci |
| 2017/0136881 A1 | 5/2017 | Ricci |
| 2017/0136882 A1 | 5/2017 | Ricci |
| 2017/0136883 A1 | 5/2017 | Ricci |
| 2017/0136885 A1 | 5/2017 | Ricci |
| 2017/0136887 A1 | 5/2017 | Ricci |
| 2017/0136888 A1 | 5/2017 | Ricci |
| 2017/0136889 A1 | 5/2017 | Ricci |
| 2017/0136890 A1 | 5/2017 | Ricci |
| 2017/0136891 A1 | 5/2017 | Ricci |
| 2017/0136892 A1 | 5/2017 | Ricci |
| 2017/0136893 A1 | 5/2017 | Ricci |
| 2017/0136894 A1 | 5/2017 | Ricci |
| 2017/0136895 A1 | 5/2017 | Ricci |
| 2017/0136896 A1 | 5/2017 | Ricci |
| 2017/0136897 A1 | 5/2017 | Ricci |
| 2017/0136902 A1 | 5/2017 | Ricci |
| 2017/0136903 A1 | 5/2017 | Ricci |
| 2017/0136904 A1 | 5/2017 | Ricci |
| 2017/0136905 A1 | 5/2017 | Ricci |
| 2017/0136907 A1 | 5/2017 | Ricci |
| 2017/0136908 A1 | 5/2017 | Ricci |
| 2017/0136910 A1 | 5/2017 | Ricci |
| 2017/0136911 A1 | 5/2017 | Ricci |
| 2017/0136912 A1 | 5/2017 | Ricci |
| 2017/0138758 A1 | 5/2017 | Ricci |
| 2017/0140349 A1 | 5/2017 | Ricci |
| 2017/0140603 A1 | 5/2017 | Ricci |
| 2017/0141368 A1 | 5/2017 | Ricci |
| 2017/0142872 A1 | 5/2017 | Ricci |
| 2017/0174205 A1 | 6/2017 | Ricci |
| 2017/0207665 A1 | 7/2017 | Polu et al. |
| 2018/0095468 A1* | 4/2018 | Yang ................ H02J 50/05 |
| 2018/0149491 A1 | 5/2018 | Tamaya |

FOREIGN PATENT DOCUMENTS

| | | |
|---|---|---|
| WO | 9530557 A1 | 11/1995 |
| WO | 0149084 A2 | 7/2001 |
| WO | 03027683 A2 | 4/2003 |
| WO | 03050547 A2 | 6/2003 |
| WO | 2005013650 A2 | 2/2005 |
| WO | 200047384 A2 | 5/2006 |

(56) References Cited

FOREIGN PATENT DOCUMENTS

| WO | 2006083408 A1 | 8/2006 |
| --- | --- | --- |
| WO | 2007149668 A3 | 12/2007 |
| WO | 2010026622 A1 | 3/2010 |
| WO | 2010150318 A1 | 12/2010 |
| WO | 2011156426 A3 | 12/2011 |
| WO | 2011163143 A1 | 12/2011 |
| WO | 2013126702 A1 | 8/2013 |
| WO | 2015191486 A1 | 12/2015 |
| WO | 2016089882 A1 | 6/2016 |
| WO | 2016122965 A1 | 8/2016 |
| WO | 2016122966 A1 | 8/2016 |
| WO | 2016190909 A3 | 12/2016 |
| WO | 2017011739 A1 | 1/2017 |
| WO | 2017083685 A1 | 5/2017 |
| WO | 2017083846 A1 | 5/2017 |
| WO | 2017083847 A1 | 5/2017 |
| WO | 2017083848 A1 | 5/2017 |
| WO | 2017083851 A1 | 5/2017 |

OTHER PUBLICATIONS

Leid, Fraser, "Drones, Reimagined", article in Drone Magazine <www.dronemagazine.uk>, Dec. 22, 2015 (2 pages).

Vlemincq, Louis, "Implement a Spark-Gap-Based Design for Low-Cost Energy Harvesting", Electronic Design, Jul. 22, 2009, <http://www.electronicdesign.com/print/52523>, accessed Dec. 5, 2017 (5 pages).

Chang, Keunsu et al., "Electric Field Energy Harvesting Powered Wireless Sensors for Smart Grid". Journal of Electrical Engineering & Technology vol. 7, No. 1, pp. 75-80 <http://dx.doi.org/10.5370/JEET.2012.7.1.75>, 2012 (6 pages).

Li, Hongwei, "Energy Harvesting Device Based on Spatial Electric Field in Substation", Telkomnika, Indonesian Journal of Electrical Engineering, vol. 12, No. 6, pp. 4771-4777 DOI: 10.11591/telkomnika.v12i6.5521, Jun. 2014 (7 pages).

Atherton, Kelsey D., "Tech Inspired by Nikola Tesla Charges Drones in Mid-Air", Popular Science, <https://www.popsci.com/nikola-tesla-inspired-tech-powers-drone-in-mid-air-using>, Oct. 21, 2016 (2 pages).

Guerra, Juan Carlos Rodriguez, "Electric Field Energy Harvesting From Medium Voltage Power Lines", School of Engineering, College of Science, Engineering and Health, RMIT University Australia, Feb. 2017 (208 pages).

Rodriguez, Juan Carlos et al., "Energy Harvesting From Medium Voltage Electric Fields Using Pulsed Flyback Conversion", published in Power Electronics and Motion Control Conference (IPEMC-ECCE Asia), 2016 IEEE 8th International, <ieeexplore.ieee.org/abstract/document/7512871/?relaod=true>, Jul. 14, 2016 (1page).

* cited by examiner

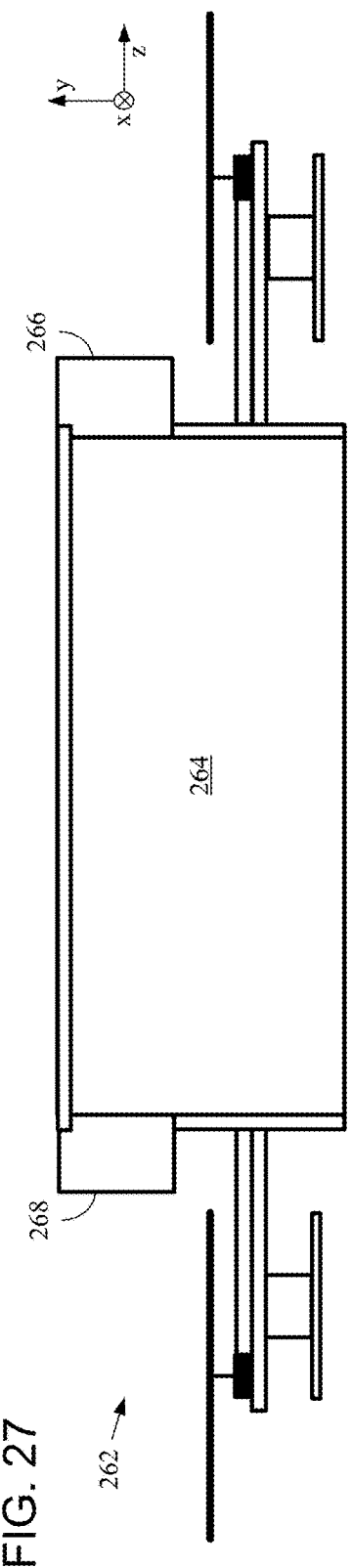
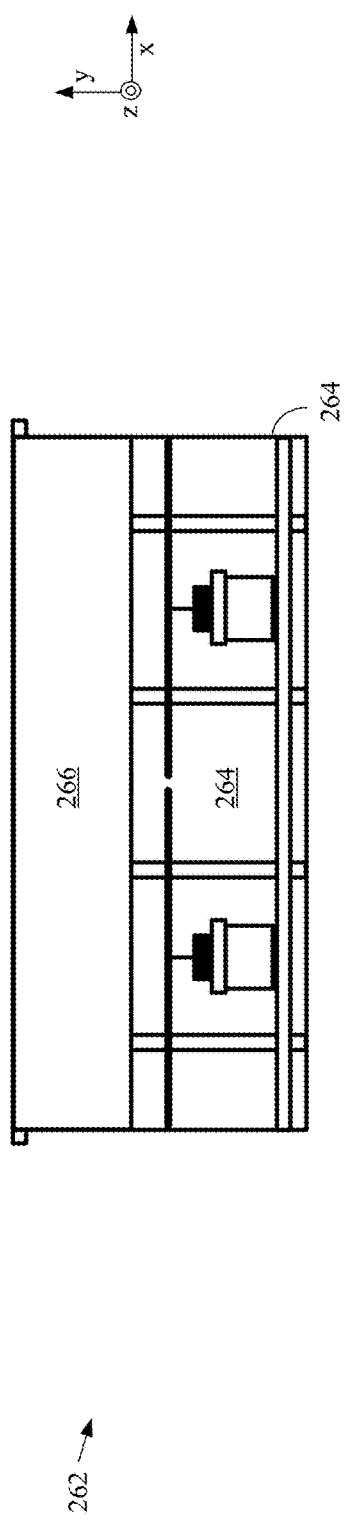

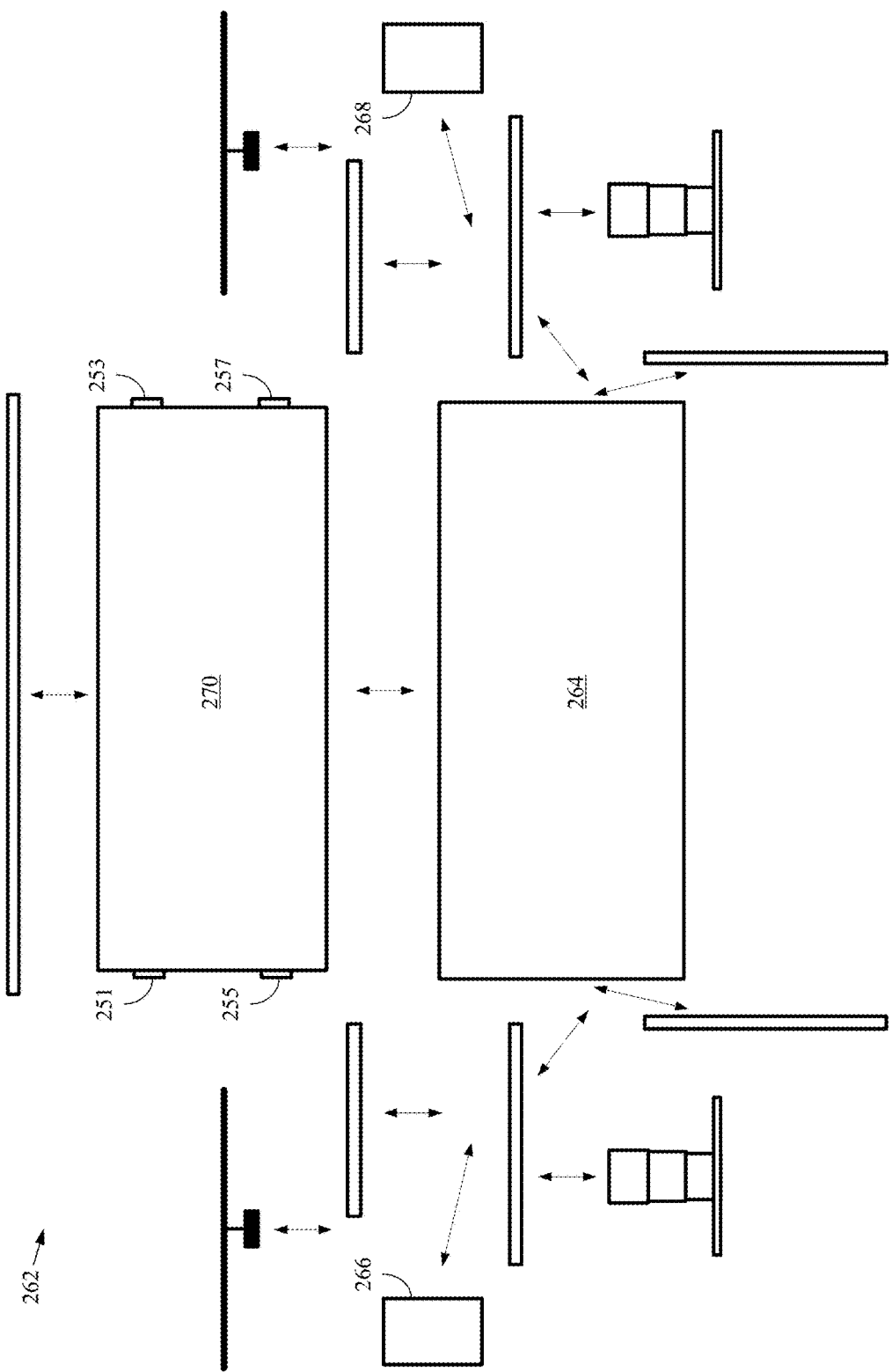

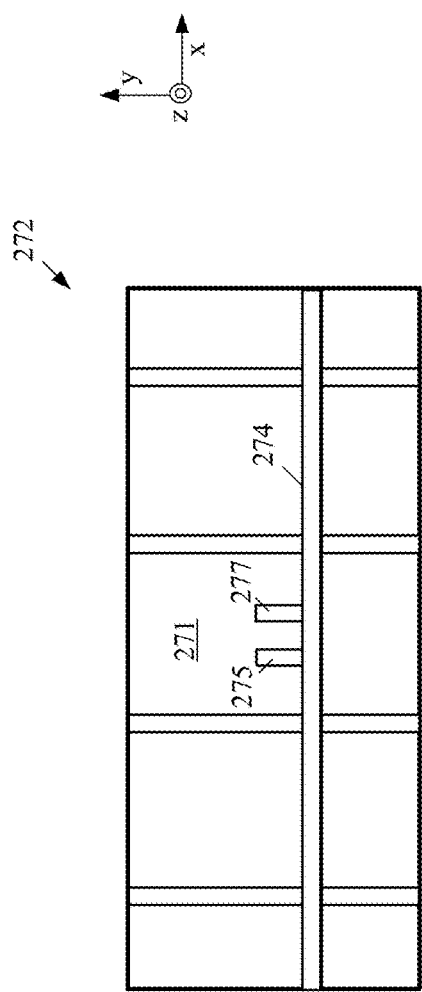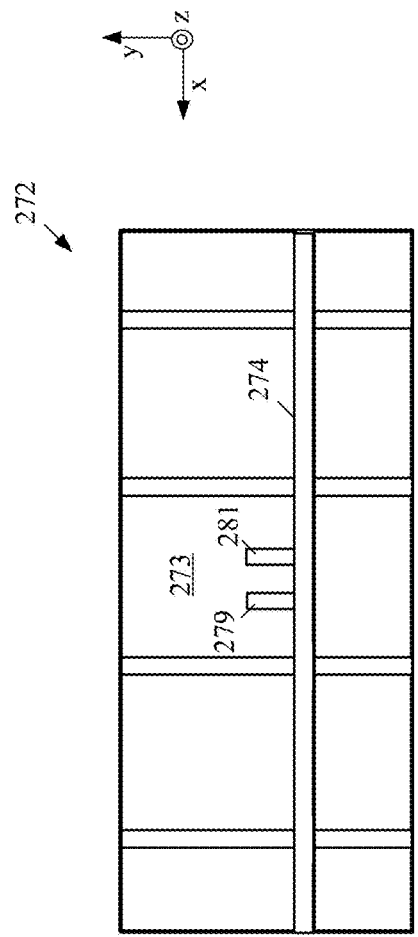
FIG. 30
FIG. 31

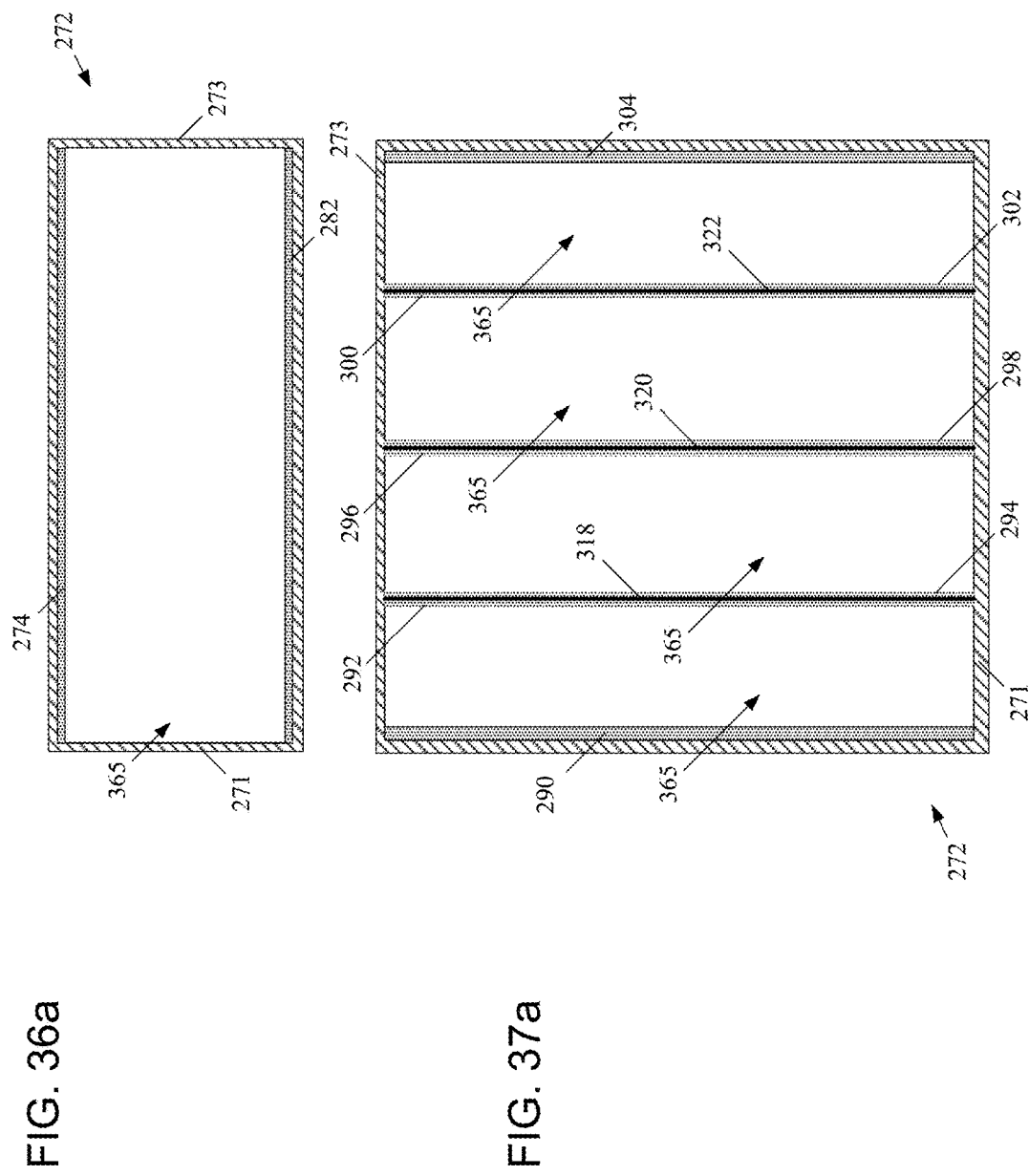

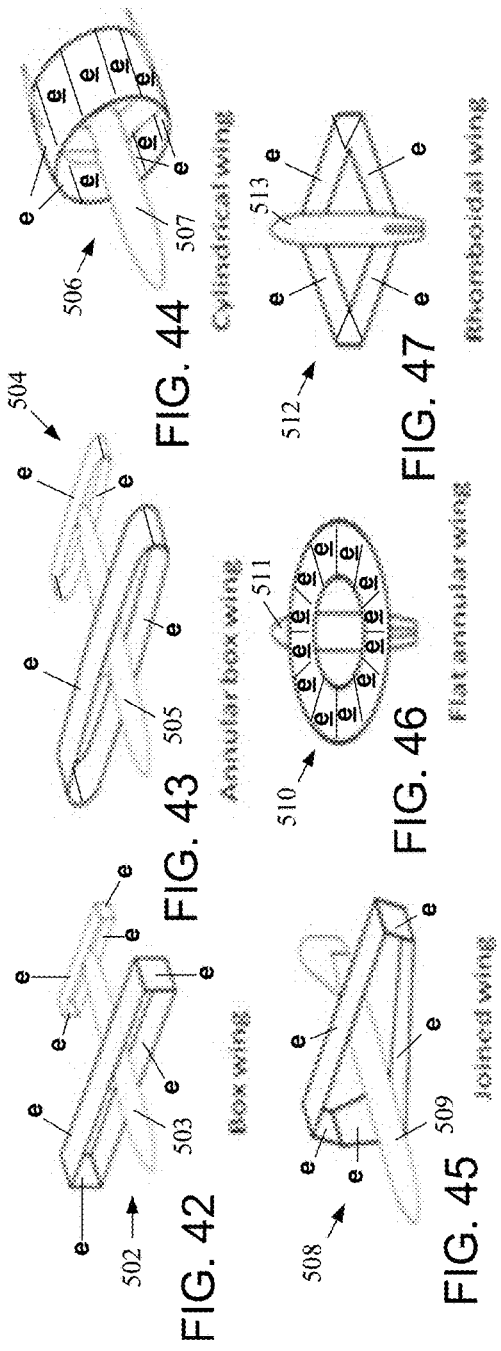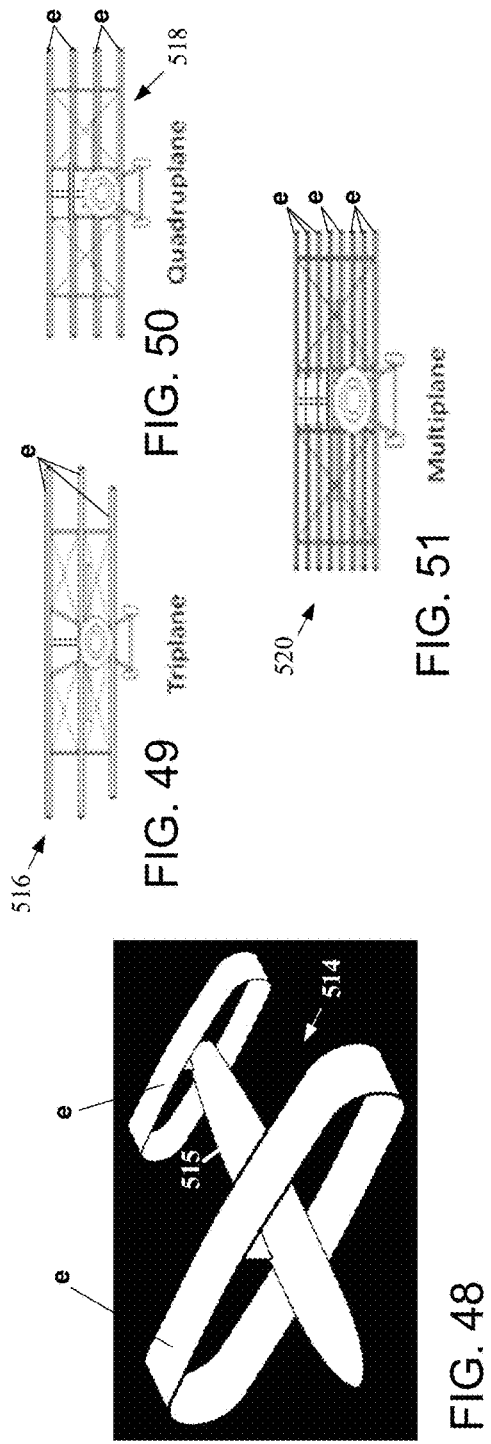

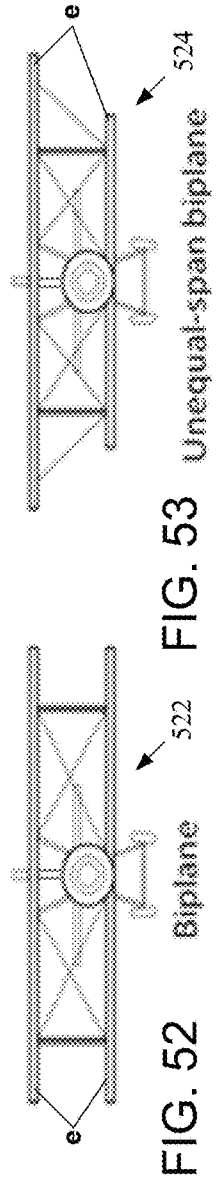
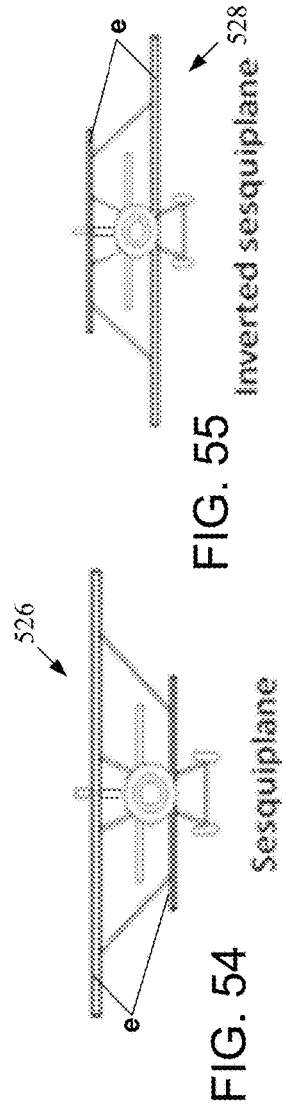
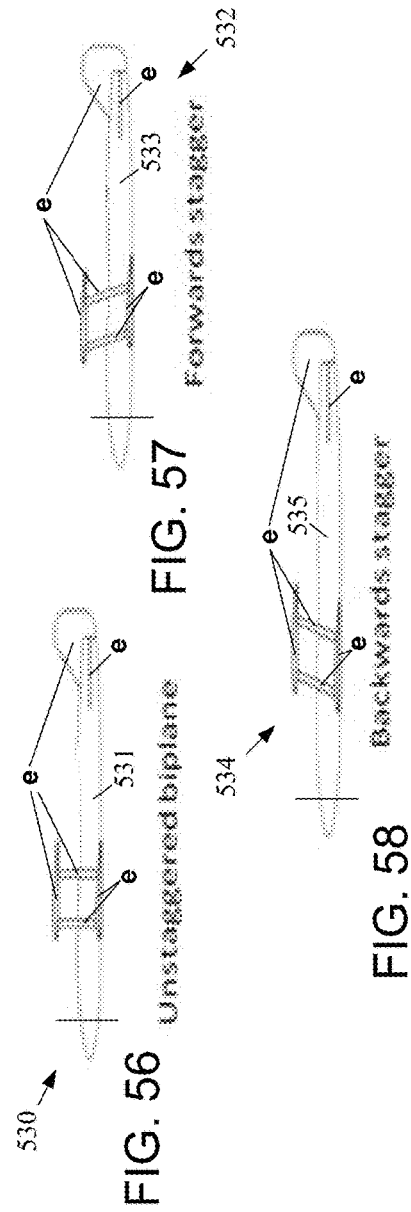
FIG. 52 Biplane
FIG. 53 Unequal-span biplane
FIG. 54 Sesquiplane
FIG. 55 Inverted sesquiplane
FIG. 56 Unstaggered biplane
FIG. 57 Forwards stagger
FIG. 58 Backwards stagger

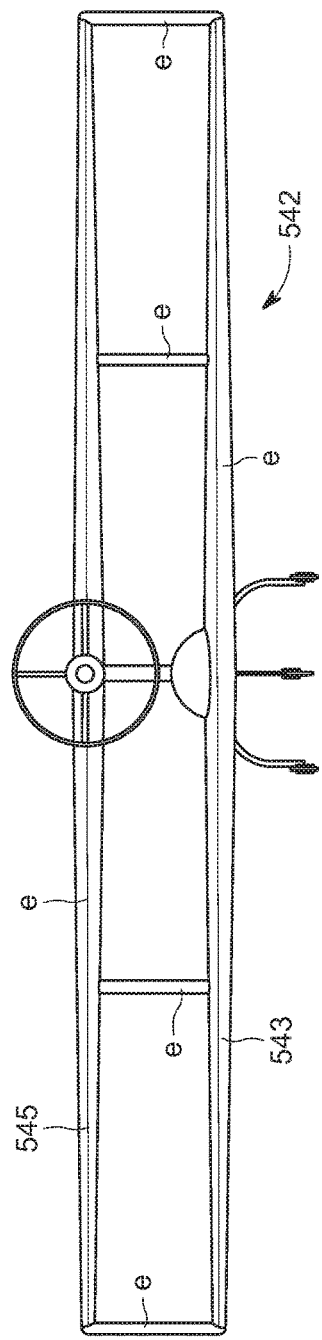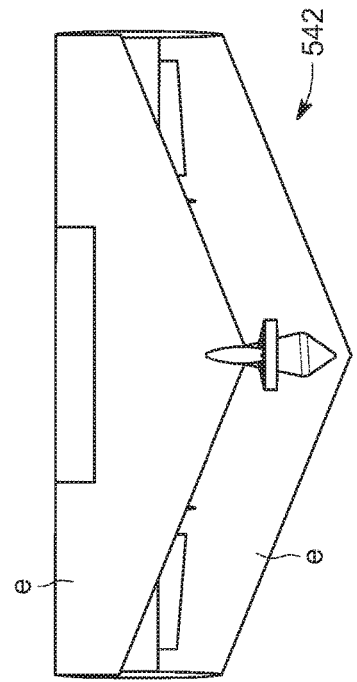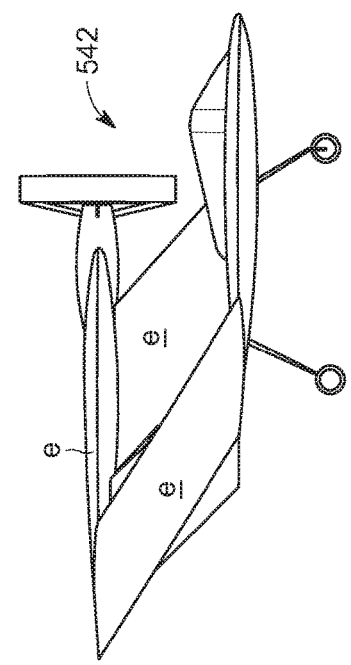
FIG. 68
FIG. 70
FIG. 69

APPARATUS HAVING ELECTRIC-FIELD ACTUATED GENERATOR FOR POWERING ELECTRICAL LOAD WITHIN VICINITY OF POWERLINES

CROSS-REFERENCE TO RELATED APPLICATION

The present application is a continuation of, and claims priority under 35 U.S.C. § 120 to, U.S. patent application Ser. No. 16/162,681, incorporated herein by reference, which '681 application is a continuation-in-part of, and claims priority under § 120 to, U.S. patent application Ser. No. 16/136,226, incorporated herein by reference, which '226 application is a continuation-in-part of, and claims priority under § 120 to, U.S. patent application Ser. No. 16/134,909, incorporated herein by reference. Each of the present application, the '681 application, the '226 application, and the '909 application is a nonprovisional application of, and claims priority under 35 U.S.C. § 119(e) to, each of the following provisional U.S. patent applications 62/682,841; 62/682,842; 62/682,843; 62/682,845; 62/682,846; and 62/682,931. Each of the foregoing provisional U.S. patent applications is incorporated herein by reference. Any patent application publication of any of the foregoing and any patent issuing directly from any of the foregoing including any provisional application that may be converted to a nonprovisional application is incorporated herein by reference.

COPYRIGHT STATEMENT

Any new and original work of authorship in this document is subject to copyright protection under the copyright laws of the United States and other countries. Reproduction by anyone of this document as it appears in official governmental records is permitted, but otherwise all other copyright rights whatsoever are reserved.

FIELD OF THE INVENTION

The invention generally relates to apparatus and methods for electrically powering objects. In this regard, an object preferably comprises an electrical load (also sometimes referred to as an electric load) that is directly powered by such apparatus and methods. Such object may be, by way of example and not limitation, a sensor, a transceiver, an electric motor, a device, an instrument, a piece of equipment, and a system or part of a system. Alternatively, the object comprises an energy-storing system that is charged by such apparatus and methods, wherein the electrical load is powered by the energy-storing system, in which scenario the electrical load is indirectly powered by such apparatus and methods. Such energy-storing system may comprise a circuit that includes a battery.

Such apparatus may be a device or may be part of a device and hereinafter such apparatus is generally referred to herein as an "electric-field actuated generator" or "EFA" generator. The EFA generator is intended to be used within an environment having inhomogeneous electric fields, wherein differentials in electric field strengths are sufficiently great so as to power the intended object with the EFA generator. In preferred embodiments, the environment comprises a vicinity of powerlines, and especially a vicinity of three-phase alternating current powerlines, such as those used by electric and utility companies for electric power transmission. At least in the United States, such powerlines usually are three-phase AC and typically have voltages of between 69 kV and 765 kV, including 69 kV, 110 kV, 115 kV, 138 kV, 230 kV, 345 kV, 500 kV, and 765 kV.

BACKGROUND OF THE INVENTION

Using high-voltage power transmission lines to power an unmanned air/aerial vehicle or drone (hereinafter generally referred to as a "UAV") is known and disclosed, for example, in U.S. patent application publication 2017/0015414 (hereinafter "Chen"), insofar as Chen discloses that power can be supplied to a UAV from a powerline, through an interface, to an energy storage system of the UAV for repowering of the energy storage system of the UAV.

In this respect, Chen broadly discloses that this can be done by one of capacitive power transfer and inductive power transfer. Chen specifically recognizes that a UAV is commonly configured with a base and one or a set of rotors to provide lift and thrust for propulsion, wherein the rotors are driven by a propulsion system having an electric motor driven by an energy storage system comprising a battery. Chen acknowledges that in such known arrangements the range and usefulness of the UAV are limited by the amount of energy available from the battery. Chen further notes that electric power is transmitted through a vast network of utility transmission systems across the country, including alternating current (AC) powerlines (e.g., utility transmission lines) supported by structures (e.g., towers), and Chen recognizes that these powerlines represent an available power source for apparatus that can be configured to access them.

The innovations in Chen are based on the use of such known utility transmission systems to enhance the range and utility of such UAVs, as well as for providing flyways or routes for such UAVs. The range is enhanced, according to Chen, by using power supplied from utility transmission systems through an interface to an energy storage system of the UAV. As explicitly stated by Chen, "the inventions generally relate to improvements to methods and systems for repowering unmanned aircraft and to improvements to unmanned aircraft and for unmanned aircraft systems and methods" (emphasis added).

Fairly characterized, Chen discloses that the transfer of energy may comprise transferring energy from an electric field to the UAV, and that the powerline produces an electric field and the aircraft is configured to extract power for repowering of the energy storage system using the electric field of the powerline; however, Chen is replete with speculation regarding how this might be done and is short on technical detail, instead taking a broad-brush approach in the written description.

Consequently, it is believed that a significant shortcoming of Chen is a failure to recognize and appreciate electric field strengths and interactions within the vicinity of powerlines. Indeed, electric field topography in the vicinity of powerlines is complex and depends on a number of factors, including the number of conducting lines and their arrangement.

For example, an exemplary powerline transmission tower 100 is seen in FIG. 1 and includes three conducting lines 102,104,106 each out of phase with the others, and two shield wires 108,110.

Another exemplary tower 100a that typically is found in power transmission systems is illustrated in FIG. 2 and, like tower 100, includes conducting lines 102,104,106 and shield lines 108,110. FIG. 3 shows yet another exemplary tower 100b. Unlike towers 100 and 100a, tower 100b includes six conducting lines comprising conducting lines 102a,104a; conducting lines 102b,104b; and conducting lines 102c, 104c. Tower 100b also includes shield lines 108,110.

For use with preferred embodiments of the invention, the voltage of the powerlines of the exemplary towers preferably is 345 kV, 500 kV, or 765 kV, and the powerlines preferably are three-phase AC.

Electric field strengths within the vicinity of the powerlines of the exemplary towers are complex. For example, the electric fields of the powerlines of FIG. 1 are modeled in FIG. 4. It will be appreciated that the highest electric field strengths exist in the immediately surrounding area 112 of the conducting lines 102,104,106, and that the lowest electric field strengths exist in the furthest surrounding area 120, with intermediate field strengths existing in nested areas 114,116,118. Moreover, with reference to FIG. 4, "vicinity" of powerlines as used herein means, for a 500 kV 3 phase AC transmission line, within an area of powerlines extending thirty (30) meters to either side of the center line and upwards from ground of thirty-five (35) meters so as to encompass areas 112,114,116,118. An alternative definition used herein is the area around powerlines in which the log base 10 of the electric field in volts per meter is equal to or greater than two.

It will be appreciated from examination of the modeling seen in FIG. 4 that there exist great electric field differentials within the vicinity of powerlines. Indeed, FIG. 4 shows that the electric field strengths are around one hundred times greater in areas 112 than in the outer fringes of area 118, i.e., the difference between about a thousand volts per meter (1 kV) and ten thousand kilovolts per meter (10 kV).

To further illustrates this point, additional exemplary electric field strengths within a vicinity of powerlines also are modeled in FIG. 5. The area of the modeling in FIG. 5 encompasses thirty (30) meters to either side of a center line and upwards from ground of about (14) meters. Each of the fourteen red lines representing the root mean square value/magnitude of the x-component of the electric field is modeled at between one (1) meter and fifteen (15) meters from ground, with the difference between successive red lines representing one (1) meter in height. Similarly, each of the fourteen blue lines representing the root mean square value/magnitude of the y-component of the electric field is modeled at between one (1) meter and fifteen (15) meters from ground, with the difference between successive blue lines representing one (1) meter in height; and each of the fourteen purple lines representing the root mean square value/magnitude of the combined electric field is modeled at between one (1) meter and fifteen (15) meters from ground, with the difference between successive purple lines representing one (1) meter in height.

It will be appreciated from examination of the modeling seen in FIG. 5 that not only do there exist great electric field differentials, but that there also exist local maximums and minimums in electric field strengths, such that increasing the distance between any given two points does not necessarily increase the electric field differential between the two points. For instance, two points located a certain distance apart may have no electric field differential, but each point may have significant electric field differentials with respect to intermediate points located there between.

Additionally, while not the same topography, each of the electric field topographies found with tower 100a and tower 100b is similarly complex.

Accordingly, it is believed that embodiments of the invention represent technological improvements neither disclosed nor rendered obvious by Chen, as one or more embodiments rely upon electric field differentials unrecognized in and unappreciated by Chen. For example, one or more embodiments are believed to enable, inter alia, UAVs to make better use of electric fields within the vicinity of transmission powerlines to the extent that not only can the conventional, rechargeable energy sources of the UAVs be repowered, but actual flight along transmission powerlines can be realized in UAVs without reliance on any energy storage system. Moreover, it is believed that such technological improvements represent a new type of power source for generating electrical energy by harnessing electric fields, and that such new type of power source can be used in replacement of or in combination with conventional power sources when powering objects within high voltage electric fields.

SUMMARY OF THE INVENTION

The invention includes many aspects and features. Moreover, while many aspects and features relate to, and are described in, the context of UAVs operating within a vicinity of high-voltage three-phase AC powerlines, such as those used by electric power utility companies and transmission owning and/or operating companies in the United States, the invention is not limited to use only in such context, as will become apparent from the following summaries and detailed descriptions of aspects, features, and one or more embodiments of the invention. Indeed, the invention has applicability for use with other types of powerlines as may be found in certain areas of the United States and in other areas of the world.

Accordingly, an aspect of the invention relates to an apparatus in which electric power is generated from differentials in electric field strength, preferably within a vicinity of powerlines. The apparatus comprises: (a) a first electrode having at least two overall substantial dimensions, a first of which is at least 80% of at least one of an overall heightwise extent, an overall lengthwise extent, and an overall widthwise extent of the apparatus, and a second of which is at least 80% of at least one of the overall heightwise extent, the overall lengthwise extent, and the overall widthwise extent of the apparatus; and (b) a second electrode having at least two overall substantial dimensions, a first of which is at least 80% of at least one of the overall heightwise extent, the overall lengthwise extent, and the overall widthwise extent of the apparatus, and a second of which is at least 80% of at least one of the overall heightwise extent, the overall lengthwise extent, and the overall widthwise extent of the apparatus. The first and second electrodes are separated and electrically insulated from each other for enabling a differential in voltage at the first and second electrodes resulting from a differential in electric field strength experienced at the first and second electrodes when within the vicinity of the powerlines. Furthermore, the apparatus comprises electrical components electrically connected with the first and second electrodes that establish an electric circuit, with the differential in voltage between the first and second electrodes causing a current to flow through the circuit for powering an electrical load of the electric circuit.

The "electrical load of the electric circuit" may be, by way of example and not limitation, a sensor, a transceiver, or an electric motor, which may or may not be part of the apparatus. Alternatively, the "electrical load of the electric circuit" may be an energy-storing system that is charged by the electric circuit, which may or may not be part of the apparatus, wherein the energy-storage system in turn powers, for example, a sensor, a transceiver, or an electric motor, which may or may not be part of the apparatus. The energy-storage system may comprise a rechargeable battery.

In a feature of this aspect, the electrical components comprise a plurality of electric-field shielded capacitors configurable in different arrangements in the electric circuit for selectively changing current and voltage characteristics of the electric circuit for powering the electrical load of the electric circuit. The electric-field shielded capacitors preferably are configurable through switches or equivalent components. Furthermore, one of the different arrangements of the electric-field shielded capacitors preferably comprises capacitors arranged in series; another one of the different arrangements of the electric-field shielded capacitors preferably comprises capacitors arranged in parallel; and another one of the different arrangements of the electric-field shielded capacitors preferably comprises capacitors arranged both in series and in parallel.

In another feature, at least one and preferably all electrodes each comprises a metallic plate.

In another feature, at least one and preferably all electrodes each comprises a thin, wide-area electrode.

In another aspect, an apparatus in which electric power is generated for an electrical load from a differential in electric field strength within a vicinity of powerlines comprises: (a) a plurality of electrodes comprising first, second, and third electrodes separated and electrically insulated from one another for enabling differentials in voltage at the first, second, and third electrodes resulting from differentials in electric field strength experienced at the first, second, and third electrodes when within the vicinity of the powerlines; (b) electrical components electrically connected with the first, second, and third electrodes, at least one or more of the electrical components being configurable to establish each of (i) a first electric circuit, wherein the differential in voltage between the first electrode and the second electrode causes a current to flow through the first electric circuit for powering an electrical load; (ii) a second electric circuit, wherein the differential in voltage between the first electrode and the third electrode causes a current to flow through the second electric circuit for powering the electrical load; and (iii) a third electric circuit, wherein the differential in voltage between the second electrode and the third electrode causes a current to flow through the third electric circuit for powering the electrical load; and (c) a control assembly comprising (i) one or more voltage-detector components configured to detect voltage of the first, second, and third electrodes; and (ii) a processor enabled to configure—based on the detected voltages and based on voltage and electric current specifications for powering the electrical load one—or more of the electrical components to establish one of the first electric circuit, the second electric circuit, and the third electric circuit for powering the electrical load.

In a feature of this aspect, the electrical components comprise a plurality of electric-field shielded capacitors configurable in different arrangements in the electric circuit for selectively changing current and voltage characteristics of the electric circuit for powering the electrical load of the electric circuit, and wherein the control assembly is enabled to configure the capacitors into one of the different arrangements in establishing an electric circuit for powering the electrical load.

In a feature of this aspect, the apparatus further comprises a battery by which the control assembly is powered. The battery may power only the control assembly and may not power the electrical load of the electric circuit. The battery may be rechargeable, and the electrical load of the electric circuit may comprise the battery for recharging the battery.

In another feature, the voltage and electric current specifications of the electrical load are stored in a non-transitory computer-readable medium of the apparatus for access by the processor.

In another feature, the control assembly configures one or more of the electrical components to establish one of the first, second, and third electric circuits on a recurring basis when the apparatus is in the vicinity of the powerlines. The recurring basis may correspond to a cycle of the alternating current of a power transmission line.

In another feature, the control assembly configures one or more of the electrical components to establish one of the first, second, and third electric circuits on a recurring basis as the apparatus moves while in the vicinity of the powerlines. By configuring the one or more of the electrical components to establish one of the electric circuits on a recurring basis, each time the best available voltage and current output characteristics for the electrical load as between the electric circuits that can be established can be determined and selected. Such electric-circuit switching can thereby improve performance of the powering of the electrical load by the apparatus.

In another aspect, an apparatus in which electric power is generated for an electrical load from one or more differentials in electric field strength in a vicinity of powerlines comprises: (a) a plurality of separated electrodes; (b) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced when the apparatus is within the vicinity of the powerlines, wherein the subsets of the set are interconnected such that the one or more voltage differentials between the subsets causes a current to flow through the electric circuit of the set for powering the electrical load; and (c) a control assembly comprising (i) one or more voltage-detector components configured to detect voltage differentials of the sets; and (ii) a processor enabled to process the detected voltage differentials and based thereon and based on voltage and electric current specifications for powering the electrical load—configure one or more of the electrical components in order to establish one of the plurality of different electric circuits for powering the electrical load.

In a feature, the control assembly configures one or more of the electrical components in order to establish one of the plurality of different electric circuits for powering the electrical load on a recurring basis when the apparatus is in the vicinity of the powerlines. Such electric-circuit switching can thereby improve performance of the powering of the electrical load by the apparatus.

In a feature, the control assembly configures one or more of the electrical components in order to establish one of the plurality of different electric circuits for powering the electrical load on a recurring basis when the apparatus moves while in the vicinity of the powerlines. Such electric-circuit switching can thereby improve performance of the powering of the electrical load by the apparatus.

In a feature, a plurality of the subsets of electrodes are electrically connected in series in at least one of the plurality of different electric circuits.

In a feature, a plurality of the subsets of electrodes are electrically connected so as to form a plurality of capacitors arranged in series in at least one of the plurality of different electric circuits.

In a feature, a plurality of the subsets of electrodes are electrically connected so as to form a plurality of capacitors arranged in parallel in at least one of the plurality of different electric circuits.

In a feature, a subset comprises electrodes arranged in parallel in at least one of the plurality of different electric circuits.

In a feature, an area of the plurality of electrodes in at least one of the plurality of different electric circuits is less than or equal to 50% of an area of the set of electrodes in at least one other of the plurality of different electric circuits.

In a feature, an area of the plurality of electrodes in at least one of the plurality of different electric circuits is less than or equal to 25% of an area of the set of electrodes in at least one other of the plurality of different electric circuits.

In a feature, an area of the plurality of electrodes in at least one of the plurality of different electric circuits is less than or equal to 10% of an area of the set of electrodes in at least one other of the plurality of different electric circuits.

In another aspect, a device comprises: (a) one or more electrical components; and (b) a power supply unit; (c) wherein the device defines a bay configured to removably receive the power supply unit for electrical coupling with the device, by which electrical coupling electric current is provided to the device by the power supply unit; (d) wherein the power supply unit is configured to generate electric power from a differential in electric field strength when the power supply unit is received in the bay, electrically coupled with the device, and within a vicinity of powerlines; and (e) wherein the power supply unit comprises (i) a first electrode having at least two overall substantial dimensions, a first of which is at least 80% of at least one of an overall heightwise extent, an overall lengthwise extent, and an overall widthwise extent of the device, and a second of which is at least 80% of at least one of the overall heightwise extent, the overall lengthwise extent, and the overall widthwise extent of the device; and (ii) a second electrode having at least two overall substantial dimensions, a first of which is at least 80% of at least one of the overall heightwise extent, the overall lengthwise extent, and the overall widthwise extent of the device, and a second of which is at least 80% of at least one of the overall heightwise extent, the overall lengthwise extent, and the overall widthwise extent of the device; (iii) wherein the first and second electrodes are separated and electrically insulated from each other for enabling a differential in voltage at the first and second electrodes resulting from a differential in electric field strength experienced at the first and second electrodes when within the vicinity of the powerlines; and (f) further comprising electrical components electrically connected with the first and second electrodes that establish an electric circuit with one or more electrical components of the device when the power supply unit is received in the bay and electrically coupled with the device, wherein the differential in voltage between the first and second electrodes causes electric current to flow through the electric circuit for powering the device.

In another aspect, a device, comprises: (a) one or more electrical components; and (b) a power supply unit; (c) wherein the device defines a bay configured to removably receive the power supply unit for electrical coupling with the device, by which electrical coupling electric current is provided to the device by the power supply unit; (d) wherein the power supply unit is configured to generate electric power from a differential in electric field strength when the power supply unit is received in the bay, electrically coupled with the device, and within a vicinity of powerlines; and (e) wherein the power supply unit comprises a plurality of electrodes comprising first, second, and third electrodes separated and electrically insulated from one another for enabling differentials in voltage at the first, second, and third electrodes resulting from differentials in electric field strength experienced at the first, second, and third electrodes when within the vicinity of the powerlines; (f) and wherein the device further comprises, when the power supply unit is electrically coupled with the device, (i) electrical components electrically connected with the first, second, and third electrodes, at least one or more of the electrical components being configurable to establish each of (A) a first electric circuit, wherein the differential in voltage between the first electrode and the second electrode causes a current to flow through the first electric circuit for powering the device; (B) a second electric circuit, wherein the differential in voltage between the first electrode and the third electrode causes a current to flow through the second electric circuit for powering the device; and (C) a third electric circuit, wherein the differential in voltage between the second electrode and the third electrode causes a current to flow through the third electric circuit for powering the device; (ii) one or more sensors configured to sense data regarding voltage of the first, second, and third electrodes; and (iii) a processor configured to process the sensed data and, based thereon and based on voltage and electric current specifications for powering the device, configure one or more of the electrical components to establish one of the first electric circuit, the second electric circuit, and the third electric circuit for powering the device.

In a feature of this aspect, at least one of the at least one or more of the electrical components configurable to establish each of the first, second, and third electric circuits is located within the device and outside of the power supply unit.

In a feature of this aspect, at least one of the one or more sensors configured to sense data regarding voltage of the first, second, and third electrodes is located within the device and outside of the power supply unit.

In another feature, the processor configured to process the sensed data and, based thereon and based on voltage and electric current specifications for powering the device, configure one or more of the electrical components to establish one of the first electric circuit, the second electric circuit, and the third electric circuit for powering the device is located within the device and outside of the power supply unit.

In a feature, at least one of the at least one or more of the electrical components configurable to establish each of the first, second, and third electric circuits is located within the power supply unit.

In a feature, at least one of the one or more sensors configured to sense data regarding voltage of the first, second, and third electrodes is located within the power supply unit.

In a feature, the processor configured to process the sensed data and, based thereon and based on voltage and electric current specifications for powering the device, configure one or more of the electrical components to establish one of the first electric circuit, the second electric circuit, and the third electric circuit for powering the device is located within the power supply unit.

In another aspect, a device comprises: (a) one or more electrical components; and (b) a power supply unit; (c) wherein the device defines a bay configured to removably receive the power supply unit for electrical coupling with the device, by which electrical coupling electric current is provided to the device by the power supply unit; (d) wherein the power supply unit is configured to generate electric power from a differential in electric field strength when the power supply unit is received in the bay, electrically coupled with the device, and within a vicinity of powerlines; (e) wherein the power supply unit comprises a plurality of separated electrodes; and (f) wherein the device further comprises, when the power supply unit is electrically coupled with the device, (i) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced when the device is within the vicinity of the powerlines, wherein the subsets of the set are interconnected such that the one or more voltage differentials between the subsets causes a current to flow through the electric circuit of the set for powering the device; (ii) one or more sensors configured to sense data regarding voltage differentials of the sets; and (iii) a processor configured to process the sensed data and, based thereon and based on voltage and electric current specifications for powering the device, configure one or more of the electrical components to establish one of the plurality of different electric circuits for powering the device.

In another aspect, a device, comprises: (a) an external enclosure including one or more external walls; (b) a power supply configured to generate electric power from a differential in electric field strength when the device is within a vicinity of powerlines, the power supply comprising first and second electrodes; (c) wherein the one or more external walls comprise the first and second electrodes; and (d) wherein the first and second electrodes are separated and electrically insulated from each other for enabling a differential in voltage at the first and second electrodes resulting from a differential in electric field strength experienced at the first and second electrodes when the device is within the vicinity of the powerlines; and (e) further comprising electrical components electrically connected with the first and second electrodes that establish an electric circuit, wherein a differential in voltage between the first and second electrodes causes electric current to flow through the electric circuit for powering the device.

In a feature of this aspect, the external enclosure comprises a housing, casing, or chassis.

In another feature of this aspect, the one or more external walls comprise a plurality of planar walls, wherein a first of the planar walls comprises the first electrode and a second of the planar walls comprise the second electrode. Furthermore, the first electrode may be commensurate in extent with an external surface of the first planar wall, and the second electrode may be commensurate in extent with an external surface of the second planar wall. Additionally, the first electrode may be contained within the first planar wall and the second electrode may be contained within the second planar wall.

In another feature, the one or more external walls comprises a plurality of curved walls, wherein a first of the curved walls comprises the first electrode and a second of the curved walls comprises the second electrode. Furthermore, the first electrode may be commensurate with an external surface of the first planar wall, and the second electrode extends may be commensurate with an external surface of the second planar wall. Additionally, the first electrode may be contained within the first curved wall and the second electrode may be contained within the second curved wall.

In another feature, the one or more external walls comprise a plurality of surfaces, wherein the first electrode comprises a first of the surfaces and the second electrode comprises a second of the surfaces. The first and second surfaces may be curved surfaces, or the first and second surfaces may be planar surfaces.

In another aspect, a device, comprises: (a) an external enclosure including one or more external walls; (b) a power supply configured to generate electric power from a differential in electric field strength when the device is within a vicinity of powerlines, the power supply comprising first, second, and third electrodes; (c) wherein the one or more external walls comprise the first, second, and third electrodes; and (d) wherein the first, second, and third electrodes are separated and electrically insulated from each other for enabling (i) a differential in voltage at the first and second electrodes resulting from a differential in electric field strength experienced at the first and second electrodes when the device is within the vicinity of the powerlines; (ii) a differential in voltage at the first and third electrodes resulting from a differential in electric field strength experienced at the first and third electrodes when the device is within the vicinity of the powerlines; and (iii) a differential in voltage at the second and third electrodes resulting from a differential in electric field strength experienced at the second and third electrodes when the device is within the vicinity of the powerlines. Additionally, the device further comprises electrical components electrically connected with the first, second, and third electrodes and configurable to establish, in the alternative, each of (i) a first electric circuit, wherein a differential in voltage between the first and second electrodes causes electric current to flow through the electric circuit for powering the device; (ii) a second electric circuit, wherein a differential in voltage between the first and third electrodes causes electric current to flow through the electric circuit for powering the device; and (iii) a third electric circuit, wherein a differential in voltage between the second and third electrodes causes electric current to flow through the electric circuit for powering the device; One or more voltage-detector components is configured to detect voltages of the first, second, and third electrodes; and a controller is configured to process the detected voltages data and to configure one or more of the electrical components based thereon and based on voltage and electric current specifications for powering the device, in order to establish one of the first electric circuit, the second electric circuit, and the third electric circuit for powering the device.

In a feature of this aspect, the controller may comprise a processor, a microcontroller, or an integrated circuit including an application specific integrated circuit (ASIC).

In another feature, the controller comprises software executable by the processor and non-transitory computer-readable memory.

In another aspect, a device comprises: (a) an external enclosure including one or more external walls; (b) a power supply configured to generate electric power from a differential in electric field strength when the device is within a vicinity of powerlines, the power supply comprising a plurality of separated electrodes, wherein the one or more external walls comprise one or more of the plurality of electrodes; (c) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced when the device is within the vicinity of the powerlines, wherein the subsets of the set are interconnected such that the one or more voltage differentials between the subsets causes a current to flow through the electric circuit of the set for powering the device; (d) one or more sensors configured to sense data regarding voltage differentials of the sets; and (e) a controller configured to process the sensed data and based thereon and based on voltage and electric current specifications for powering the device, configure one or more of the electrical components to establish one of the plurality of different electric circuits for powering the device.

In another aspect, an apparatus in which electric power is generated for an electrical load from one or more differentials in electric field strength in a vicinity of powerlines comprises: (a) a plurality of separated electrodes; (b) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced when the apparatus is within the vicinity of the powerlines, wherein the subsets of the set are interconnected such that the one or more voltage differentials between the subsets causes a current to flow through the electric circuit of the set for powering the electrical load; and (c) a control assembly comprising (i) one or more voltage-detector components configured to detect voltage differentials of the sets; and (ii) a processor enabled to process the detected voltage differentials and—based thereon and based on voltage and electric current specifications for powering the electrical load—configure one or more of the electrical components in order to establish one of the plurality of different electric circuits for powering the electrical load.

In a feature, the electrodes of the plurality of electrodes are symmetrically arranged about an axis of the apparatus.

In a feature, the electrodes of the plurality of electrodes are symmetrically arranged about a center of the apparatus.

In a feature, the electrodes are encased in a nonmetallic material.

In a feature, the electrodes are encased in a molded material.

In a feature, the electrodes are encased in a nonconducting polymer material.

In a feature, the electrodes are encased in a nonconducting plastic material. The plastic material may be a nonconducting thermoplastic material or a nonconducting thermosetting material.

In a feature, the plurality of electrodes is located in a block arrangement and define walls of the block.

In a feature, the electrodes each comprises a planar rectangular surface.

In a feature, the electrodes define inner surfaces of a block.

In a feature, the electrodes define outer surfaces of a block.

In a feature, the plurality of electrodes is located in an arrangement of nested blocks and defines walls of the blocks. In this respect, a subset of two or more separated and electrically insulated electrodes forms each of the blocks. Indeed, no block would be entirely formed of a single electrode.

In a feature, the control assembly is located within an innermost block of nested blocks.

In a feature, the plurality of electrodes is located in a spherical arrangement and define wall of a sphere. In this respect, a subset of two or more separated and electrically insulated electrodes forms each of the spheres. Indeed, no sphere would be entirely formed of a single electrode.

In a feature, the electrodes each comprises a planar surface.

In a feature, the electrodes each comprises a curved surface.

In a feature, the electrodes define an inner surface of a sphere.

In a feature, each electrode comprises a concave surface.

In a feature, the electrodes define an outer surface of a sphere.

In a feature, each electrode comprises a convex surface.

In a feature, a first pair of electrodes is located along a first axis, a second pair of electrodes is located along a second axis orthogonal to the first axis, and a third pair of electrodes is located along a third axis orthogonal to each of the first axis and the second axis. The first, second, and third pairs of electrodes may be arranged in a "jacks" formation; the first, second, and third axes may intersect at an origin point; and the origin point may represent a midpoint between the electrodes of the first pair, may represent a midpoint between the electrodes of the second pair; and may represent a midpoint between the electrodes of the third pair. Additionally, the electrodes of the first pair may be located a first distance apart; the electrodes of the second pair may be located a second distance apart; the electrodes of the third pair may be located a third distance apart; and the first, second, and third distances may or may not be equal in length. Moreover, each electrode of the first pair may be hemispheric or planar in shape.

In another feature, the plurality of electrodes is located in an arrangement of concentric spheres and defines walls of the spheres, and the control assembly may be located within an innermost sphere.

In an aspect of the invention, a method for generating electric power from a differential in electric field strength within a vicinity of powerlines comprises the steps of: (a) establishing a circuit in which first and second electrodes are separated and electrically insulated from each other for enabling a differential in voltage at the first and second electrodes resulting from a differential in electric field strength experienced at the first and second electrodes when within the vicinity of the powerlines; and (b) positioning the first and second electrodes within the vicinity of powerlines such that the first and second electrodes experience a differential in electric field strength with a resulting differential in voltage between the first and second electrodes causing a current to flow through the circuit for powering an electrical load of the electric circuit.

In a feature of this aspect, the step of establishing the circuit comprises configuring in one of a plurality of different arrangements a plurality of electric-field shielded capacitors forming part of the electric circuit for powering the electrical load of the electric circuit, each of the different arrangements providing a different overall capacitance to the electric circuit.

In a feature, one of the different arrangements of the electric-field shielded capacitors comprises capacitors arranged in series; another one of the different arrangements of the electric-field shielded capacitors comprises capacitors arranged in parallel; and another one of the different arrangements of the electric-field shielded capacitors comprises capacitors arranged in both series and parallel.

In a feature, one of the different arrangements of the electric-field shielded capacitors comprises capacitors arranged in series; another one of the different arrangements of the electric-field shielded capacitors comprises capacitors arranged in parallel; and another one of the different arrangements of the electric-field shielded capacitors comprises capacitors arranged in both series and parallel.

In a feature, the powerlines carry alternating electric current. Preferably, the voltage of the powerlines is one of 69 kV; 115 kV; 230 kV; 500 kV; and 765 kV.

In another aspect, a method for generating electric power for an electrical load from a differential in electric field strength within a vicinity of powerlines comprises the steps of: (a) positioning first, second, and third electrodes within the vicinity of powerlines such that the first, second, and third electrodes experience differentials in electric field strength with resulting differentials in voltage at two or more of the first, second, and third electrodes; (b) detecting relative voltages at the first, second, and third electrodes; and (c) establishing a particular one of a plurality of mutually exclusive electric circuits each comprising a pair of electrodes, the plurality of mutually exclusive electric circuits comprising (i) a first electric circuit, in which the first electrode and the second electrode are separated and electrically insulated from each other for enabling a differential in voltage at the first and second electrodes resulting from a differential in electric field strength experienced at the first and second electrodes when within the vicinity of the powerlines, the differential in voltage between the first electrode and the second electrode causing a current to flow through the first electric circuit for powering the electrical load; (ii) a second electric circuit, in which the first electrode and the third electrode are separated and electrically insulated from each other for enabling a differential in voltage at the first and third electrodes resulting from a differential in electric field strength experienced at the first and third electrodes when within the vicinity of the powerlines, the differential in voltage between the first electrode and the third electrode causing a current to flow through the second electric circuit for powering the electrical load; and (iii) a third electric circuit, in which the second electrode and the third electrode are separated and electrically insulated from each other for enabling a differential in voltage at the second and third electrodes resulting from a differential in electric field strength experienced at the second and third electrodes when within the vicinity of the powerlines, the differential in voltage between the second electrode and the third electrode causing a current to flow through the third electric circuit for powering the electrical load; (d) wherein the particular one of the plurality of mutually exclusive electric circuits is established as a function of the detected voltages and based on voltage and electric current specifications for powering the electrical load.

In a feature of this aspect, a processor is enabled to configure each of the plurality of mutually exclusive electric circuits as a function of the detected voltages and of the voltage and electric current specifications for powering the electrical load.

In another feature, the method further comprises again detecting relative voltages at the first, second, and third electrodes and—as a function thereof and of the voltage and electric current specifications for powering the electrical load—establishing another particular one of the plurality of mutually exclusive electric circuits.

In a feature, the one or more voltage-detector components are configured to detect a voltage of the first, second, and third electrodes relative to a reference voltage.

In a feature, the one or more voltage-detector components are configured to detect a voltage of the first and second electrodes relative to the third electrode.

In a feature, the method further comprises moving the first, second, and third electrodes while in the vicinity of the powerlines while further detecting relative voltages at the first, second, and third electrodes and as a function thereof and of the voltage and electric current specifications for powering the electrical load—establishing another particular one of the plurality of mutually exclusive electric circuits.

In another aspect, a method for generating electric power for an electrical load from one or more differentials in electric field strength within a vicinity of powerlines comprises the steps of: (a) positioning a plurality of separated electrodes within the vicinity of powerlines such that the electrodes experience differentials in electric field strength with resulting differentials in voltage at the electrodes; and (b) establishing a particular one of a plurality of different electric circuits, each of the different electric circuits comprising a set of two or more mutually exclusive subsets of the plurality of electrodes, the electrodes in each subset that have more than one electrode being electrically connected with each other for avoiding any voltage differential therebetween, and the one or more electrodes of each subset being electrically insulated from each electrode of any other subset of the set for enabling one or more voltage differentials between the subsets of the set, wherein the subsets are interconnected in each electric circuit such that the one or more voltage differentials therebetween causes a current to flow through the electric circuit for powering the electrical load; and (c) further comprising detecting voltage differentials of the sets, wherein the particular one of the plurality of different electric circuits is established as a function of the detected voltage differentials and electric current specifications for powering the electrical load.

In a feature, the method further comprises again detecting voltage differentials at the subsets of the plurality of electrodes and—as a function thereof and of the voltage and electric current specifications for powering the electrical load—establishing another particular one of the plurality of different electric circuits.

In a feature, the method further comprises again detecting voltage differentials at the subsets of the plurality of electrodes when moving the subsets of the plurality of electrodes while in the vicinity of the powerlines and—as a function thereof and of the voltage and electric current specifications for powering the electrical load—establishing another particular one of the plurality of different electric circuits.

In another aspect, a method for powering a device comprises the steps of: (a) providing a power supply unit adapted to generate electric power from a differential in electric field strength within a vicinity of powerlines, the power supply unit comprising (i) a first electrode having at least two overall substantial dimensions, a first of which is at least 80% of at least one of an overall heightwise extent, an overall lengthwise extent, and an overall widthwise extent of the device, and a second of which is at least 80% of at least one of the overall heightwise extent, the overall lengthwise extent, and the overall widthwise extent of the device; and (ii) a second electrode having at least two overall substantial dimensions, a first of which is at least 80% of at least one of the overall heightwise extent, the overall lengthwise extent, and the overall widthwise extent of the device, and a second of which is at least 80% of at least one of the overall heightwise extent, the overall lengthwise extent, and the overall widthwise extent of the device; (iii) wherein the first and second electrodes are separated and electrically insulated from each other for enabling a differential in voltage at the first and second electrodes resulting from a differential in electric field strength experienced at the first and second electrodes when within the vicinity of the powerlines; (b) electrically coupling the power supply unit with the device, comprising inserting the power supply unit into a bay of the device, whereby electrical components of the power supply electrically connected with the first and second electrodes establish an electric circuit with one or more electrical components of the device through the electrical coupling; and (c) locating the device within the vicinity of powerlines such that a differential in voltage between the first and second electrodes causes electric current to flow through the electric circuit for powering the device.

In another aspect, a method for powering a device comprises the steps of: (a) providing a power supply unit adapted to generate electric power from a differential in electric field strength within a vicinity of powerlines; (b) electrically coupling the power supply unit with the device, comprising inserting the power supply unit into a bay of the device, whereby electrical components electrically connected with the first, second, and third electrodes are configurable to establish, through the electrical coupling, a particular one of a plurality of mutually exclusive electric circuits each comprising a pair of electrodes, the plurality of mutually exclusive electric circuits comprising (i) a first electric circuit, in which the first electrode and the second electrode are separated and electrically insulated from each other for enabling a differential in voltage at the first and second electrodes resulting from a differential in electric field strength experienced at the first and second electrodes when within the vicinity of the powerlines, the differential in voltage between the first electrode and the second electrode causing a current to flow through the first electric circuit for powering the device; (ii) a second electric circuit, in which the first electrode and the third electrode are separated and electrically insulated from each other for enabling a differential in voltage at the first and third electrodes resulting from a differential in electric field strength experienced at the first and third electrodes when within the vicinity of the powerlines, the differential in voltage between the first electrode and the third electrode causing a current to flow through the second electric circuit for powering the device; and (iii) a third electric circuit, in which the second electrode and the third electrode are separated and electrically insulated from each other for enabling a differential in voltage at the second and third electrodes resulting from a differential in electric field strength experienced at the second and third electrodes when within the vicinity of the powerlines, the differential in voltage between the second electrode and the third electrode causing a current to flow through the third electric circuit for powering the device; and (c) locating the device within the vicinity of powerlines whereby a differential in voltage exists between at least two of the first, second, and third electrodes; (d) sensing data regarding voltage at the first, second, and third electrodes; (e) and based on the sensed voltage data and based on voltage and electric current specifications for powering the electrical load, establishing a particular one of a plurality of mutually exclusive electric circuits whereby electric current flows therethrough for powering the device.

In another aspect, a method for powering a device comprises the steps of: (a) providing a power supply unit adapted to generate electric power from differentials in electric field strength experienced within a vicinity of powerlines, the power supply unit comprising a plurality of separated electrodes; (b) electrically coupling the power supply unit with the device, comprising inserting the power supply unit into a bay of the device whereby electrical components electrically connected with the plurality of electrodes are configurable to establish, through the electrical coupling, a particular one of a plurality of plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set, wherein the subsets are interconnected in each electric circuit such that the one or more voltage differentials between the subsets causes a current to flow through the circuit for powering the device; (c) locating the device within the vicinity of powerlines whereby a differential in voltage exists between subsets of the plurality of electrodes; (d) sensing data regarding voltage differentials of the sets; and (e) based on the sensed voltage differentials and based on voltage and electric current specifications for powering the device, establishing a particular one of the plurality of different electric circuits whereby electric current flows therethrough for powering the device.

In another aspect, a method for powering a device from one or more differentials in electric field strength within a vicinity of powerlines comprises the steps of: (a) providing a device comprising (i) an external enclosure including one or more external walls; (ii) a power supply configured to generate electric power from a differential in electric field strength when the device is within a vicinity of powerlines, the power supply comprising first and second electrodes; (iii) wherein the one or more external walls comprise the first and second electrodes; and (iv) wherein the first and second electrodes are separated and electrically insulated from each other for enabling a differential in voltage at the first and second electrodes resulting from a differential in electric field strength experienced at the first and second electrodes when the device is within the vicinity of the powerlines; and (v) further comprising electrical components electrically connected with the first and second electrodes that establish an electric circuit, wherein a differential in voltage between the first and second electrodes causes electric current to flow through the electric circuit for powering the device; and (b) positioning the device within the vicinity of powerlines such that a differential in electric field strength experienced at the first and second electrodes creates a differential in voltage between the first and second electrodes and causes electric current to flow through the electric circuit and powers the device.

In a feature, the positioning comprises at least one of rotating or translating the device while in the vicinity of the powerlines for altering the voltage differential between the first and second electrodes.

In another feature, the method further comprises the step of detecting the voltage differential and ceasing said positioning when a particular voltage differential exists. The particular voltage differential may be determined as a function of voltage and current specifications for powering the device.

In another aspect, a method for powering a device from one or more differentials in electric field strength within a vicinity of powerlines comprises the steps of: (a) providing a device comprising (i) an external enclosure including one or more external walls; (ii) a power supply configured to generate electric power from a differential in electric field strength when the device is within a vicinity of powerlines, the power supply comprising first, second, and third electrodes that are separated and electrically insulated from each other for enabling (A) a differential in voltage at the first and second electrodes resulting from a differential in electric field strength experienced at the first and second electrodes when the device is within the vicinity of the powerlines; (B) a differential in voltage at the first and third electrodes resulting from a differential in electric field strength experienced at the first and third electrodes when the device is within the vicinity of the powerlines; and (C) a differential in voltage at the second and third electrodes resulting from a differential in electric field strength experienced at the second and third electrodes when the device is within the vicinity of the powerlines; and (ii) electrical components electrically connected with the first, second, and third electrodes and configurable to establish, in the alternative, each of (A) a first electric circuit, wherein a differential in voltage between the first and second electrodes causes electric current to flow through the electric circuit for powering the device; (B) a second electric circuit, wherein a differential in voltage between the first and third electrodes causes electric current to flow through the electric circuit for powering the device; and (C) a third electric circuit, wherein a differential in voltage between the second and third electrodes causes electric current to flow through the electric circuit for powering the device; (b) locating the device within the vicinity of powerlines whereby a differential in voltage exists between at least two of the first, second, and third electrodes; (c) detecting relative voltages at the first, second, and third electrodes; and (d) and based on the detected voltages and based on voltage and electric current specifications for powering the electrical load, configuring the electrical components to establish a particular one of the first, second, and third electric circuits such that electric current flows therethrough for powering the device.

In another aspect, a method for powering a device from one or more differentials in electric field strength within a vicinity of powerlines comprises the steps of: (a) providing a device comprising (i) an external enclosure including one or more external walls; (ii) a power supply configured to generate electric power from a differential in electric field strength when the device is within a vicinity of powerlines, the power supply comprising plurality of separated electrodes, wherein the one or more external walls comprise one or more of the plurality of electrodes; (iii) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced when the device is within the vicinity of the powerlines, wherein the subsets of the set are interconnected such that the one or more voltage differentials between the subsets causes a current to flow through the electric circuit of the set for powering the device; (b) locating the device within the vicinity of powerlines whereby a differential in voltage exists between at least two of the first, second, and third electrodes; (c) detecting voltage differentials of the sets; and (d) based on the detected voltage differentials of the sets and based on voltage and electric current specifications for powering the device, configuring one or more of the electrical components to establish one of the plurality of different electric circuits for powering the device.

In an aspect of the invention, a UAV in which electric power is generated from a differential in electric field strength within a vicinity of powerlines comprises: (a) a first electrode having at least two overall substantial dimensions, a first of which is at least 80% of at least one of an overall heightwise extent, an overall lengthwise extent, and an overall widthwise extent of the apparatus, and a second of which is at least 80% of at least one of the overall heightwise extent, the overall lengthwise extent, and the overall widthwise extent of the apparatus; and (b) a second electrode having at least two overall substantial dimensions, a first of which is at least 80% of at least one of the overall heightwise extent, the overall lengthwise extent, and the overall widthwise extent of the apparatus, and a second of which is at least 80% of at least one of the overall heightwise extent, the overall lengthwise extent, and the overall widthwise extent of the apparatus; (c) wherein the first and second electrodes are separated and electrically insulated from each other for enabling a differential in voltage at the first and second electrodes resulting from a differential in electric field strength experienced at the first and second electrodes when within the vicinity of the powerlines; and (d) further comprising electrical components electrically connected with the first and second electrodes that establish an electric circuit, with the differential in voltage between the first and second electrodes causing a current to flow through the circuit for powering an electrical load of the electric circuit.

In a feature of this aspect, the electrical components comprise a plurality of electric-field shielded capacitors configurable in different arrangements in the electric circuit for selectively changing current and voltage characteristics of the electric circuit for powering the electrical load of the electric circuit.

In a feature, the electrical load comprises a rechargeable battery of the UAV.

In a feature, the electrical load comprises a propulsion system of the UAV.

In a feature, the electrical load comprises a navigation system of the UAV.

In a feature, the electrical load comprises an electric motor of the UAV.

In a feature, the electrical load comprises a camera of the UAV.

In a feature, the electrical load comprises a transceiver of the UAV.

In a feature, the electric-field shielded capacitors are configurable through switches.

In a feature, one of the different arrangements of the electric-field shielded capacitors comprises capacitors arranged in series; another one of the different arrangements of the electric-field shielded capacitors comprises capacitors arranged in parallel; and another one of the different arrangements of the electric-field shielded capacitors comprises capacitors arranged in both series and parallel.

In a feature, each electrode comprises a metallic plate.

In another aspect, a UAV in which electric power is generated for an electrical load from a differential in electric field strength within a vicinity of powerlines comprises: (a) a plurality of electrodes comprising first, second, and third electrodes separated and electrically insulated from one another for enabling differentials in voltage at the first, second, and third electrodes resulting from differentials in electric field strength experienced at the first, second, and third electrodes when within the vicinity of the powerlines; (b) electrical components electrically connected with the first, second, and third electrodes, at least one or more of the electrical components being configurable to establish each of (i) a first electric circuit, wherein the differential in voltage between the first electrode and the second electrode causes a current to flow through the first electric circuit for powering an electrical load; (ii) a second electric circuit, wherein the differential in voltage between the first electrode and the third electrode causes a current to flow through the second electric circuit for powering the electrical load; and (iii) a third electric circuit, wherein the differential in voltage between the second electrode and the third electrode causes a current to flow through the third electric circuit for powering the electrical load; (c) a control assembly comprising (i) one or more voltage-detector components configured to detect voltage of the first, second, and third electrodes; and (ii) a processor enabled to configure—based on the detected voltages and based on voltage and electric current specifications for powering the electrical load—one or more of the electrical components to establish one of the first electric circuit, the second electric circuit, and the third electric circuit for powering the electrical load.

In another feature, the electrical components comprise a plurality of electric-field shielded capacitors configurable in different arrangements in the electric circuit for selectively changing current and voltage characteristics of the electric circuit for powering the electrical load of the electric circuit, and wherein the control assembly is enabled to configure the capacitors into one of the different arrangements in establishing an electric circuit for powering the electrical load.

In another feature, the UAV further comprises a battery by which the control assembly is powered. The battery may power only the control assembly; the battery may not power the electrical load of the electric circuit; and the battery may be rechargeable, wherein the electrical load of the electric circuit comprises the battery for recharging the battery.

In another feature, the voltage and electric current specifications of the electrical load are stored in a non-transitory computer-readable medium of the UAV for access by the processor.

In another feature, the control assembly configures one or more of the electrical components to establish one of the first, second, and third electric circuits on a recurring basis when the UAV is in the vicinity of the powerlines.

In another feature, the control assembly configures one or more of the electrical components to establish one of the first, second, and third electric circuits on a recurring basis as the UAV flies while in the vicinity of the powerlines.

In another aspect, a UAV in which electric power is generated for an electrical load from one or more differentials in electric field strength in a vicinity of powerlines comprises: (a) a plurality of separated electrodes; (b) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced when the UAV is within the vicinity of the powerlines, wherein the subsets of the set are interconnected such that the one or more voltage differentials between the subsets causes a current to flow through the electric circuit of the set for powering the electrical load; and (c) a control assembly comprising (i) one or more voltage-detector components configured to detect voltage differentials of the sets; and (ii) a processor enabled to process the detected voltage differentials and—based thereon and based on voltage and electric current specifications for powering the electrical load—configure one or more of the electrical components in order to establish one of the plurality of different electric circuits for powering the electrical load.

In a feature, the control assembly configures one or more of the electrical components in order to establish one of the plurality of different electric circuits for powering the electrical load on a recurring basis when the UAV is in the vicinity of the powerlines.

In a feature, the control assembly configures one or more of the electrical components in order to establish one of the plurality of different electric circuits for powering the electrical load on a recurring basis when the UAV moves while in the vicinity of the powerlines.

In a feature, a plurality of the subsets of electrodes are electrically connected in series in at least one of the plurality of different electric circuits.

In a feature, a plurality of the subsets of electrodes are electrically connected so as to form a plurality of capacitors arranged in series in at least one of the plurality of different electric circuits.

In a feature, a plurality of the subsets of electrodes are electrically connected so as to form a plurality of capacitors arranged in parallel in at least one of the plurality of different electric circuits.

In a feature, a subset comprises electrodes electrically connected in parallel in at least one of the plurality of different electric circuits.

In a feature, an area of the plurality of electrodes in at least one of the plurality of different electric circuits is less than or equal to 50% of an area of the set of electrodes in at least one other of the plurality of different electric circuits.

In a feature, an area of the plurality of electrodes in at least one of the plurality of different electric circuits is less than or equal to 25% of an area of the set of electrodes in at least one other of the plurality of different electric circuits.

In a feature, an area of the plurality of electrodes in at least one of the plurality of different electric circuits is less than or equal to 10% of an area of the set of electrodes in at least one other of the plurality of different electric circuits.

In another aspect, a UAV comprises: (a) one or more electrical components; and (b) a power supply unit; (c) wherein the UAV defines a bay configured to removably receive the power supply unit for electrical coupling with the UAV, by which electrical coupling electric current is provided to the UAV by the power supply unit; (d) wherein the power supply unit is configured to generate electric power from a differential in electric field strength when the power supply unit is received in the bay, electrically coupled with the UAV, and within a vicinity of powerlines; and (e) wherein the power supply unit comprises (i) a first electrode having at least two overall substantial dimensions, a first of which is at least 80% of at least one of an overall heightwise extent, an overall lengthwise extent, and an overall widthwise extent of the apparatus, and a second of which is at least 80% of at least one of the overall heightwise extent, the overall lengthwise extent, and the overall widthwise extent of the apparatus; and (ii) a second electrode having at least two overall substantial dimensions, a first of which is at least 80% of at least one of the overall heightwise extent, the overall lengthwise extent, and the overall widthwise extent of the apparatus, and a second of which is at least 80% of at least one of the overall heightwise extent, the overall lengthwise extent, and the overall widthwise extent of the apparatus; (iii) wherein the first and second electrodes are separated and electrically insulated from each other for enabling a differential in voltage at the first and second electrodes resulting from a differential in electric field strength experienced at the first and second electrodes when within the vicinity of the powerlines; and (f) further comprising electrical components electrically connected with the first and second electrodes that establish an electric circuit with one or more electrical components of the UAV when the power supply unit is received in the bay and electrically coupled with the UAV, wherein the differential in voltage between the first and second electrodes causes electric current to flow through the electric circuit for powering the UAV.

In another aspect, a UAV comprises: (a) one or more electrical components; and (b) a power supply unit; (c) wherein the UAV defines a bay configured to removably receive the power supply unit for electrical coupling with the UAV, by which electrical coupling electric current is provided to the UAV by the power supply unit; (d) wherein the power supply unit is configured to generate electric power from a differential in electric field strength when the power supply unit is received in the bay, electrically coupled with the UAV, and within a vicinity of powerlines; and (e) wherein the power supply unit comprises a plurality of electrodes comprising first, second, and third electrodes separated and electrically insulated from one another for enabling differentials in voltage at the first, second, and third electrodes resulting from differentials in electric field strength experienced at the first, second, and third electrodes when within the vicinity of the powerlines; (f) and wherein the UAV further comprises, when the power supply unit is electrically coupled with the UAV, (i) electrical components electrically connected with the first, second, and third electrodes, at least one or more of the electrical components being configurable to establish each of (A) a first electric circuit, wherein the differential in voltage between the first electrode and the second electrode causes a current to flow through the first electric circuit for powering the UAV; (B) a second electric circuit, wherein the differential in voltage between the first electrode and the third electrode causes a current to flow through the second electric circuit for powering the UAV; and (C) a third electric circuit, wherein the differential in voltage between the second electrode and the third electrode causes a current to flow through the third electric circuit for powering the UAV; (ii) one or more sensors configured to sense data regarding voltage of the first, second, and third electrodes; and (iii) a processor configured to process the sensed data and, based thereon and based on voltage and electric current specifications for powering the UAV, configure one or more of the electrical components to establish one of the first electric circuit, the second electric circuit, and the third electric circuit for powering the UAV.

In a feature, at least one of the at least one or more of the electrical components configurable to establish each of the first, second, and third electric circuits is located within the UAV and outside of the power supply unit.

In a feature, at least one of the one or more sensors configured to sense data regarding voltage of the first, second, and third electrodes is located within the UAV and outside of the power supply unit.

In a feature, the processor configured to process the sensed data and, based thereon and based on voltage and electric current specifications for powering the UAV, configure one or more of the electrical components to establish one of the first electric circuit, the second electric circuit, and the third electric circuit for powering the UAV is located within the UAV and outside of the power supply unit.

In a feature, at least one of the at least one or more of the electrical components configurable to establish each of the first, second, and third electric circuits is located within the power supply unit.

In a feature, at least one of the one or more sensors configured to sense data regarding voltage of the first, second, and third electrodes is located within the power supply unit.

In a feature, the processor configured to process the sensed data and, based thereon and based on voltage and electric current specifications for powering the UAV, configure one or more of the electrical components to establish one of the first electric circuit, the second electric circuit, and the third electric circuit for powering the UAV is located within the power supply unit.

In an aspect, a UAV comprises: (a) one or more electrical components; and (b) a power supply unit; (c) wherein the UAV defines a bay configured to removably receive the power supply unit for electrical coupling with the UAV, by which electrical coupling electric current is provided to the UAV by the power supply unit; (d) wherein the power supply unit is configured to generate electric power from a differential in electric field strength when the power supply unit is received in the bay, electrically coupled with the UAV, and within a vicinity of powerlines; (e) wherein the power supply unit comprises a plurality of separated electrodes; and (f) wherein the UAV further comprises, when the power supply unit is electrically coupled with the UAV, (i) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced when the UAV is within the vicinity of the powerlines, wherein the subsets of the set are interconnected such that the one or more voltage differentials between the subsets causes a current to flow through the electric circuit of the set for powering the UAV; (ii) one or more sensors configured to sense data regarding voltage differentials of the sets; and (iii) a processor configured to process the sensed data and, based thereon and based on voltage and electric current specifications for powering the UAV, configure one or more of the electrical components to establish one of the plurality of different electric circuits for powering the UAV.

In another aspect, a UAV comprise: (a) an external enclosure including one or more external walls; (b) a power supply configured to generate electric power from a differential in electric field strength when the UAV is within a vicinity of powerlines, the power supply comprising first and second electrodes; (c) wherein the one or more external walls of the enclosure comprise the first and second electrodes; and (d) wherein the first and second electrodes are separated and electrically insulated from each other for enabling a differential in voltage at the first and second electrodes resulting from a differential in electric field strength experienced at the first and second electrodes when the UAV is within the vicinity of the powerlines. The UAV also comprises electrical components electrically connected with the first and second electrodes that establish an electric circuit, wherein a differential in voltage between the first and second electrodes causes electric current to flow through the electric circuit for powering the UAV.

In a feature, the external enclosure comprises a housing, casing, or chassis.

In a feature, the UAV comprises a fixed-wing aircraft.

In a feature, the external enclosure comprises one or more wings.

In a feature, the external enclosure comprises one or more air foils.

In a feature, the external enclosure comprises a fuselage.

In a feature, the UAV comprises rotocraft.

In a feature, the UAV comprises quadcopter.

In a feature, the UAV comprises a hybrid aircraft including both a fixed wing, and a rotor providing lift.

In a feature, the one or more external walls comprise a plurality of planar walls, wherein a first of the planar walls comprises the first electrode and a second of the planar walls comprise the second electrode. The first electrode may be commensurate in extent with an external surface of the first planar wall, and the second electrode may be commensurate in extent with an external surface of the second planar wall. Additionally, the first electrode may be contained within the first planar wall and the second electrode may be contained within the second planar wall.

In a feature, the one or more external walls comprise a plurality of curved walls, wherein a first of the curved walls comprises the first electrode and a second of the curved walls comprises the second electrode. Furthermore, the first electrode may be commensurate with an external surface of the first planar wall, and the second electrode extends may be commensurate with an external surface of the second planar wall. Also, the first electrode may be contained within the first curved wall and the second electrode is contained within the second curved wall.

In another feature, the one or more external walls comprise a plurality of surfaces, wherein the first electrode comprises a first of the surfaces and the second electrode comprises a second of the surfaces. The first and second surfaces may be planar surfaces, curved surfaces, or a combination of both.

In a feature, a housing, casing, or chassis comprises the first and second surfaces.

In a feature, one or more wings comprise the first and second surfaces.

In a feature, one or more air foils comprise the first and second surfaces.

In a feature, the fuselage comprises the first and second surfaces.

In another aspect, a UAV comprises: (a) an external enclosure including one or more external walls; (b) a power supply configured to generate electric power from a differential in electric field strength when the UAV is within a vicinity of powerlines, the power supply comprising first, second, and third electrodes; (c) wherein the one or more external walls comprise the first, second, and third electrodes; and (d) wherein the first, second, and third electrodes are separated and electrically insulated from each other for enabling (i) a differential in voltage at the first and second electrodes resulting from a differential in electric field strength experienced at the first and second electrodes when the UAV is within the vicinity of the powerlines; (ii) a differential in voltage at the first and third electrodes resulting from a differential in electric field strength experienced at the first and third electrodes when the UAV is within the vicinity of the powerlines; and (iii) a differential in voltage at the second and third electrodes resulting from a differential in electric field strength experienced at the second and third electrodes when the UAV is within the vicinity of the powerlines. Furthermore, the UAV further comprises electrical components electrically connected with the first, second, and third electrodes and configurable to establish, in the alternative, each of (i) a first electric circuit, wherein a differential in voltage between the first and second electrodes causes electric current to flow through the electric circuit for powering the UAV; (ii) a second electric circuit, wherein a differential in voltage between the first and third electrodes causes electric current to flow through the electric circuit for powering the UAV; and (iii) a third electric circuit, wherein a differential in voltage between the second and third electrodes causes electric current to flow through the electric circuit for powering the UAV. The UAV also further comprises one or more voltage-detector components configured to detect voltages of the first, second, and third electrodes; and a controller configured to process the detected voltages data and to configure one or more of the electrical components based thereon and based on voltage and electric current specifications for powering the UAV, in order to establish one of the first electric circuit, the second electric circuit, and the third electric circuit for powering the UAV.

In a feature, the controller comprises a processor, a microcontroller, or an integrated circuit such as an application-specific integrated circuit (ASIC).

In a feature, the controller comprises software executable by the processor and non-transitory computer-readable memory.

In another aspect, a UAV comprises: (a) an external enclosure including one or more external walls; (b) a power supply configured to generate electric power from a differential in electric field strength when the UAV is within a vicinity of powerlines, the power supply comprising a plurality of separated electrodes, wherein the one or more external walls comprise one or more of the plurality of electrodes; (c) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced when the UAV is within the vicinity of the powerlines, wherein the subsets of the set are interconnected such that the one or more voltage differentials between the subsets causes a current to flow through the electric circuit of the set for powering the UAV; (d) one or more sensors configured to sense data regarding voltage differentials of the sets; and (e) a controller configured to process the sensed data and based thereon and based on voltage and electric current specifications for powering the UAV, configure one or more of the electrical components to establish one of the plurality of different electric circuits for powering the UAV.

In another aspect, a UAV in which electric power is generated within a vicinity of powerlines comprises: (a) an electrode; (b) an interface configured to engage in electrical contact a shield wire of the powerlines so as to define an electrical pathway to ground resulting in voltage differentials between the electrode and the shield wire; and (c) electrical components electrically connected with the electrode and the interface for causing a current to flow between the electrode and the shield wire for powering an electrical load as the electrode experiences electric field strengths of the powerlines.

In a feature, the interface is tethered to the UAV and is dragged along the shield wire behind the UAV as the UAV travels along the powerlines.

In another aspect, a UAV in which electric power is generated within a vicinity of powerlines comprises: (a) a plurality of electrodes; (b) an interface configured to engage in electrical contact a shield wire of the powerlines so as to define an electrical pathway to ground resulting in voltage differentials between the plurality of electrodes and the shield wire; and (c) electrical components electrically connected with the plurality of electrodes and with the interface and configurable for causing a current to flow between, in the alternative, (i) each of different subsets of the plurality of the electrodes and (ii) the shield wire, whereby the electrical load is powered as the plurality of electrodes experiences electric field strengths of the powerlines.

In a feature, the UAV further comprises a control assembly configured to detect voltage differentials between each of the electrodes and the shield wire, and to configure the one or more electrical components of the UAV to cause a current to flow between the one or more electrodes and the shield wire based on the detected voltage differentials and based on voltage and current specifications of the electrical load of the UAV to be powered.

In a feature, two or more of the electrodes are connected in series.

In a feature, a plurality of the subsets of electrodes are electrically connected so as to form a plurality of capacitors arranged in parallel in at least one of the plurality of different electric circuits.

In a feature, a subset comprises electrodes arranged in parallel in at least one of the plurality of different electric circuits.

In a feature, the UAV further comprises a battery by which the control assembly is powered. The battery may power only the control assembly; the battery may not power the electrical load of the UAV; and the battery may be rechargeable, and the electrical load of the UAV may comprise a rechargeable battery for charging a battery of the control assembly.

In a feature, the voltage and electric current specifications of the electrical load are stored in a non-transitory computer-readable medium of the UAV for access by the processor.

In a feature, the control assembly continually configures the one or more electrical components on a recurring basis as the UAV flies within the vicinity of the powerlines along and over the shield wire.

In a feature, the UAV further comprises a rechargeable battery for powering the UAV when the interface is out of electrical contact with the shield wire while flying along the powerlines.

In a feature, the UAV further comprises a rechargeable battery for powering the UAV when the UAV flies outside of the vicinity of the powerlines.

In another aspect, a UAV in which electric power is generated for an electrical load from one or more differentials in electric field strength in a vicinity of powerlines comprises: (a) a plurality of separated electrodes; (b) an interface configured to engage in electrical contact a shield wire of the powerlines so as to define an electrical pathway to ground; (c) electrical components electrically connected with the plurality of electrodes, (i) at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced when the UAV is within the vicinity of the powerlines, wherein the subsets of the set are interconnected such that the one or more voltage differentials between the subsets causes a current to flow through the electric circuit of the set for powering the electrical load; and (ii) at least one or more of the electrical components being configurable to cause a current to flow between one or more of the electrodes and the shield wire for powering the electrical load of the UAV; and (d) a control assembly comprising (i) one or more voltage-detector components configured to detect voltage differentials of the sets; and (ii) a processor enabled to process the detected voltage differentials and—based thereon and based on voltage and electric current specifications for powering the electrical load—configure one or more of the electrical components in order to establish one of the plurality of different electric circuits for powering the electrical load and cause a current to flow between one or more of the electrodes and the shield wire for powering the electrical load of the UAV.

In a feature, the processor of the control assembly is further enabled to shunt current in an established electric circuit.

In another aspect, a UAV in which electric power is generated for an electrical load from one or more differentials in electric field strength in a vicinity of powerlines comprises: (a) a plurality of separated electrodes; (b) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced when the UAV is within the vicinity of the powerlines, wherein the subsets of the set are interconnected such that the one or more voltage differentials between the subsets causes a current to flow through the electric circuit of the set for powering the electrical load; and (c) a control assembly comprising (i) one or more voltage-detector components configured to detect voltage differentials of the sets; and (ii) a processor enabled to process the detected voltage differentials and—based thereon and based on voltage and electric current specifications for powering the electrical load—configure one or more of the electrical components in order to establish one of the plurality of different electric circuits for powering the electrical load.

In a feature, the electrodes of the plurality of electrodes are symmetrically arranged about an axis of the UAV.

In a feature, the electrodes of the plurality of electrodes are symmetrically arranged about a center of the UAV.

In a feature, the electrodes are encased in a nonmetallic material.

In a feature, the electrodes are encased in a molded material.

In a feature, the electrodes are encased in a nonconducting polymer material.

In a feature, the electrodes are encased in a nonconducting plastic material. The plastic material may be a nonconducting thermoplastic material or a nonconducting thermosetting material.

In a feature, the plurality of electrodes is located in a block arrangement and define walls of the block.

In a feature, the electrodes each comprises a planar rectangular surface.

In a feature, the electrodes define inner surfaces of a block.

In a feature, the electrodes define outer surfaces of a block.

In a feature, the plurality of electrodes is located in an arrangement of nested blocks and defines walls of the blocks.

In a feature, the control assembly is located within an innermost block of nested blocks.

In a feature, the plurality of electrodes is located in a spherical arrangement and define wall of a sphere.

In a feature, the electrodes each comprises a planar surface.

In a feature, the electrodes each comprises a curved surface.

In a feature, the electrodes define an inner surface of a sphere.

In a feature, each electrode comprises a concave surface.

In a feature, the electrodes define an outer surface of a sphere.

In a feature, each electrode comprises a convex surface.

In a feature, a first pair of electrodes is located along a first axis, a second pair of electrodes is located along a second axis orthogonal to the first axis, and a third pair of electrodes is located along a third axis orthogonal to each of the first axis and the second axis. The first, second, and third pairs of electrodes may be arranged in a "jacks" formation; the first, second, and third axes may intersect at an origin point; and the origin point may represent a midpoint between the electrodes of the first pair, may represent a midpoint between the electrodes of the second pair; and may represent a midpoint between the electrodes of the third pair. Additionally, the electrodes of the first pair may be located a first distance apart; the electrodes of the second pair may be located a second distance apart; the electrodes of the third pair may be located a third distance apart; and the first, second, and third distances may or may not be equal in length. Moreover, each electrode of the first pair may be hemispheric or planar in shape.

In another feature, the plurality of electrodes is located in an arrangement of concentric spheres and defines walls of the spheres, and the control assembly may be located within an innermost sphere.

In an aspect of the invention, a method for providing power to a UAV, wherein the UAV comprises first and second electrodes that are separated and electrically insulated from each other for enabling a differential in voltage at the first and second electrodes resulting from a differential in electric field strength experienced at the first and second electrodes, the method comprising the steps of: (a) positioning the UAV within a vicinity of powerlines such that the first and second electrodes experience a differential in electric field strength at the first and second electrodes; and (b) establishing a circuit including the first and second electrodes such that an electric current flows through the circuit for powering an electrical load of the UAV.

In a feature, the step of establishing the circuit comprises configuring in one of a plurality of different arrangements a plurality of electric-field shielded capacitors forming part of the electric circuit for powering the electrical load of the electric circuit, each of the different arrangements providing a different overall capacitance to the electric circuit. One of the different arrangements of the electric-field shielded capacitors may comprise capacitors arranged in series; another one of the different arrangements of the electric-field shielded capacitors may comprise capacitors arranged in parallel; and another one of the different arrangements of the electric-field shielded capacitors may comprise capacitors arranged in both series and parallel.

In a feature, the powerlines carry alternating electric current.

In a feature, the step of positioning the UAV comprises flying the UAV within the vicinity of the powerlines.

In a feature, the step of positioning the UAV comprises landing the UAV within the vicinity of the powerlines.

In a feature, the step of establishing the circuit comprises actuating a switch to close the circuit when the UAV is within the vicinity of the powerlines.

In a feature, the electrical load comprises a rechargeable battery of the UAV.

In a feature, the electrical load comprises a propulsion system of the UAV.

In a feature, the electrical load comprises a navigation system of the UAV.

In a feature, the electrical load comprises an electric motor of the UAV.

In a feature, the electrical load comprises a camera of the UAV.

In a feature, the electrical load comprises a transceiver of the UAV.

In another aspect, a method for generating electric power for an electrical load from a differential in electric field strength within a vicinity of powerlines comprises the steps of: (a) providing a UAV having first, second, and third electrodes; (b) positioning the UAV within the vicinity of powerlines such that the first, second, and third electrodes experience differentials in electric field strength with resulting differentials in voltage at two or more of the first, second, and third electrodes; (c) detecting relative voltages at the first, second, and third electrodes; and (d) establishing a particular one of a plurality of mutually exclusive electric circuits each comprising a pair of electrodes, the plurality of mutually exclusive electric circuits comprising (i) a first electric circuit, in which the first electrode and the second electrode are separated and electrically insulated from each other for enabling a differential in voltage at the first and second electrodes resulting from a differential in electric field strength experienced at the first and second electrodes when within the vicinity of the powerlines, the differential in voltage between the first electrode and the second electrode causing a current to flow through the first electric circuit for powering the electrical load; (ii) a second electric circuit, in which the first electrode and the third electrode are separated and electrically insulated from each other for enabling a differential in voltage at the first and third electrodes resulting from a differential in electric field strength experienced at the first and third electrodes when within the vicinity of the powerlines, the differential in voltage between the first electrode and the third electrode causing a current to flow through the second electric circuit for powering the electrical load; and (iii) a third electric circuit, in which the second electrode and the third electrode are separated and electrically insulated from each other for enabling a differential in voltage at the second and third electrodes resulting from a differential in electric field strength experienced at the second and third electrodes when within the vicinity of the powerlines, the differential in voltage between the second electrode and the third electrode causing a current to flow through the third electric circuit for powering the electrical load; (e) wherein the particular one of the plurality of mutually exclusive electric circuits is established as a function of the detected voltages and based on voltage and electric current specifications for powering the electrical load.

In a feature, a processor is enabled to configure each of the plurality of mutually exclusive electric circuits as a function of the detected voltages and of the voltage and electric current specifications for powering the electrical load.

In a feature, the method further comprises again detecting voltage differentials at the subsets of the plurality of electrodes and—as a function thereof and of the voltage and electric current specifications for powering the electrical load—establishing another particular one of the plurality of different electric circuits.

In a feature, the method further comprises again detecting voltage differentials at the subsets of the plurality of electrodes when moving the subsets of the plurality of electrodes while in the vicinity of the powerlines and—as a function thereof and of the voltage and electric current specifications for powering the electrical load—establishing another particular one of the plurality of different electric circuits.

In another aspect, a method for generating electric power for an electrical load of a UAV from one or more differentials in electric field strength within a vicinity of powerlines, the UAV having a plurality of separated electrodes within the vicinity of powerlines, comprises the steps of: (a) positioning the UAV within the vicinity of powerlines such that the plurality of separated electrodes experience differentials in electric field strength with resulting differentials in voltage at the electrodes; and (b) establishing a particular one of a plurality of different electric circuits, each of the different electric circuits comprising a set of two or more mutually exclusive subsets of the plurality of electrodes, the electrodes in each subset that have more than one electrode being electrically connected with each other for avoiding any voltage differential therebetween, and the one or more electrodes of each subset being electrically insulated from each electrode of any other subset of the set for enabling one or more voltage differentials between the subsets of the set, wherein the subsets are interconnected in each electric circuit such that the one or more voltage differentials therebetween causes a current to flow through the electric circuit for powering the electrical load; and (c) further comprising detecting voltage differentials of the sets, wherein the particular one of the plurality of different electric circuits is established as a function of the detected voltage differentials and electric current specifications for powering the electrical load.

In a feature of this aspect, the method further comprises again detecting voltage differentials at the subsets of the plurality of electrodes and—as a function thereof and of the voltage and electric current specifications for powering the electrical load—establishing another particular one of the plurality of different electric circuits.

In a feature of this aspect, the method further comprises again detecting voltage differentials at the subsets of the plurality of electrodes while flying the UAV along the powerlines and—as a function thereof and of the voltage and electric current specifications for powering the electrical load—establishing another particular one of the plurality of different electric circuits.

In another aspect, a method for powering a UAV comprises the steps of: (a) providing a power supply unit adapted to generate electric power from a differential in electric field strength within a vicinity of powerlines, the power supply unit comprising (i) a first electrode having at least two overall substantial dimensions, a first of which is at least 80% of at least one of an overall heightwise extent, an overall lengthwise extent, and an overall widthwise extent of the UAV, and a second of which is at least 80% of at least one of the overall heightwise extent, the overall lengthwise extent, and the overall widthwise extent of the UAV; and (ii) a second electrode having at least two overall substantial dimensions, a first of which is at least 80% of at least one of the overall heightwise extent, the overall lengthwise extent, and the overall widthwise extent of the UAV, and a second of which is at least 80% of at least one of the overall heightwise extent, the overall lengthwise extent, and the overall widthwise extent of the UAV; (iii) wherein the first and second electrodes are separated and electrically insulated from each other for enabling a differential in voltage at the first and second electrodes resulting from a differential in electric field strength experienced at the first and second electrodes when within the vicinity of the powerlines; (b)

electrically coupling the power supply unit with the UAV, comprising inserting the power supply unit into a bay of the UAV, whereby electrical components of the power supply electrically connected with the first and second electrodes establish an electric circuit with one or more electrical components of the UAV through the electrical coupling; and (c) locating the UAV within the vicinity of powerlines such that a differential in voltage between the first and second electrodes causes electric current to flow through the electric circuit for powering the UAV.

In an aspect, a method for powering a UAV, comprises the steps of: (a) providing a power supply unit adapted to generate electric power from a differential in electric field strength within a vicinity of powerlines; (b) electrically coupling the power supply unit with the UAV, comprising inserting the power supply unit into a bay of the UAV, whereby electrical components electrically connected with the first, second, and third electrodes are configurable to establish, through the electrical coupling, a particular one of a plurality of mutually exclusive electric circuits each comprising a pair of electrodes, the plurality of mutually exclusive electric circuits comprising (i) a first electric circuit, in which the first electrode and the second electrode are separated and electrically insulated from each other for enabling a differential in voltage at the first and second electrodes resulting from a differential in electric field strength experienced at the first and second electrodes when within the vicinity of the powerlines, the differential in voltage between the first electrode and the second electrode causing a current to flow through the first electric circuit for powering the UAV; (ii) a second electric circuit, in which the first electrode and the third electrode are separated and electrically insulated from each other for enabling a differential in voltage at the first and third electrodes resulting from a differential in electric field strength experienced at the first and third electrodes when within the vicinity of the powerlines, the differential in voltage between the first electrode and the third electrode causing a current to flow through the second electric circuit for powering the UAV; and (iii) a third electric circuit, in which the second electrode and the third electrode are separated and electrically insulated from each other for enabling a differential in voltage at the second and third electrodes resulting from a differential in electric field strength experienced at the second and third electrodes when within the vicinity of the powerlines, the differential in voltage between the second electrode and the third electrode causing a current to flow through the third electric circuit for powering the UAV; and (c) locating the UAV within the vicinity of powerlines whereby a differential in voltage exists between at least two of the first, second, and third electrodes; (d) sensing data regarding voltage at the first, second, and third electrodes; (e) and based on the sensed voltage data and based on voltage and electric current specifications for powering the electrical load, establishing a particular one of a plurality of mutually exclusive electric circuits whereby electric current flows therethrough for powering the UAV.

In another aspect, a method for powering a UAV comprises the steps of: (a) providing a power supply unit adapted to generate electric power from differentials in electric field strength experienced within a vicinity of powerlines, the power supply unit comprising a plurality of separated electrodes; (b) electrically coupling the power supply unit with the UAV, comprising inserting the power supply unit into a bay of the UAV whereby electrical components electrically connected with the plurality of electrodes are configurable to establish, through the electrical coupling, a particular one of a plurality of plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set, wherein the subsets are interconnected in each electric circuit such that the one or more voltage differentials between the subsets causes a current to flow through the circuit for powering the UAV; (c) locating the UAV within the vicinity of powerlines whereby a differential in voltage exists between subsets of the plurality of electrodes; (d) sensing data regarding voltage differentials of the sets; and (e) based on the sensed voltage differentials and based on voltage and electric current specifications for powering the UAV, establishing a particular one of the plurality of different electric circuits whereby electric current flows therethrough for powering the UAV.

In another aspect, a method for powering a UAV from one or more differentials in electric field strength within a vicinity of powerlines comprises the steps of: (a) providing a UAV comprising (i) an external enclosure including one or more external walls; (ii) a power supply configured to generate electric power from a differential in electric field strength when the UAV is within a vicinity of powerlines, the power supply comprising first and second electrodes; (iii) wherein the one or more external walls comprise the first and second electrodes; and (iv) wherein the first and second electrodes are separated and electrically insulated from each other for enabling a differential in voltage at the first and second electrodes resulting from a differential in electric field strength experienced at the first and second electrodes when the UAV is within the vicinity of the powerlines; and (v) further comprising electrical components electrically connected with the first and second electrodes that establish an electric circuit, wherein a differential in voltage between the first and second electrodes causes electric current to flow through the electric circuit for powering the UAV; and (b) positioning the UAV within the vicinity of powerlines such that a differential in electric field strength experienced at the first and second electrodes creates a differential in voltage between the first and second electrodes and causes electric current to flow through the electric circuit and powers the UAV.

In a feature of this aspect, the step of positioning comprises at least one of rotating or translating the UAV while in the vicinity of the powerlines for altering the voltage differential between the first and second electrodes. Furthermore, the method may also further comprise detecting the voltage differential and ceasing the positioning when a particular voltage differential exists; the particular voltage differential may be determined as a function of voltage and current specifications for powering the UAV.

In another aspect, a method for powering a UAV from one or more differentials in electric field strength within a vicinity of powerlines comprises the steps of: (a) providing a UAV comprising (i) an external enclosure including one or more external walls; (ii) a power supply configured to generate electric power from a differential in electric field strength when the UAV is within a vicinity of powerlines, the power supply comprising first, second, and third electrodes that are separated and electrically insulated from each other for enabling (A) a differential in voltage at the first and second electrodes resulting from a differential in electric field strength experienced at the first and second electrodes when the UAV is within the vicinity of the powerlines; (B) a differential in voltage at the first and third electrodes resulting from a differential in electric field strength experienced at the first and third electrodes when the UAV is within the vicinity of the powerlines; and (C) a differential in voltage at the second and third electrodes resulting from a differential in electric field strength experienced at the second and third electrodes when the UAV is within the vicinity of the powerlines; and (ii) electrical components electrically connected with the first, second, and third electrodes and configurable to establish, in the alternative, each of (A) a first electric circuit, wherein a differential in voltage between the first and second electrodes causes electric current to flow through the electric circuit for powering the UAV; (B) a second electric circuit, wherein a differential in voltage between the first and third electrodes causes electric current to flow through the electric circuit for powering the UAV; and (C) a third electric circuit, wherein a differential in voltage between the second and third electrodes causes electric current to flow through the electric circuit for powering the UAV; (b) locating the UAV within the vicinity of powerlines whereby a differential in voltage exists between at least two of the first, second, and third electrodes; (c) detecting relative voltages at the first, second, and third electrodes; and (d) and based on the detected voltages and based on voltage and electric current specifications for powering the electrical load, configuring the electrical components to establish a particular one of the first, second, and third electric circuits such that electric current flows therethrough for powering the UAV.

In another aspect, a method for powering a UAV from one or more differentials in electric field strength within a vicinity of powerlines comprises the steps of: (a) providing a UAV comprising (i) an external enclosure including one or more external walls; (ii) a power supply configured to generate electric power from a differential in electric field strength when the UAV is within a vicinity of powerlines, the power supply comprising plurality of separated electrodes, wherein the one or more external walls comprise one or more of the plurality of electrodes; (iii) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced when the UAV is within the vicinity of the powerlines, wherein the subsets of the set are interconnected such that the one or more voltage differentials between the subsets causes a current to flow through the electric circuit of the set for powering the UAV; (b) locating the UAV within the vicinity of powerlines whereby a differential in voltage exists between at least two of the first, second, and third electrodes; (c) detecting voltage differentials of the sets; and (d) based on the detected voltage differentials of the sets and based on voltage and electric current specifications for powering the UAV, configuring one or more of the electrical components to establish one of the plurality of different electric circuits for powering the UAV.

In an aspect of the invention, a charging station for charging of a UAV within a vicinity of powerlines comprises: (a) an interface for electric coupling with the UAV for charging of a rechargeable battery of the UAV; (b) a power supply comprising first and second electrodes separated and electrically insulated from each other for enabling a differential in voltage at the first and second electrodes resulting from a differential in electric field strength experienced at the first and second electrodes when within the vicinity of the powerlines; and (c) electrical components electrically connected with the first and second electrodes and configured to establish a circuit with the rechargeable battery of the UAV when electronically coupled with the interface, wherein the differential in voltage between the first and second electrodes causes electric current to flow through the electric circuit for charging the battery of the UAV.

In a feature of this aspect, the charging station is mounted to a support structure of the powerlines.

In another feature, the charging station is mounted to a tower of the powerlines.

In a feature, the charging station further comprises a platform for landing of a UAV for charging.

In a feature, the charging station further comprises one or more platforms for supporting multiple UAVs for charging.

In a feature, the interface projects outwardly from the power supply and is configured to couple with a UAV for charging while the UAV is hovering.

In another aspect, a charging station for charging, within a vicinity of powerlines, UAVs having rechargeable batteries with different voltage and current specifications, comprises: (a) a plurality of different interfaces each for electric coupling with a UAV for charging of a rechargeable battery of the UAV, each different interface corresponding to different voltage and current specifications; (b) a power supply comprising a plurality of electrodes and electrical components electrically connected with the plurality of electrodes and configurable to establish each of a plurality of electric circuits, each of the electric circuits comprising one of the plurality of the interfaces and a set of two or more mutually exclusive subsets of the plurality of electrodes, the electrodes in each subset that have more than one electrode being electrically connected with each other for avoiding any voltage differential therebetween, and the one or more electrodes of each subset being electrically insulated from each electrode of any other subset of the set for enabling one or more voltage differentials between the subsets of the set, wherein the subsets are interconnected in each particular electric circuit such that the one or more voltage differentials therebetween causes a current to flow through the particular electric circuit for charging through the interface the rechargeable battery; and (c) a control assembly comprising a processor enabled to configure one or more of the electrical components to establish a particular one of the electric circuits based on the voltage and current specifications of the interface with which a UAV is electrically coupled for charging, whereby the charging station is able to charge UAVs having rechargeable batteries with different voltage and current specifications.

In another aspect, a charging station for charging within a vicinity of powerlines UAVs having a rechargeable battery comprises: (a) an interface for electric coupling with a UAV for charging of a rechargeable battery thereof; (b) a power supply comprising a plurality of electrodes and electrical components electrically connected with the plurality of electrodes and configurable to establish each of a plurality of electric circuits, each of the electric circuits comprising the interface and a set of two or more mutually exclusive subsets of the plurality of electrodes, the electrodes in each subset that have more than one electrode being electrically connected with each other for avoiding any voltage differential therebetween, and the one or more electrodes of each subset being electrically insulated from each electrode of any other subset of the set for enabling one or more voltage differentials between the subsets of the set, wherein the subsets are interconnected in each particular electric circuit such that the one or more voltage differentials therebetween causes a current to flow through the particular electric circuit for charging through the interface the rechargeable battery; and (c) a control assembly comprising a processor enabled to configure one or more of the electrical components to establish a particular one of the electric circuits based on the voltage and current specifications of the rechargeable battery; whereby the charging station is able to charge UAVs having rechargeable batteries with different voltage and current specifications.

In a feature, the charging station further comprises a transceiver by which the control assembly receives from the UAV information identifying to the charging station the voltage and current specifications of the rechargeable battery of the UAV to be charged.

In a feature, the charging station further comprises a sensor operatively connected with the control assembly for identifying the voltage and current specifications of the rechargeable battery of the UAV to be charged. The sensor may comprise a camera, a barcode scanner, an RFID reader, and combinations thereof.

In another aspect, a charging station for charging of a UAV within a vicinity of powerlines comprises: an interface for electric coupling with the UAV for charging of a rechargeable battery of the UAV, the interface comprising two terminals; a power supply comprising a set of one or more electrodes; and electrical components electrically connected with the set and configured to establish an electrical pathway from one or more of the electrodes of the set and one of the two terminals of the interface, wherein the other of the terminals of the interface is connected to an electrical pathway to ground, whereby a differential in voltage between the set and ground causes an electric current to flow for charging the battery of the UAV when a UAV is electrically coupled with the interface.

In a feature, the charging station is mounted to a support structure of the powerlines and the electrical pathway to ground comprises an electrical connection to a ground of the support structure.

In another feature, the charging station is mounted to a support structure of the powerlines and the electrical pathway to ground comprises an electrical connection to a shield wire.

In another aspect, a charging station for charging of a UAV within a vicinity of powerlines comprises: (a) an interface for electric coupling with the UAV for charging of a rechargeable battery of the UAV, the interface comprising two terminals; (b) a power supply comprising a set of one or more electrodes; and (c) electrical components electrically connected with the set and configured to establish an electric pathway from one or more of the electrodes of the set and one of the two terminals of the interface, wherein the other of the terminals of the interface is connected to an electric pathway to ground, whereby a differential in voltage between the set and ground causes an electric current to flow for charging the battery of the UAV when a UAV is electrically coupled with the interface.

In a feature, the charging station is mounted to a support structure of the powerlines and the electric pathway to ground comprises an electrical connection to a ground of the support structure.

In another aspect, a power strip for powering a device within a vicinity of powerlines comprises: (a) a housing having an outlet for receiving a plug of a device for powering of the device, the outlet comprising two terminals; (b) a set of one or more electrodes contained within the housing; and (c) electrical components contained within the housing and electrically connected with the set and configured to establish an electric pathway from one or more of the electrodes of the set and one of the two terminals of the outlet, wherein the other of the terminals of the outlet is connected to an electric pathway to ground, whereby a differential in voltage between the set and ground causes an electric current to flow for powering an object when plugged into the outlet and electrically coupled with the one or more electrodes of the set and ground.

In a feature, the power strip is mounted to a support structure of the powerlines and the electric pathway to ground comprises an electrical connection to a ground of the support structure.

In a feature, the power strip is mounted to a support structure of the powerlines and the electric pathway to ground comprises an electrical connection to a shield wire.

In a feature, the housing comprises a plurality of outlets each having two terminals, and wherein the electrical components are further configured to establish an electric pathway from one or more of the electrodes of the set and one of the two terminals of each outlet, wherein the other of the terminals of each outlet is connected to an electric pathway to ground, whereby a differential in voltage between the set and ground causes an electric current to flow for powering an object when a plug of the object is electrically coupled with one of the outlets. Each outlet preferably has a different physical configuration for receiving a plug of a device, with each different configuration corresponding to a different voltage and current specification.

In another aspect, a method of a charging a UAV within a vicinity of powerlines comprises the steps of: (a) providing a charging station comprising: (i) an interface for electric coupling with the UAV for charging of a rechargeable battery of the UAV; (ii) a power supply comprising first and second electrodes separated and electrically insulated from each other for enabling a differential in voltage at the first and second electrodes resulting from a differential in electric field strength experienced at the first and second electrodes when within the vicinity of the powerlines; and (iii) electrical components electrically connected with the first and second electrodes and configured to establish a circuit with the rechargeable battery of the UAV when electronically coupled with the interface; (b) locating the charging station within the vicinity of powerlines such that a differential in electric field strength is experienced at the first and second electrodes with a resulting voltage differential between the first and second electrodes; and (c) electrically coupling the interface with the UAV, wherein the differential in voltage between the first and second electrodes causes electric current to flow through the electric circuit for charging the rechargeable battery of the UAV.

In a feature, the step of locating the charging station within the vicinity of powerlines comprises mounting the charging station to a support structure of the powerlines.

In a feature, the step of locating the charging station within the vicinity of powerlines comprises mounting the charging station to a tower of the powerlines.

In a feature, the charging station comprises a platform for landing of a UAV for charging.

In a feature, the step of electrically coupling the interface with the UAV comprises electrically coupling the interface with the UAV while the UAV is hovering.

In another aspect, a method of charging within a vicinity of powerlines UAVs having rechargeable batteries with different voltage and current specifications comprises: (a) providing a charging station comprising (i) a plurality of different interfaces each for electric coupling with a UAV for charging of a rechargeable battery of the UAV, each different interface corresponding to different voltage and current specifications; (ii) a power supply comprising a plurality of electrodes and electrical components electrically connected with the plurality of electrodes and configurable to establish each of a plurality of electric circuits, each of the electric circuits comprising one of the plurality of interfaces and a set of two or more mutually exclusive subsets of the plurality of electrodes, the electrodes in each subset that have more than one electrode being electrically connected with each other for avoiding any voltage differential therebetween, and the one or more electrodes of each subset being electrically insulated from each electrode of any other subset of the set for enabling one or more voltage differentials between the subsets of the set, wherein the subsets are interconnected in each particular electric circuit such that the one or more voltage differentials therebetween causes a current to flow through the particular electric circuit for charging through the interface the rechargeable battery; and (iii) a control assembly comprising a processor enabled to configure one or more of the electrical components to establish a particular one of the electric circuits based on the voltage and current specifications of the interface with which a UAV is electrically coupled for charging; (b) locating the charging station within the vicinity of powerlines such that a differential in electric field strength is experienced at the plurality of electrodes with resulting voltage differentials; (c) electrically coupling a particular one of the interfaces with a UAV; and (d) establishing a particular one of the electric circuits based on the voltage and current specifications of the interface with which a UAV is electrically coupled for charging, wherein a voltage differential in the particular electric circuit causes electric current to flow through the electric circuit for charging the rechargeable battery of the UAV, whereby UAVs having rechargeable batteries with different voltage and current specifications can be charged.

In another aspect, a method of charging within a vicinity of powerlines UAVs having rechargeable batteries with different voltage and current specifications comprises: (a) providing a charging station comprising (i) an interface for electric coupling with a UAV for charging of a rechargeable battery thereof, each different interface Corresponding to different voltage and current specifications; (ii) a power supply comprising a plurality of electrodes and electrical components electrically connected with the plurality of electrodes and configurable to establish each of a plurality of electric circuits, each of the electric circuits comprising the interface and a set of two or more mutually exclusive subsets of the plurality of electrodes, the electrodes in each subset that have more than one electrode being electrically connected with each other for avoiding any voltage differential therebetween, and the one or more electrodes of each subset being electrically insulated from each electrode of any other subset of the set for enabling one or more voltage differentials between the subsets of the set, wherein the subsets are interconnected in each particular electric circuit such that the one or more voltage differentials therebetween causes a current to flow through the particular electric circuit for charging through the interface the rechargeable battery; and (iii) a control assembly comprising a processor enabled to configure one or more of the electrical components to establish a particular one of the electric circuits based on the voltage and current specifications of the interface with which a UAV is electrically coupled for charging; (b) locating the charging station within the vicinity of powerlines such that a differential in electric field strength is experienced at the plurality of electrodes with resulting voltage differentials; (c) electrically coupling a particular one of the interfaces with a UAV; (d) identifying the voltage and current specifications of the rechargeable battery of the UAV to be charged; and (e) establishing a particular one of the electric circuits based on the identified voltage and current specifications, wherein a voltage differential in the particular electric circuit causes electric current to flow through the electric circuit for charging the rechargeable battery of the UAV, whereby the charging station is able to charge UAVs having rechargeable batteries with different voltage and current specifications.

In a feature, the method further comprises a step of wirelessly receiving by which the control assembly, from the UAV, information by which is identified the voltage and current specifications of the rechargeable battery of the UAV to be charged.

In a feature, the method further comprises a step of identifying the voltage and current specifications of the rechargeable battery of the UAV to be charged comprises using a sensor. The sensor may comprise, for example, a camera; a barcode scanner; an RFID reader; and combinations thereof.

In an aspect, a method for powering an electrical load of a UAV, wherein the UAV comprises an electrode and an electrical pathway to ground, comprises the steps of: (a) operating the UAV within a vicinity of powerlines along a shield wire of the powerlines (i) such that the electrode experiences electric field strengths of the powerlines, and (ii) such that an interface engages in electrical contact a shield wire of the powerlines so as to define an electrical pathway to ground resulting in voltage differentials between the electrode and the shield wire; and (b) configuring one or more electrical components of the UAV that are connected with the electrode and the interface for causing a current to flow between the electrode and the shield wire for powering the electrical load of the UAV.

In a feature, the powerlines carry alternating electric current.

In a feature, the electrical load comprises a rechargeable battery of the UAV.

In a feature, the electrical load comprises a propulsion system of the UAV.

In a feature, the electrical load comprises a navigation system of the UAV.

In a feature, the electrical load comprises an electric motor of the UAV.

In a feature, the electrical load comprises a camera of the UAV.

In a feature, the electrical load comprises a transceiver of the UAV.

In another aspect, a method for powering an electrical load of a UAV, wherein the UAV comprises a plurality of electrodes and an electrical pathway to ground comprises the steps of: (a) flying the UAV within a vicinity of powerlines along a shield wire of the powerlines (i) such that the plurality of electrodes experiences electric field strengths of the powerlines, and (ii) such that an interface engages in electrical contact a shield wire of the powerlines so as to define an electrical pathway to ground resulting in voltage differentials between each of the plurality of electrodes and the shield wire; and (b) configuring one or more electrical components of the UAV that are connected with the plurality of electrodes and with the interface for causing a current to flow between one or more of the electrodes and the shield wire for powering the electrical load of the UAV.

In a feature, the method further comprises the step of detecting voltage differentials between each of the electrodes and the shield wire and configuring the one or more electrical components of the UAV to cause a current to flow between the one or more electrodes and the shield wire based on the detected voltage differentials and voltage and current specifications of the electrical load of the UAV to be powered.

In an aspect, a method for generating electric power for an electrical load of a UAV from one or more differentials in electric field strength within a vicinity of powerlines, the UAV having a plurality of separated electrodes within the vicinity of powerlines and an interface configured to engage in electrical contact a shield wire of the powerlines so as to define an electrical pathway to ground, comprises the steps of: (a) operating the UAV within the vicinity of powerlines along a shield wire of the powerlines such that the plurality of separated electrodes experience differentials in electric field strength with resulting differentials in voltage at the electrodes; and (b) detecting voltage differentials of the sets and, based on the detected voltage differentials and electric current specifications for powering the electrical load of the UAV, (i) establishing a particular one of a plurality of different electric circuits, each of the different electric circuits comprising a set of two or more mutually exclusive subsets of the plurality of electrodes, the electrodes in each subset that have more than one electrode being electrically connected with each other for avoiding any voltage differential therebetween, and the one or more electrodes of each subset being electrically insulated from each electrode of any other subset of the set for enabling one or more voltage differentials between the subsets of the set, wherein the subsets are interconnected in each electric circuit such that the one or more voltage differentials therebetween causes a current to flow through the electric circuit for powering the electrical load of the UAV; and (ii) configuring one or more electrical components of the UAV that are connected with the plurality of electrodes and with the interface for causing a current to flow between one or more of the electrodes and the shield wire for powering the electrical load of the UAV.

In other features, the UAV comprises one or more containment spaces or volumes extending between electrodes, the containment spaces each containing hydrogen gas or helium gas. The gas acts as an insulator and, if having a low density relative to air, provides a degree of lift to the UAV. The gas may be non-pressurized or may be pressurized in a containment space. If pressurized, the gas may further serve to buttress the walls of the containment space and provide and deliver mechanical strength to various structures. The gas further is heated in some embodiments, thereby providing increased degrees of lift/buoyancy to the UAV. Such heating may be accomplished through means such as spark gaps or resistive heaters utilizing voltage differentials and current flow between the electrodes. When such heating is employed, gases other than hydrogen and helium may be employed.

In another feature, the UAV comprises one or more containment spaces extending between electrodes, in which a vacuum is created and maintained; the vacuum acts as an insulator between the electrodes.

In another aspect, a device for measuring positional data regarding a powerline tower comprises: (a) a mounting component for mounting the device to a powerline tower; (b) a sensor component for measuring positional data regarding the powerline tower; and (c) a communication component for communicating information regarding the measured positional data regarding the powerline tower.

In a feature, the sensor component measures an inclination of the powerline tower. The inclination of the powerline tower that is measured by the sensor component preferably is an inclination of a suspension insulator of the powerline tower.

In a feature, the sensor component comprises camera.

In a feature, wherein the sensor component comprises an inclinometer, and the device may further comprise a three-axes accelerometer and a three-axes gyroscope.

In a feature, the sensor component comprises a three-axes accelerometer, and the device may further comprise an inclinometer or a three-axes gyroscope.

In a feature, the sensor component comprises a three-axes gyroscope, and the device may further comprise an inclinometer.

In a feature, the device further comprises a three-axes magnetometer.

In a feature, the device further comprises a battery for powering the device. The battery preferably is rechargeable.

In a feature, the battery is received within a compartment including terminals for electrically coupling with the battery, and wherein the battery is removable and replaceable.

In a feature, the device further comprises a plurality of solar cells for powering the device. The solar cells preferably charge a rechargeable battery, and the device is powered directly by the battery. Furthermore, one or more solar modules preferably comprise the plurality of solar cells.

In a feature, the device further comprises first and second electrodes separated and electrically insulated from each other for enabling a differential in voltage at the first and second electrodes resulting from a differential in electric field strength experienced at the first and second electrodes when within a vicinity of powerlines; and electrical components electrically connected with the first and second electrodes and configured to establish a circuit, wherein the differential in voltage between the first and second electrodes causes electric current to flow through the electric circuit for powering the device, including the sensor component and the communication component. The sensor component and the communication component may be directly powered by the electric circuit, or alternatively, the device further comprises a battery for powering the device, the electric circuit charges the battery, and the sensor component and the communication component are directly powered by the battery.

In a feature, the communications component comprises a transceiver for wireless communications.

In a feature, the communications component comprises a transceiver for cellular communications.

In a feature, the device further comprises: a plurality of separated electrodes; electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced when the device is within the vicinity of the powerlines, wherein the subsets of the set are interconnected such that the one or more voltage differentials between the subsets causes a current to flow through the electric circuit of the set for powering the device, including at least one of the sensor component and the communication component; and a control assembly comprising (i) one or more voltage-detector components configured to detect voltage differentials of the sets; and (ii) a processor enabled to process the detected voltage differentials and—based thereon and based on voltage and electric current specifications for powering the device—configure one or more of the electrical components in order to establish one of the plurality of different electric circuits for powering the device.

In a feature, the device further comprises: one or more of electrodes separated and electrically insulated from each other; and electrical components electrically connected with the one or more of electrodes and configured to establish an electrical pathway from one or more of the electrodes and an electrical pathway to ground, whereby a differential in voltage between the one or more of the electrodes and ground causes an electric current to flow for powering the device, including the sensor and the communication component.

In another aspect, a method for measuring positional data regarding a powerline tower comprises the steps of: (a) mounting a device to a powerline tower, the device comprising (i) a sensor component for measuring positional data regarding the powerline tower and (ii) a communication component for communicating information regarding the measured positional data regarding the powerline tower; (b) measuring positional data using the sensor component of the mounted device; and (c) using the communication component of the mounted device, communicating information regarding the positional data measured.

In a feature, communicating information regarding the positional data measured comprises sending a text message by the communication component.

In a feature, communicating information regarding the positional data measured comprises sending an email by the communication component.

In a feature, communicating information regarding the positional data measured comprises sending a communication to a server over the Internet.

In a feature, the communication is hopped successively along the powerline towers using the communication components of the mounted devices.

In another aspect, a method for measuring positional data regarding a powerline tower comprises the steps of: (a) mounting a device to a suspension insulator of a powerline tower, the device comprising (i) a sensor component for measuring positional data regarding the insulator of the powerline tower and (ii) a communication component for communicating information regarding the measured positional data regarding the insulator of the powerline tower; (b) measuring positional data regarding the insulator of the powerline tower using the sensor component of the mounted device; and (c) using the communication component of the mounted device, communicating information regarding the positional data measured.

In another aspect, a method for measuring positional data regarding a powerline tower comprises the steps of: (a) mounting a respective device to each suspension insulator of a powerline tower, each respective device comprising (i) a sensor component for measuring positional data regarding the insulator of the powerline tower and (ii) a communication component for communicating information regarding the measured positional data regarding the insulator of the powerline tower; (b) measuring positional data regarding the insulators of the powerline tower using the sensor components of the mounted devices; and (c) communicating information regarding the positional data measured using the communication components of the mounted devices.

In another aspect of the invention, a device for detecting a positional change of a powerline tower comprises: (a) a mounting component for mounting the device to a powerline tower; (b) a sensor component for detecting a change in inclination of the powerline tower; (c) a communication component for communicating an alert regarding a change in inclination of the powerline tower; (d) first and second electrodes separated and electrically insulated from each other for enabling a differential in voltage at the first and second electrodes resulting from a differential in electric field strength experienced at the first and second electrodes when within a vicinity of powerlines; and (e) electrical components electrically connected with the first and second electrodes and configured to establish a circuit, wherein the differential in voltage between the first and second electrodes causes electric current to flow through the electric circuit for powering the device, including the sensor and the communication component.

In a feature, the sensor component is directly powered by the electric circuit.

In a feature, the communication component is directly powered by a rechargeable battery.

In a feature, the electric circuit charges a rechargeable battery. The sensor component may be directly powered by the rechargeable battery, and the communication component may be directly powered by the rechargeable battery.

In a feature, the communications component comprises a transceiver for wireless communications.

In a feature, the communications component comprises a transceiver for cellular communications.

In a feature, the sensor component comprises an accelerometer.

In a feature, the sensor component comprises camera.

In another aspect, a device in which electric power is generated from a differential in electric field strength within a vicinity of powerlines comprises: (a) a mounting component for mounting the device to a powerline tower; (b) a sensor component for detecting a change in inclination of the powerline tower; (c) a communication component for communicating an alert regarding a change in inclination of the powerline tower; (d) a plurality of separated electrodes; (e) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced when the device is within the vicinity of the powerlines, wherein the subsets of the set are interconnected such that the one or more voltage differentials between the subsets causes a current to flow through the electric circuit of the set for powering the device, including at least one of the sensor component and the communication component; and (f) a control assembly comprising (i) one or more voltage-detector components configured to detect voltage differentials of the sets; and (ii) a processor enabled to process the detected voltage differentials and—based thereon and based on voltage and electric current specifications for powering the electrical load—configure one or more of the electrical components in order to establish one of the plurality of different electric circuits for powering the electrical load.

In another aspect, a power strip for powering a device within a vicinity of powerlines comprises: (a) a housing having an outlet for receiving a plug of a device for powering of the device, the outlet comprising two terminals; (b) a power supply comprising a set of electrodes contained within the housing; and (c) electrical components contained within the housing and electrically connected with the set and configured to establish an electric pathway from a first subset of one or more of the electrodes of the set and one of the two terminals of the outlet, and from the other of the two terminals of the outlet to a second subset of one or more of the electrodes of the set that are not part of the first subset, whereby a differential in voltage between the first subset and the second subset causes an electric current to flow for powering an object when plugged into and electrically coupled with the first and second subsets.

In a feature, the power strip is mounted to a support structure of the powerlines and the electric pathway to ground comprises an electrical connection to a ground of the support structure.

In a feature, the power strip is mounted to a support structure of the powerlines and the electric pathway to ground comprises an electrical connection to a shield wire.

In a feature, the housing comprises a plurality of outlets each having two terminals, and wherein the electrical components are further configured to establish an electric pathway from one or more of the electrodes of the set and one of the two terminals of each outlet, wherein the other of the terminals of each outlet is connected to an electric pathway to ground, whereby a differential in voltage between the set and ground causes an electric current to flow for powering an object when a plug of the object is electrically coupled with one of the outlets. Each outlet preferably has a different physical configuration for receiving a plug of a device, with each different configuration corresponding to a different voltage and current specification.

In another aspect, a method for detecting a positional change of a powerline tower in a power transmission system comprises a plurality of towers comprises the steps of: (a) mounting each of a plurality of devices respectively to each of the plurality of towers, each device of the plurality of devices comprising (i) a sensor component for detecting a change in inclination of a powerline tower; (ii) a communication component for communicating an alert regarding a change in inclination of the powerline tower; (iii) first and second electrodes separated and electrically insulated from each other for enabling a differential in voltage at the first and second electrodes resulting from a differential in electric field strength experienced at the first and second electrodes when within a vicinity of powerlines; and (iv) electrical components electrically connected with the first and second electrodes and configured to establish a circuit, wherein the differential in voltage between the first and second electrodes causes electric current to flow through the electric circuit; (b) powering at least one of the sensor component and the communication component in each respective device using the electric current flow through the electric circuit thereof; (c) using the sensor component of each mounted device, detecting by at least one of the sensor components a change with respect to inclination of one or more of the towers of the power transmission system; and (d) using the communication component of at least one of the mounted devices, communicating an alert regarding the detected change.

In a feature, the step of communicating an alert regarding the detected change comprises sending a text message by the communication component.

In a feature, the step of communicating an alert regarding the detected change comprises sending an email by the communication component.

In a feature, the step of communicating an alert regarding the detected change comprises sending a communication to a server over the Internet.

In a feature, the step of communicating an alert regarding the detected change comprises relaying a communication by communication components of a plurality of the devices arranged in sequence along one or more powerlines.

In a feature, detecting a change in inclination of a powerline tower by a respective device comprises detecting a change in inclination of the powerline tower to which the respective device is mounted.

In a feature, the step of detecting a change in inclination of a powerline tower by a respective device comprises detecting a change in inclination of a particular powerline tower near the powerline tower to which the respective device is mounted. The change in inclination may be detected using a camera with the particular powerline tower being within the view of the camera.

In another aspect, a device for detecting a positional change of a powerline tower comprises: (a) a mounting component for mounting the device to a powerline tower; (b) a sensor component for detecting a change in inclination of the powerline tower; (c) a communication component for communicating an alert regarding a change in inclination of the powerline tower; (d) one or more of electrodes separated and electrically insulated from each other; (e) electrical components electrically connected with the one or more of electrodes and configured to establish an electric pathway from one or more of the electrodes and an electric pathway to ground, whereby a differential in voltage between the one or more of the electrodes and ground causes an electric current to flow for powering the device, including the sensor and the communication component.

In a feature, the device is mounted to a support structure of the powerlines and the electric pathway to ground comprises an electrical connection to a ground of the support structure.

In another aspect, a method for detecting a positional change of a powerline tower in a power transmission system comprises a plurality of towers comprises the steps of: (a) mounting each of a plurality of devices respectively to each of the plurality of towers, each device of the plurality of devices comprising (i) a sensor component for detecting a change in inclination of a powerline tower; (ii) a communication component for communicating an alert regarding a change in inclination of the powerline tower; (iii) one or more electrodes separated and electrically insulated from each other; and (iv) electrical components electrically connected with the one or more electrodes and configured to establish a circuit including a pathway to ground, wherein a differential in voltage between the one or more electrodes and ground causes electric current to flow through the electric circuit for powering the sensor component and the communication component; (b) powering the sensor component and the communication component in each respective device using the electric current flow through the electric circuit thereof; (c) using the sensor component of each mounted device, detecting by at least one of the sensor components a change with respect to inclination of one or more of the towers of the power transmission system; and (d) using the communication component of at least one of the mounted devices, communicating an alert regarding the detected change.

In a feature, the alert is communicated by hopping the alert successively along the powerlines via communication components of the plurality of devices.

Still additional aspects and features are disclosed in any patent application, patent application publication, and granted patent that is incorporated by reference elsewhere herein.

In addition to the aforementioned aspects and features of the invention, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings.

FIG. 27 is the second side schematic view of the quadcopter 262, wherein the quadcopter is in a flight configuration.

FIG. 28 is a front schematic view of the quadcopter 262 in the flight configuration.

FIG. 29 is an exploded view of the quadcopter 262 seen in FIG. 25.

FIG. 30 is a front schematic view of a main housing of a UAV together with conduits in accordance with one or more embodiments of the invention.

FIG. 31 is a rear schematic view of the main housing and conduits.

FIG. 36a is a cross-sectional view of an alternative to the main housing seen in FIG. 36.

FIG. 37a is a cross-sectional view of an alternative to the main housing seen in FIG. 37.

FIG. 42 schematically illustrates a box-wing UAV in accordance with one or more embodiments of the invention.

FIG. 43 schematically illustrates an annular box-wing UAV in accordance with one or more embodiments of the invention.

FIG. 44 schematically illustrates a cylindrical-wing UAV in accordance with one or more embodiments of the invention.

FIG. 45 schematically illustrates a joined-wing UAV in accordance with one or more embodiments of the invention.

FIG. 46 schematically illustrates a flat annular-wing UAV in accordance with one or more embodiments of the invention.

FIG. 47 schematically illustrates a rhomboidal-wing UAV in accordance with one or more embodiments of the invention.

FIG. 48 schematically illustrates another annular box-wing UAV in accordance with one or more embodiments of the invention.

FIG. 49 schematically illustrates a triplane UAV in accordance with one or more embodiments of the invention.

FIG. 50 schematically illustrates a quadruplane UAV in accordance with one or more embodiments of the invention.

FIG. 51 schematically illustrates a multiplane UAV in accordance with one or more embodiments of the invention.

FIG. 52 schematically illustrates a biplane UAV in accordance with one or more embodiments of the invention.

FIG. 53 schematically illustrates an unequal-span biplane UAV in accordance with one or more embodiments of the invention.

FIG. 54 schematically illustrates a sesquiplane UAV in accordance with one or more embodiments of the invention.

FIG. 55 schematically illustrates an inverted-sesquiplane UAV in accordance with one or more embodiments of the invention.

FIG. 56 schematically illustrates an unstagger-biplane UAV in accordance with one or more embodiments of the invention.

FIG. 57 schematically illustrates a forwards-stagger UAV in accordance with one or more embodiments of the invention.

FIG. 58 schematically illustrates a backwards-stagger UAV in accordance with one or more embodiments of the invention.

FIGS. 68-70 schematically illustrate another fixed-wing UAV in accordance with one or more embodiments of the invention.

Additional drawings that are in color are set forth in the Appendix, which is incorporated herein by reference. In this regard, FIG. 4 of the Appendix is a view of FIG. 4 in color; FIG. 5 of the Appendix is a view of FIG. 5 in color; FIG. 14 of the Appendix is a view of FIG. 14 in color; FIG. 15 of the Appendix is a view of FIG. 15 in color; FIG. 16 of the Appendix is a view of FIG. 16 in color; FIG. 17 of the Appendix is a view of FIG. 17 in color; FIG. 18 of the Appendix is a view of FIG. 18 in color; FIG. 18a of the Appendix is a view of FIG. 18a in color; FIG. 19 of the Appendix is a view of FIG. 19 in color; FIG. 20 of the Appendix is a view of FIG. 20 in color; FIG. 21 of the Appendix is a view of FIG. 21 in color; FIG. 22 of the Appendix is a view of FIG. 22 in color; FIG. 23 of the Appendix is a view of FIG. 23 in color; FIG. 24 of the Appendix is a view of FIG. 24 in color; FIG. 25 of the Appendix is a view of FIG. 25 in color; FIG. 26 of the Appendix is a view of FIG. 26 in color; FIG. 27 of the Appendix is a view of FIG. 27 in color; FIG. 28 of the Appendix is a view of FIG. 28 in color; FIG. 29 of the Appendix is a view of FIG. 29 in color; FIG. 30 of the Appendix is a view of FIG. 30 in color; FIG. 31 of the Appendix is a view of FIG. 31 in color; FIG. 32 of the Appendix is a view of FIG. 32 in color; FIG. 33 of the Appendix is a view of FIG. 33 in color; FIG. 34 of the Appendix is a view of FIG. 34 in color; FIG. 35 of the Appendix is a view of FIG. 35 in color; FIG. 36 of the Appendix is a view of FIG. 36 in color; FIG. 36a of the Appendix is a view of FIG. 36a in color; FIG. 37 of the Appendix is a view of FIG. 37 in color; FIG. 37a of the Appendix is a view of FIG. 37a in color; FIG. 68 of the Appendix is a view of FIG. 68 in color; FIG. 69 of the Appendix is a view of FIG. 69 in color; FIG. 70 of the Appendix is a view of FIG. 70 in color; FIG. 71 of the Appendix is a view of FIG. 71 in color; FIG. 72 of the Appendix is a view of FIG. 72 in color; FIG. 73 of the Appendix is a view of FIG. 73 in color; and FIG. 74 of the Appendix is a view of FIG. 74 in color.

DETAILED DESCRIPTION

Figure 1:
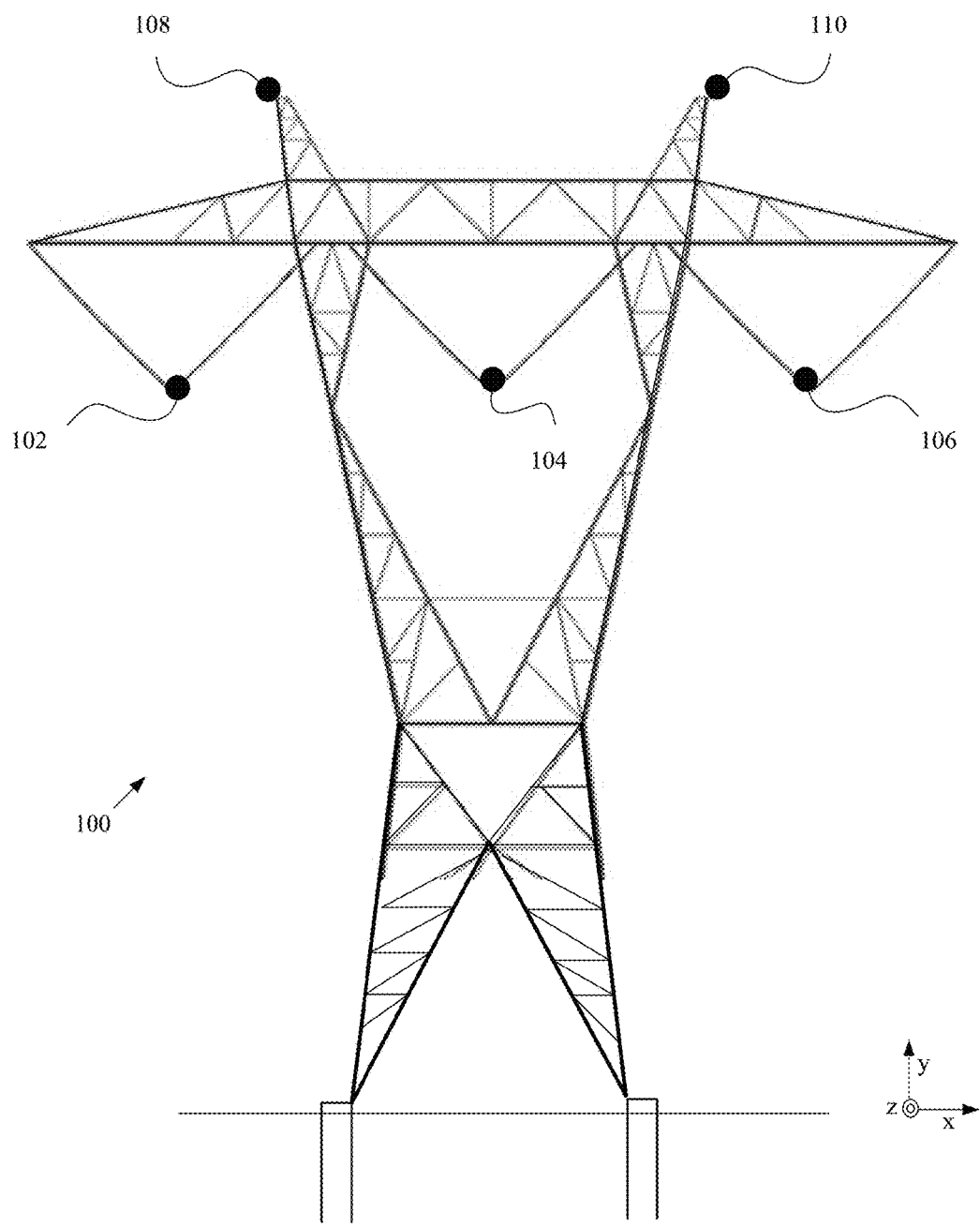
FIG. 1 is a schematic illustration of an exemplary powerline transmission tower of a power transmission system.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Furthermore, as used herein "electrode" means "a conductor at which an electric current begins or ends due to an electric field differential".

Referring now to the drawings, one or more preferred embodiments of the invention are next described. The following description of one or more preferred embodiments is merely exemplary in nature and is in no way intended to limit the invention, its implementations, or uses.

an object preferably comprises an electrical load (also referred to as an electrical load) that is directly powered by such apparatus and methods. Such object may be, by way of example and not limitation, a sensor, a transceiver, or an electric motor. Alternatively, the object comprises an energy-storing system that is charged by such apparatus and methods, wherein the electrical load is powered by the energy-storing system, in which scenario the electrical load is indirectly powered by such apparatus and methods. Such energy-storing system may comprise a battery.

Such apparatus may be a device or may be part of a device and hereinafter such apparatus is generally referred to herein as an "electric-field actuated generator" or "EFA" generator. The EFA generator is intended to be used within an environment having inhomogeneous electric fields, wherein differentials in electric field strengths are sufficiently great so as to power the intended object with the EFA generator. In preferred embodiments, the environment comprises a vicinity of powerlines, and especially a vicinity of three-phase alternating current powerlines, such as those used by electric and utility companies for electric power transmission. At least in the United States, such powerlines usually are three-phase AC and typically have voltages of between 69 kV and 765 kV, including 115 kV, 230 kV, 500 kV, and 765 kV Furthermore, many preferred embodiments—but not all—are described within the context of UAVs; however, not all embodiments of the invention are limited to such context, as will become apparent in the detailed disclosure below. Indeed, the invention generally relates to apparatus and methods for electrically powering objects, wherein an object preferably comprises an electrical load that is directly powered by such apparatus and methods. Such object may be, by way of example and not limitation, a sensor, a transceiver, or an electric motor. Alternatively, the object comprises an energy-storing system that is charged by such apparatus and methods, wherein the electrical load is powered by the energy-storing system, in which scenario the electrical load is indirectly powered by such apparatus and methods. Such energy-storing system may comprise a battery.

Such apparatus may be a device or may be part of a device and is generally referred to herein as an "electric field actuated generator" or "EFA" generator. The EFA generator is intended to be used within an environment having inhomogeneous electric fields, wherein differentials in electric field strengths are sufficiently great so as to power the intended object with the EFA generator. At least in the United States, such powerlines usually are three-phase AC and typically have voltages of between 69 kV and 765 kV, including 115 kV, 230 kV, 500 kV, and 765 kV.

In the following detailed description of preferred embodiments pertaining to UAVs, the environment comprises a vicinity of powerlines, and especially a vicinity of three-phase AC powerlines such as those used by electric companies and utility companies for electric power transfer in the United States.

Figure 6:
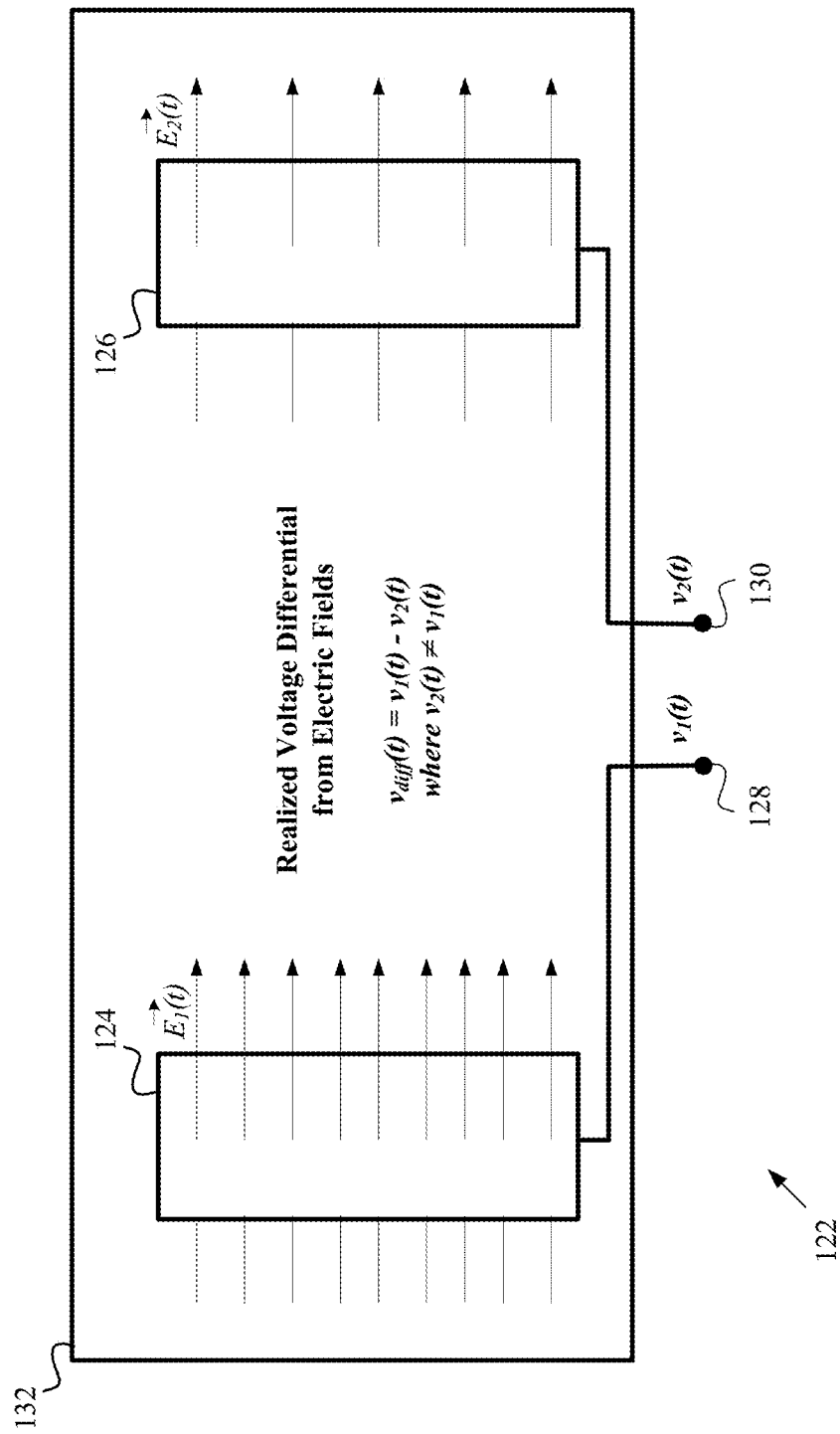
FIG. 6 illustrates a basic, schematic representation of an EFA generator in accordance with one or more embodiments of the invention.

Turning now to FIG. 6, a basic, schematic representation of an EFA generator 122 in accordance with one or more embodiments of the invention is shown. The EFA generator 122 comprises a first electrode 124 and a second electrode 126. The EFA generator 122 may be contained within an enclosure 132 so as to form a power supply unit for use with apparatus having a receptacle for removably receiving the power supply unit, whereby power supply units may be readily changed in such apparatus. Alternatively, the EFA generator 122 may form an integrated power supply in an apparatus and be contained within an enclosure of the apparatus itself. In any of these scenarios, the first and second electrodes 124,126 are arranged such that these electrodes experience electric fields $E_1(t)$ and $E_2(t)$ that result in a net differential voltage therebetween equal to $v_1(t)-v_2(t)$ where $v_1(t)$ is not equal to $v_2(t)$. The voltage differential resulting from the electric field strength differential can be realized at terminals 128,130 for connection with other electrical components for establishing a circuit for powering an electrical load.

The electrodes may take different shapes. The electrodes may be planar or curved, and may even be oriented to predominately face in planes that are orthogonal to one another. As such, the electrodes are not necessarily arranged in opposed facing relation to one another as may be found in a capacitor, although such arrangement is not precluded provided the electrodes experience the electric field strength differentials resulting in the voltage differentials for powering the electrical load. Thus, the shapes and orientations of the electrodes seen in FIG. 6 is merely for the purpose of a basic illustration and are not intended to be limitations on broad aspects of the invention.

Figure 7:
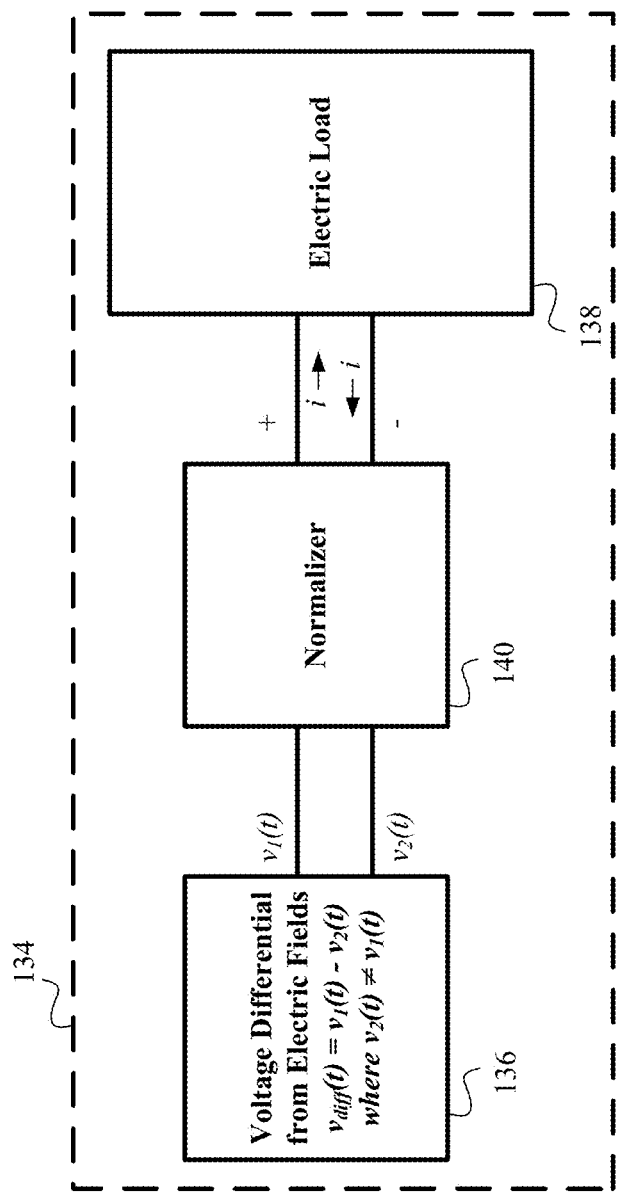
FIG. 7 illustrates a basic, schematic representation of an electric circuit including an EFA generator and a normalizer in accordance with one or more embodiments of the invention.

A basic, schematic representation of an electric circuit 134 including an EFA generator and a normalizer in accordance with one or more embodiments of the invention is illustrated in FIG. 7. The electric circuit 134 comprises EFA generator 136 and electrical load 138. Additionally, as shown in FIG. 7, the electric circuit 134 comprises a normalizer 140 for normalizing the voltage differential $v_1(t)-v_2(t)$ that varies as a function of time. The varying voltage differential represents the input for normalizer 140, and a voltage and current that is readily usable for powering the electrical load 138 is provided as the output for normalizer 140. Preferably, the output voltage is substantially constant or at least varies within a marginal range, which range is much less than the range of variation of the voltage differential from the EFA generator, and the output current preferably is direct current rather than alternating current. The normalizer may include one or more converters that include one or more of transformers, rectifiers, regulators, and filters. Indeed, is believed that the normalizer can be designed and constructed by the Ordinary Artisan for achieving desired voltage and current output.

It further will be appreciated that while the normalizer is shown as a component separate from the EFA generator and is representative of various embodiments of the invention, the normalizer may form part of the EFA generator which is representative of various other embodiments of the invention. Moreover, in scenarios in which the electrical load is compatible with the voltage differentials output by the EFA generator, or itself includes one or more components for normalizing voltage, the normalizer 140 illustrated in the electric circuit 134 may be omitted.

Figure 8:
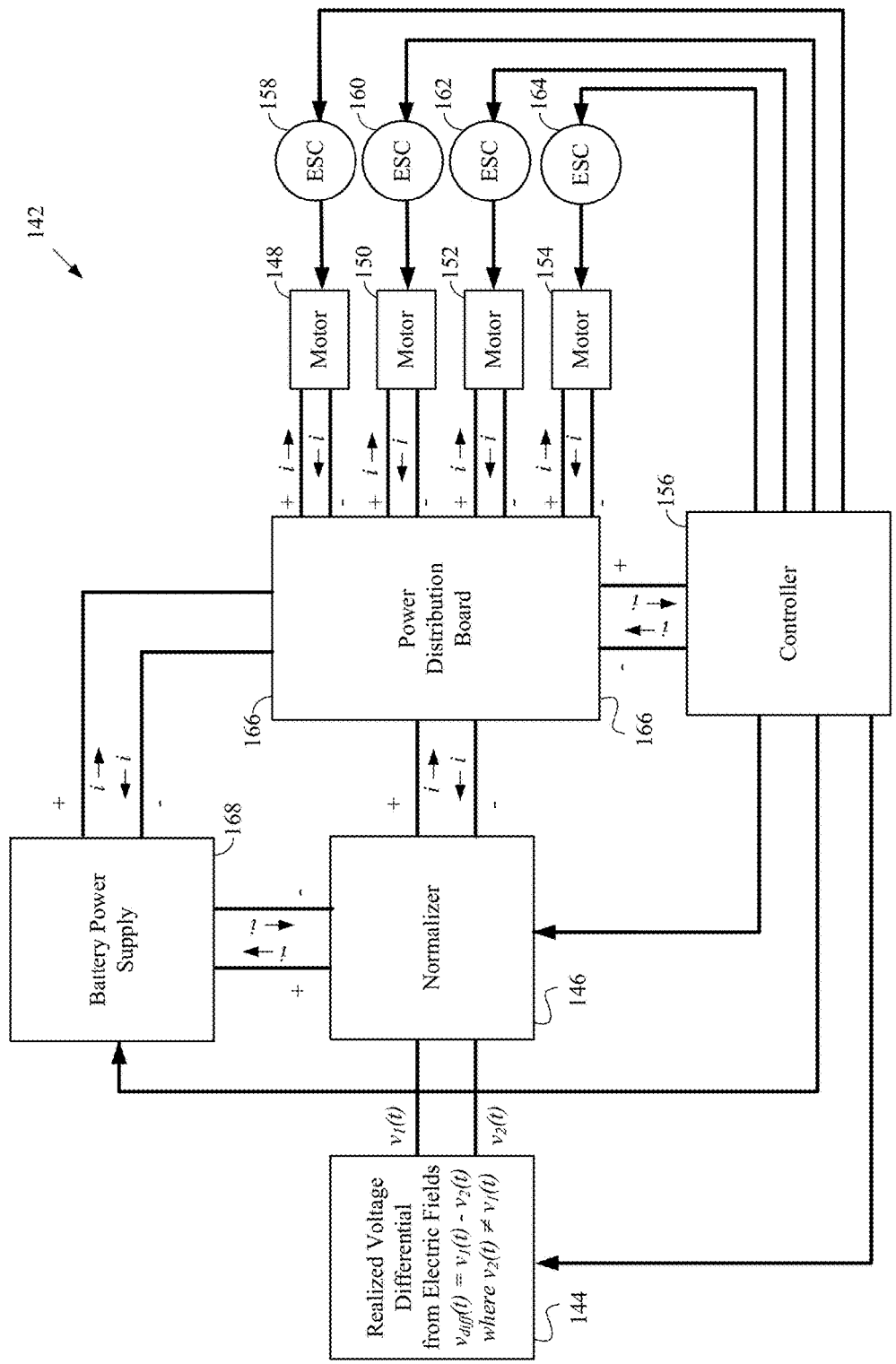
FIG. 8 illustrates a schematic representation of another representative electric circuit including an EFA generator and a normalizer, which electric circuit is intended for use, by way of example and not limitation, with a UAV in the form of a quadcopter.
Figure 9:
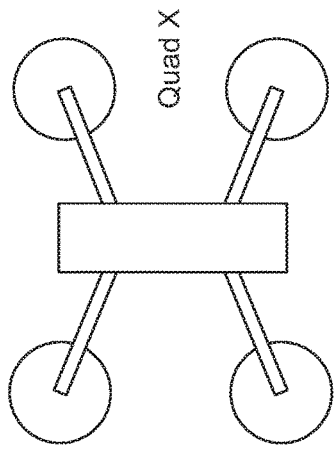
FIG. 9 illustrates a profile of a "Quad H" rotocopter.
Figure 10:
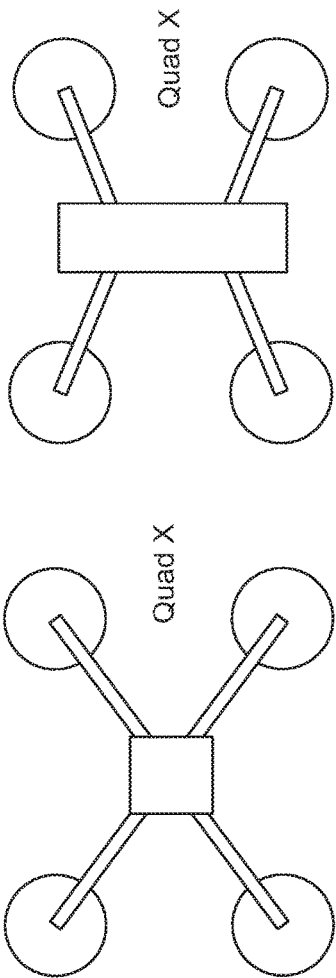
FIG. 10 illustrates a profile of a "Quad X" rotocopter.
Figure 11:
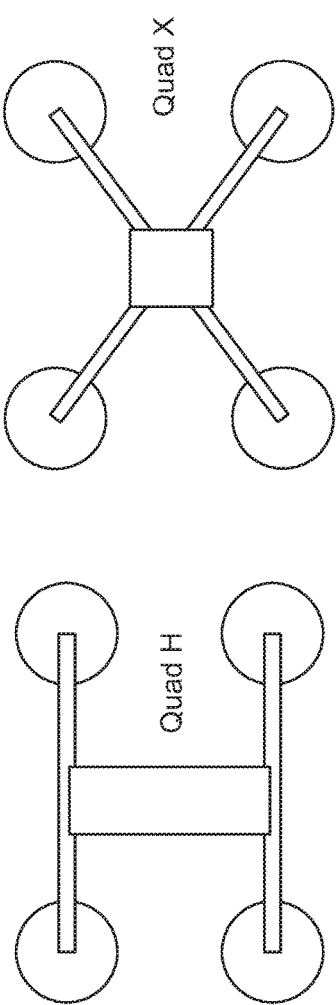
FIG. 11 illustrates an alternative profile of a "Quad X" rotocopter.
Figure 13:
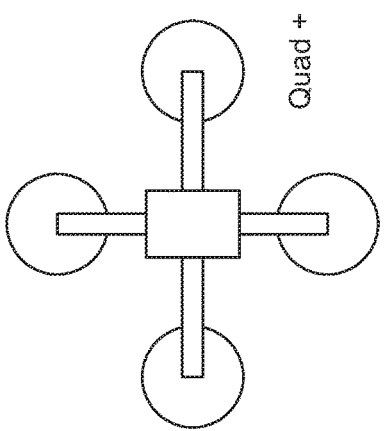
FIG. 13 illustrates a profile of a "Quad +" rotocopter.
Figure 12:
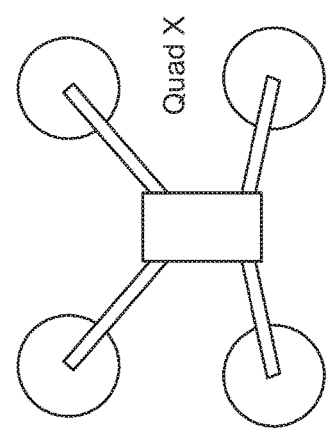
FIG. 12 illustrates another alternative profile of a "Quad X" rotocopter.

Another schematic representation of an electric circuit 142 including an EFA generator and a normalizer in accordance with one or more embodiments of the invention is illustrated in FIG. 8. This representative electric circuit 142 comprises EFA generator 144 and electrical load 146 and is intended for use with a UAV in the form of a quadcopter. Example profiles of such a quadcopter are illustrated in FIGS. 9-13 and, as seen therein, each quadcopter includes four rotors for providing lift and thrust. Each rotor is powered by a respective motor 148,150,152,154, the speed of which is controlled by an onboard computer or controller 156 via a respective electronic speed controller or ESC 158,160,162,164. The power to the controller is provided via a power distribution board 166, which also powers the motors and powers the ESC components (not shown for clarity).

In some embodiments, the electric circuit 142 also comprises a battery power supply 168 in addition to the EFA generator 144, which battery power supply 168 powers the power distribution board. In other embodiments, the battery power supply 168 is omitted and the electric circuit 142 is powered entirely by the EFA generator 144. When the batter power supply 168 is included, the one or more batteries thereof preferably are rechargeable, and the normalizer 146 preferably supplies power to the battery power supply 168 for charging of the one or more batteries.

The controller 156 preferably is connected to the batter power supply and to the normalizer 146 for controlling when the batteries are charged, and for controlling when power is supplied to the power distribution board by the batter power supply, and when power is supplied to the power distribution board from the EFA generator 144 via the normalizer 146. Power is supplied by the battery power supply preferably at least when the UAV is operated outside of the vicinity of powerlines or otherwise outside of the electric field strength differentials needed for the EFA generator to provide the required power to operate the UAV.

The controller 156 also preferably is connected to the EFA generator 144 for establishing electric circuits through switches as a function of both the voltage differentials experienced at the electrodes of the EFA generator 144 and the power requirements of the electrical load(s) of the electric circuit. The voltage differentials experienced at the electrodes of the EFA generator 144, which is a function of the various electric field strengths experienced at the electrodes, preferably is detected by way of voltage detectors within the EFA generator 144 that are operatively connected to the electrodes of the EFA generator 144 and in communication with the controller 156. Such electric circuit switching within an EFA generator for optimizing the current and voltage output characteristics for the electrical load requirements is further disclosed and discussed hereinbelow.

FIGS. 14-29 further relate to embodiments of quadcopters that are exemplary of one or more aspects and one or more features of embodiments of the invention and are described in detail below.

Figure 14:
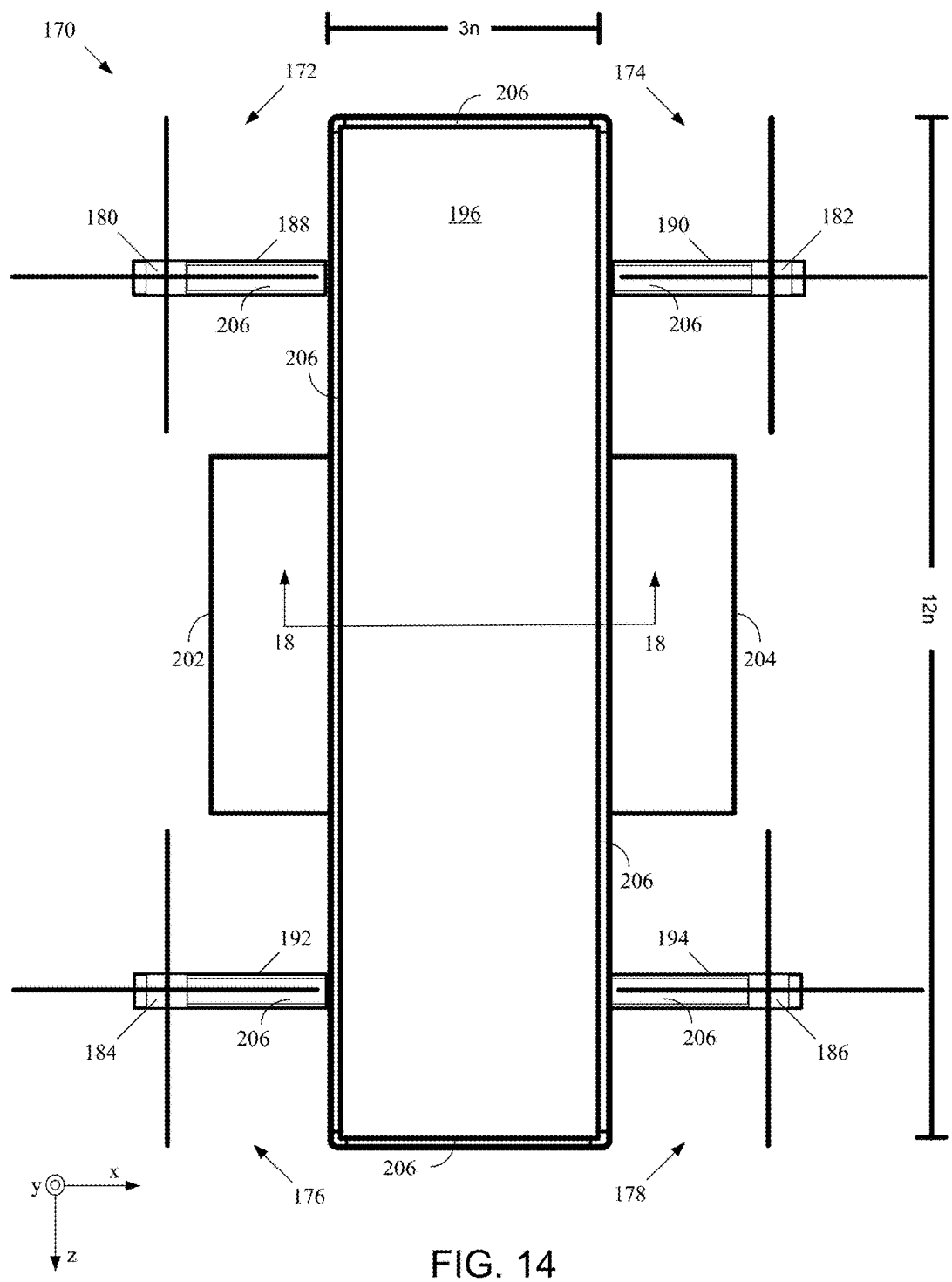
FIG. 14 is a top schematic view of a first exemplary quadcopter 170 in accordance with an embodiment of one or more aspects and features of the invention.
Figure 15:
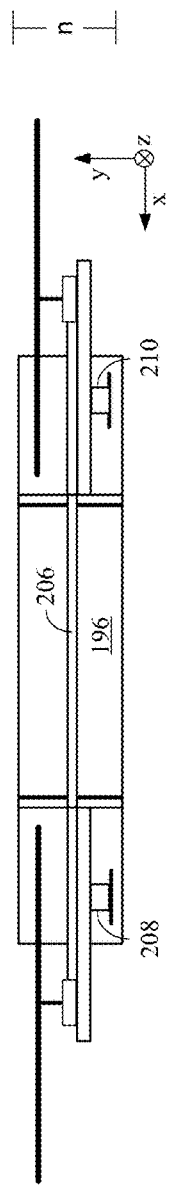
FIG. 15 is a first side schematic view of the quadcopter 170 of FIG. 14.
Figure 16:
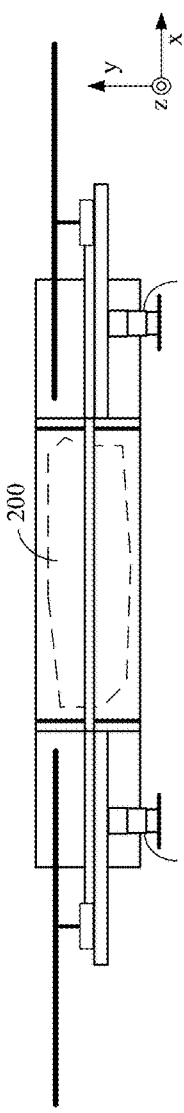
FIG. 16 is a second side schematic view of the quadcopter 170 of FIG. 14, which side is opposite to the side of FIG. 15.
Figure 17:
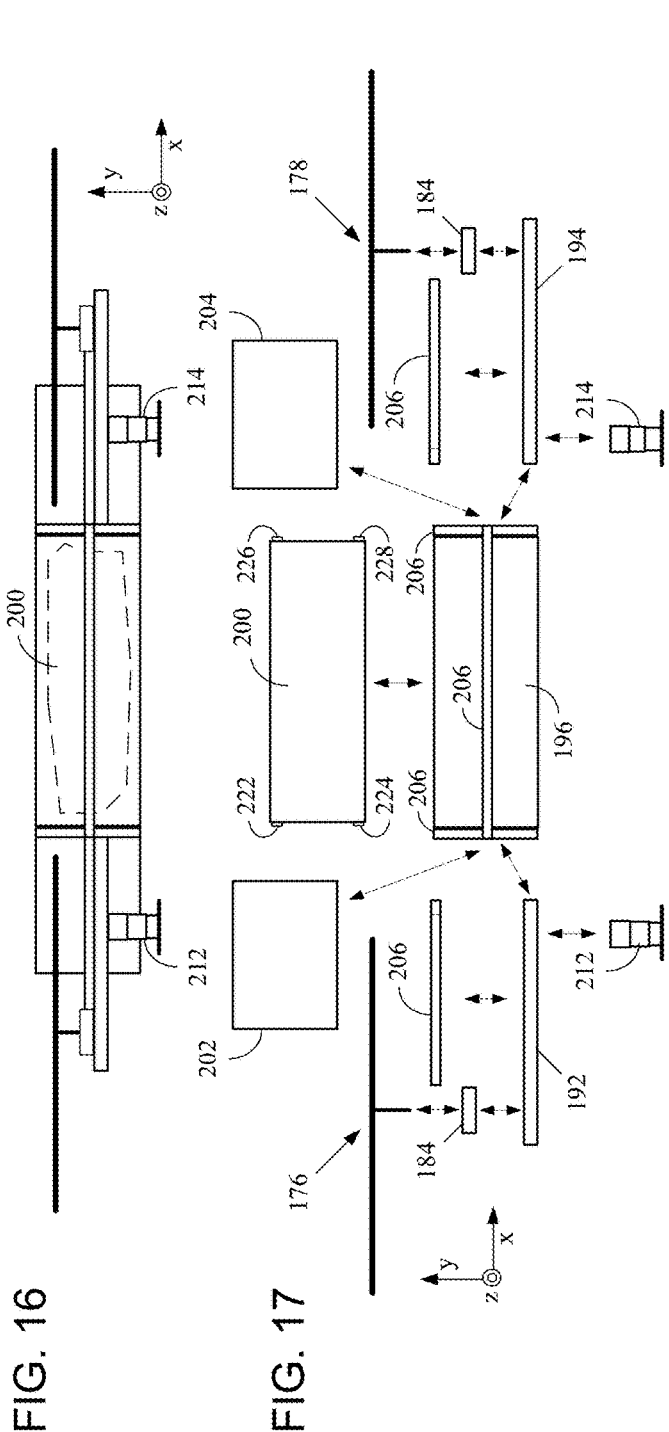
FIG. 17 is an exploded view of the quadcopter 170 seen in FIG. 16.
Figure 18A:
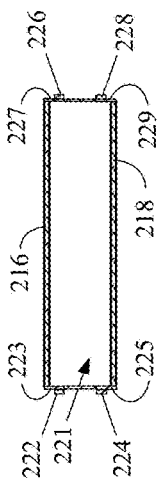
FIG. 18a is a cross-sectional view of an alternative to the EFA generator seen in FIG. 18.
Figure 18:
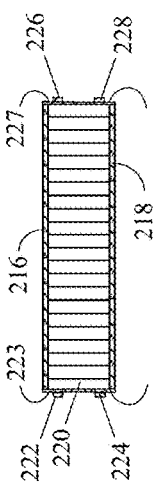
FIG. 18 is a cross-sectional view of the EFA generator of the quadcopter 170 taken along lines 18-18 of FIG. 14.

With specific regard to FIGS. 14-18, a first exemplary quadcopter 170 is now described. In this respect, FIG. 14 is a top schematic view of the quadcopter 170; FIG. 15 is a first side schematic view of the quadcopter 170 of FIG. 14; FIG. 16 is a second side schematic view of the quadcopter 170 of FIG. 14, which side is opposite to the side of FIG. 15; FIG. 17 is an exploded view of the quadcopter 170 seen in FIG. 16. Additionally, FIG. 18 is a cross-sectional view of the EFA generator taken along lines 18-18 of FIG. 14.

As seen in FIGS. 14-17, the quadcopter 170 comprises four rotors 172,174,176,178 driven by motors 180,182,184, 186. Each rotor and motor are supported by a respective arm 188,190,192,194 that extends from and is connected to an enclosure of the quadcopter 170. The enclosure comprises a rectangular block-shaped main housing 196 that is preferably made from a nonconducting plastic material. An EFA generator 200 is encased within the housing 196 and is seen through a partial wall cutout in FIG. 16 as well as in the exploded view of FIG. 17.

The quadcopter 170 further comprises a forward secondary housing 202 and a rear secondary housing 204, each located on the exterior of the housing 196 and each located between pairs of the rotors. A series of conduits 206 extend along the exterior of the housing 196 and along the arms 188,190,192,194 and define electrical pathways. Preferably, wiring extends through interior channels of conduits 206. Referring to the exemplary circuit illustrated in FIG. 8 in the context of the quadcopter 170, the EFA generator—and specifically the group of electrodes thereof—is contained within the housing 196 while the other electric components including the normalizer, power distribution board, battery power supply (if included), and controller are collectively contained within one or more of the secondary housings 202,204. The motors are located on the arms, and the electronic speed controllers are located on the arms with the motors or are contained within the one or more of the secondary housings 202,204. The pathways of the conduits 206 electrically interconnect these components in forming the electric circuit 142.

The quadcopter 170 further comprises a plurality of telescoping legs, one pair 208,210 which is seen in FIG. 15 and another pair 212,214 which is seen in each of FIGS. 16 and 17. The legs extend downwardly for landing of the quadcopter, which position is seen in FIG. 16, and retract upwardly for flight, which position is seen in FIG. 15. When retracted, the feet of the legs 208,210,212,214 are located above an elevation of the bottom of the housing 196 (see, e.g., FIG. 15). Extension and retraction of the legs preferably is handled by the controller of the UAV.

The cross-sectional view of the EFA generator 200 taken along lines 18-18 of FIG. 14 is seen in FIG. 18. This cross-sectional view shows that the EFA generator 200 comprises a first electrode 216 and a second electrode 218, with an insulator 220 extending between the two electrodes 216,218. Each electrode 216,218 in the quadcopter 170 preferably is thin and wide and comprises a conducting material. Indeed, each electrode more preferably is a metallic plate.

The insulator 220 preferably is lightweight and able to withstand a large voltage differential between the electrodes 216,218 before breaking down. Possible materials of which the insulator 220 comprises include clay; ceramic; porcelain; PVC; cresyl pthalate; DEHP; plastics; rubber; nylon; glass; dry air; fiberglass; polyurethane foam; polystyrene (Styrofoam); paper; and Teflon. The insulator 220 may be in the form of an elongate member having an oval or polygonal profile in cross-section. It will be appreciated by the Ordinary Artisan that the insulator 220 illustrated in FIG. 18 may be seen as a dielectric extending between the electrodes 216,218.

Additionally, an insulator may comprise a gas or combination of gases, such as air, in which case the insulator 220 of FIG. 18 is replaced with a containment space 221 between the electrodes containing such gas or combination of gases, which is represented in FIG. 18a. In at least some preferred embodiments, the insulator is hydrogen gas, and the interior of the EFA generator comprises an airtight containment space between opposing electrodes in which the hydrogen is retained. Use of hydrogen gas is beneficial insofar as the hydrogen gas—in additional to being an insulator—will provide a degree of lift, thereby reducing the weight of the EFA generator. This buoyancy-assisted lift provided by the hydrogen gas will lessen the power requirements for operating the UAV. The hydrogen gas may be non-pressurized. The hydrogen gas also may be pressurized in some embodiments, thereby buttressing the structural integrity of the walls of the containment space of the EFA generator. It further is contemplated that, in at least some preferred embodiments, helium gas is utilized instead of hydrogen gas and that, in some embodiments, the helium is pressurized for buttressing the structural integrity of the walls of the containment space 221 of the EFA generator. In still some further embodiments, it is contemplated that a vacuum is created and maintained—and no gas is provided—within the containment space 221. In other preferred embodiments, the gas—whether helium or hydrogen—is heated. Such heating may be accomplished through spark gaps or resistive heaters utilizing voltage differentials and current flow between electrodes. Of course, no oxygen is introduced when hydrogen is utilized so as to eliminate risks of potential explosions or fires. When such heating is employed, many gasses both including and other than hydrogen and helium may be used.

While aspects of the invention in their broadest definitions are not intended to be limited by any particular dimensional characteristic of the UAV, certain aspects and features do relate to dimensions of the UAV. In this respect, it is believed that it may be preferred in the context of UAVs operating in vicinity of at least certain powerline arrangements to have an elongate dimension in the direction of travel versus the crosswise and vertical dimensions.

In this respect, and as used herein, the direction of travel is referred to as the "z" direction, axis, or component and is intended to be in a direction in which powerlines extend between consecutive supporting towers. The "x" direction, axis, or component is in a direction orthogonal to the z direction and represents a distance from a centerline of the powerline arrangement. In a hypothetical where towers are situated at the same elevation and the powerlines are in perfect linear extent between such towers, the x direction corresponds to a horizontal direction orthogonal to the direction of the Earth's gravity. The "y" direction, axis, or component is in a direction orthogonal to both the z direction and x direction, and in the stated hypothetical, the y direction corresponds to the vertical direction (parallel to force lines representing the Earth's gravity).

With this in mind, it will be appreciated that the quadcopter 170 seen in FIGS. 14 and 15 has an elongate dimension in the z direction and, specifically, the quadcopter 170 is seen to have a main body 196 with a length in the z direction of 12 units, a width in the x direction of 3 units, and a height in the y direction of one unit, wherein the unit is represented by "n" and could be any desired length within reason for operation of the UAV within the vicinity of the powerlines of a power transmission system. For example, "n" in one or more preferred embodiments is between approximately one foot or approximately a third of a meter.

The EFA generator 200 preferably consumes the entire volume of the main housing 196 of the quadcopter 170. In this respect, the electrodes 216,218 preferably extend commensurate with the top and bottom surfaces of the main housing 196. In other embodiments, the EFA generator 200 may not consume the entirety of the volume of the main housing 196, in which case one or more electrical components may be included within the housing 196 rather than in secondary housings or in other areas of the UAV. Moreover, in cases where the UAV transports cargo, the cargo may be contained within the main housing 196 rather than, or in addition to, being contained within one or more secondary housings, space permitting.

Additionally, the EFA generator 200 preferably represents a self-contained power supply unit that is removably received within a containment space of the main housing 196, which is illustrated in the exploded view of FIG. 17. The EFA generator 200 preferably comprises at least a pair of terminals 222,224, and optionally additional terminals such as the pair of terminals 226,228, for electrically connecting the EFA generator 200 with other electrical components of the quadcopter 170 through the wiring in the conduits 206. Electrical pathways connect the electrodes and terminals. Thus, for example, electrical pathways 223,227 each in the form of a conducting wire respectively connect the first electrode 216 with terminal 222 and terminal 226; and electrical pathways 225,229 each in the form of a conducting wire respectively connect the second electrode 218 with terminal 224 and terminal 228.

The EFA generator 200 in the form of a power supply unit preferably is removable and replaceable with each of other different EFA-generator power supply units having compatible dimensions and configurations. Because the EFA generator in the form of a power supply unit is a self-contained unit with connecting terminals, the quadcopter 170 can be outfitted with different power supply units depending on the different possible powerline arrangements the vicinity of which the quadcopter 170 is intended to be operated, and on the one or more components or devices to be powered thereby. As further disclosed below, the different but compatible EFA-generator power supply units may differ, for example, in the material of the electrodes, the shape of the electrodes, the area of the electrodes, the number of the electrodes, the number of different circuits that can be formed with the electrodes, and the insulator between electrodes. Such differences are believed to alter the power characteristics, including voltage and current, that is provided, as well as the ability or efficiency in providing such power.

Figure 19:
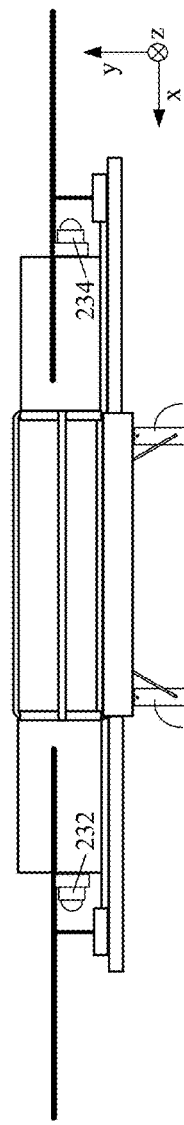
FIG. 19 is a first side schematic view of another quadcopter 230.
Figure 20:
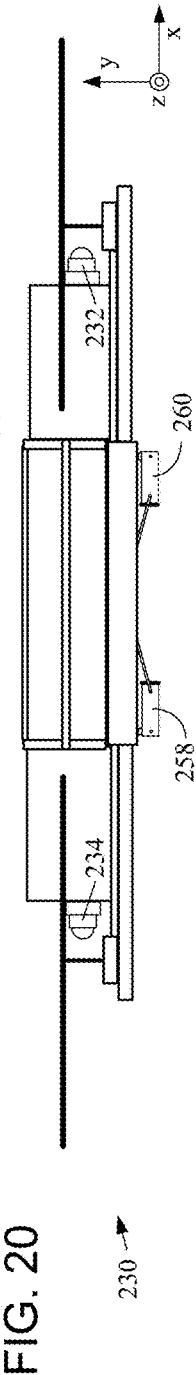
FIG. 20 is a second side schematic view of the quadcopter 230, which side is opposite to the side of FIG. 19.
Figure 21:
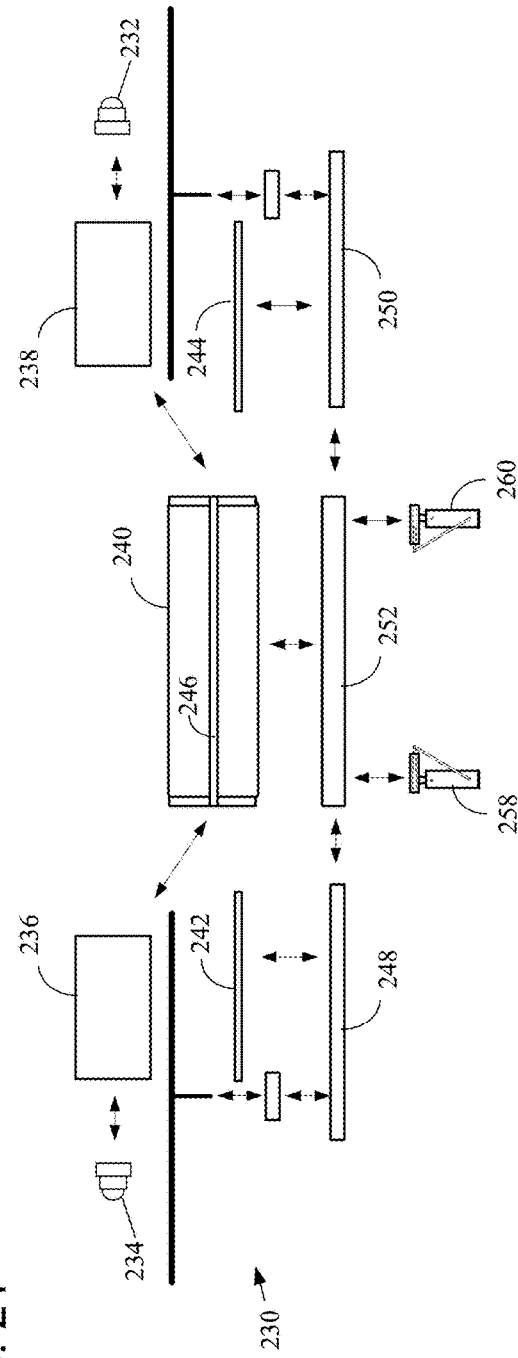
FIG. 21 is an exploded view of the quadcopter 230 seen in FIG. 20.
Figure 22:
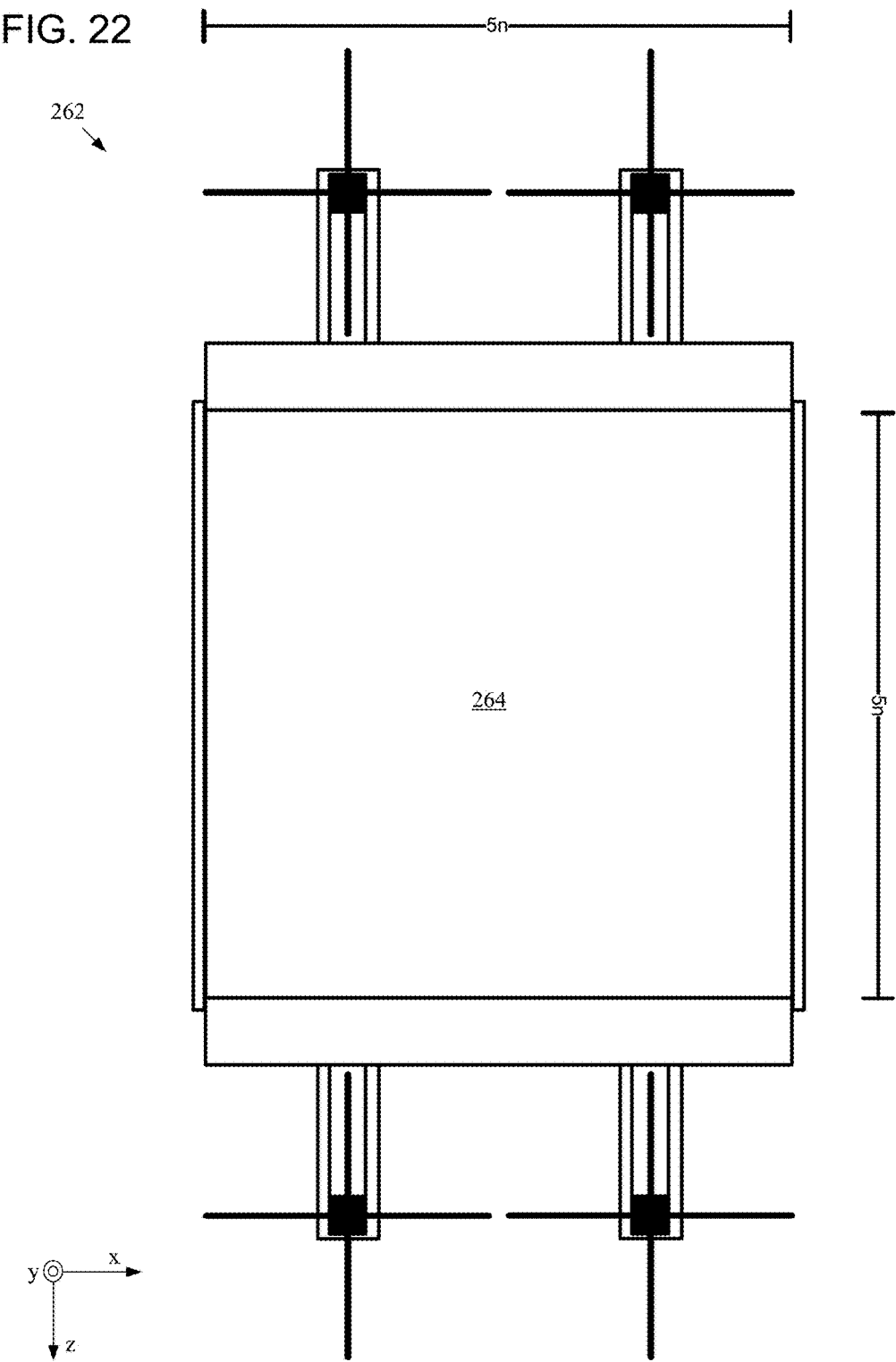
FIG. 22 is a top schematic view of a third exemplary quadcopter 262 in accordance with an embodiment of one or more aspects and features of the invention.
Figure 23:
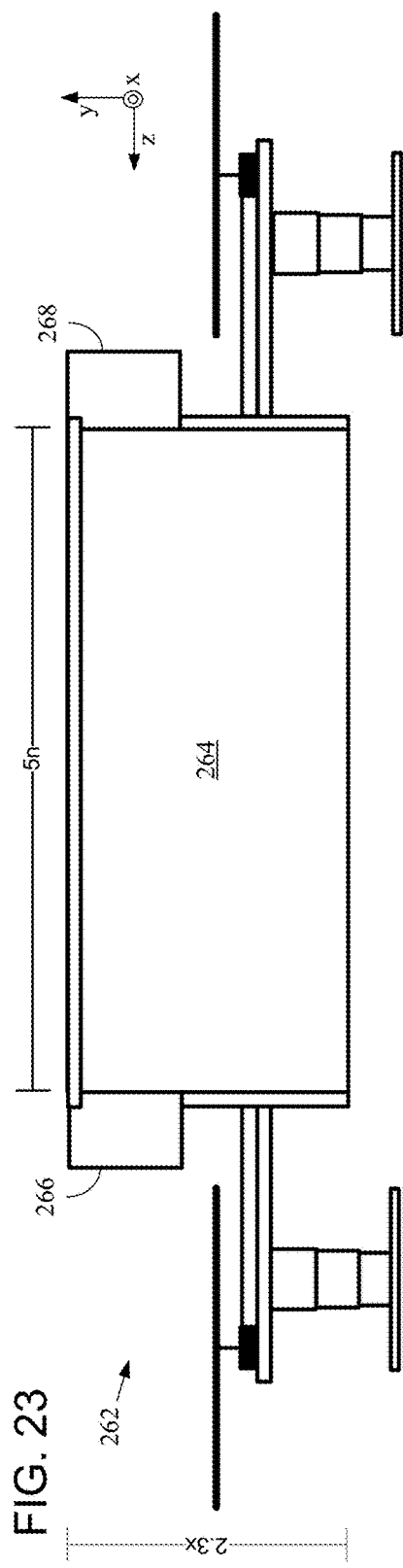
FIG. 23 is a first side schematic view of the quadcopter 262, wherein the quadcopter is in a landed configuration.
Figure 24:
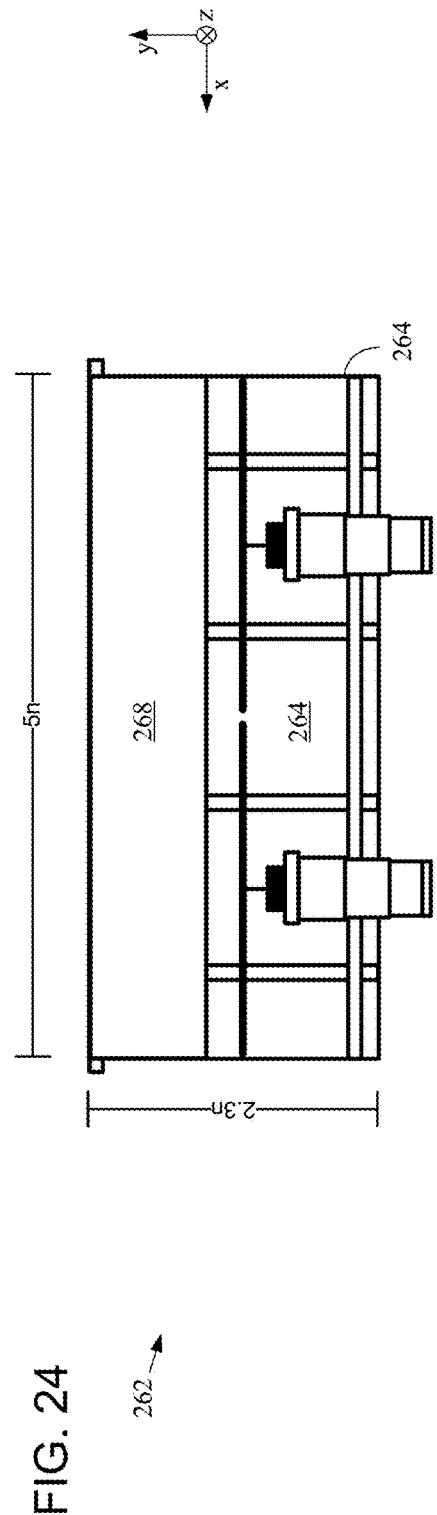
FIG. 24 is a rear schematic view of the quadcopter 262 in the landed configuration.
Figure 25:
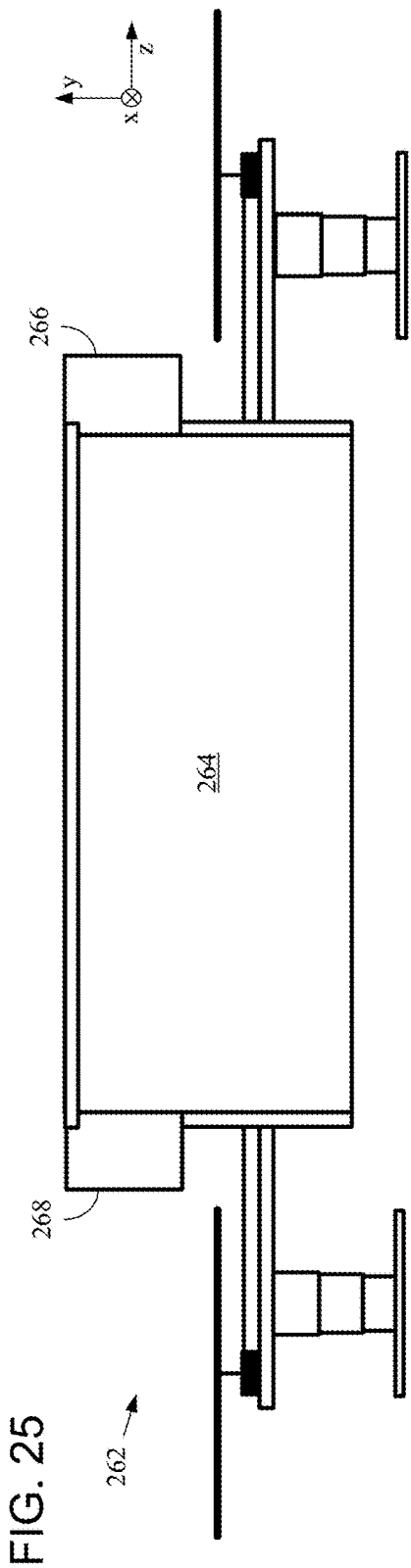
FIG. 25 is a second side schematic view of the quadcopter 262 in the landed configuration, which side is opposite to the side of FIG. 23.
Figure 26:
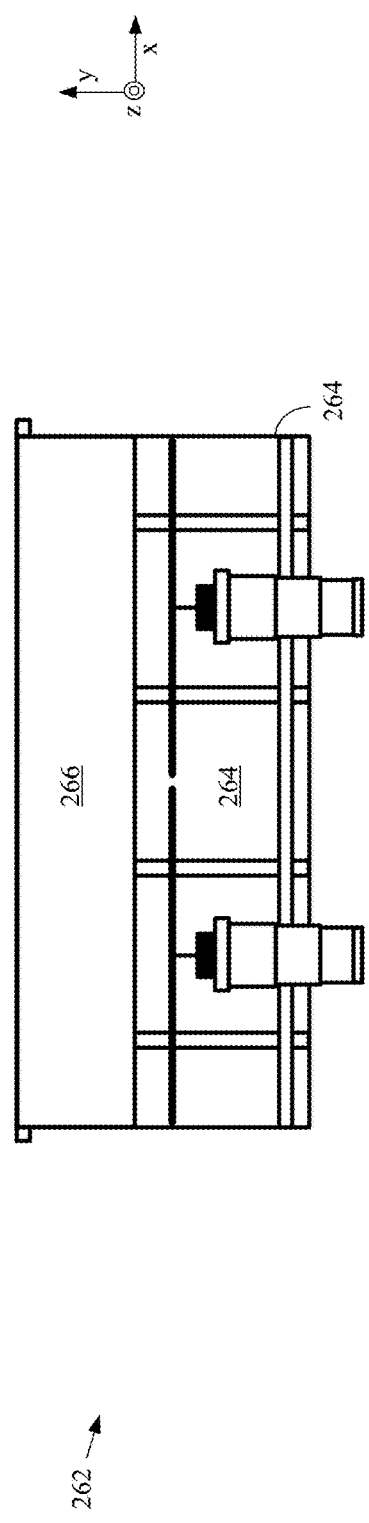
FIG. 26 is a front schematic view of the quadcopter 262 in the landed configuration.

FIGS. 19-21 illustrate a second exemplary quadcopter 230 representing a variation of quadcopter 170, and the disclosure of the quadcopter 170 applies to quadcopter 230 with the following exceptions.

As illustrated, quadcopter 230 comprises at least one camera, and preferably two or more cameras 232,234, which are shown as located on the secondary housings 236,238. Cameras alternatively or additionally may be located on a top of the UAV; on a bottom of the UAV; on one or both ends of the UAV; and on the front or rear of the UAV. The cameras 232,234 are configured for taking digital photographs, for recording video, and/or recording audio and video. Electrical components supporting the cameras 232,234, including one or more processors and memory, preferably are included within one or more of the secondary housings, but may be included within the central housing 240 or even within one or more of the conduits (several of which conduits 242,244, 246 are seen in FIG. 21) or on one or more of the arms (two of which arms 248,250 also are seen in FIG. 21).

Additionally, quadcopter 230 comprises a base 252 to which the arms are connected and from which the arms extend, with the housing being supported on top of the base 252. A plurality of hydraulic extension legs (two of which legs 254,256 are seen in FIG. 19 and two of which legs 258,260 are seen in FIG. 21) are connected to the bottom of the base 252 and are transitionable between retracted positions (seen in FIG. 20) and extended positions (seen in FIGS. 19 and 21). Extension and retraction of the legs preferably is handled by the controller of the UAV.

Lastly, the EFA generator of the quadcopter is integrated into the housing 240 and is not a separate, removable unit from the housing 240, which differs from the quadcopter 170. It will be appreciated, however, that at least in the quadcopter 240 and embodiments of the invention represented thereby, the housing 240 may be detached from the base 252 and a compatible housing with an EFA generator having the same or different power characteristics may be attached to the base 252, which is similar to changing out the EFA generator when in the form of a removable power supply unit.

FIGS. 22-29 illustrate a third exemplary quadcopter 262 similar to quadcopter 170, and the disclosure of the quadcopter 170 applies to quadcopter 262 with the following variations. First, from review of the drawings it should be apparent that the main housing 264 is rectangular in shape with respect to the x and z axes, the dimension in each direction of which is "5n". The height in the y direction is "2.3n", wherein "n" can be any desired length within reason for operation of the UAV within the vicinity of the powerlines of a power transmission system. For example, "n" in one or more preferred embodiments is between approximately one foot or approximately a third of a meter.

In another variation, the quadcopter 262 includes secondary housings 266,268 that extend an entire length of the main housing 264 in one of the x and z directions. Thus, as seen for example in FIG. 24, secondary housing 268 extends from one side of the quadcopter 262 to the other side of the quadcopter 262 in the x direction and is located at an elevation above the rotors of the quadcopter 262; and as seen for example in FIG. 26, secondary housing 266 similarly extends from one side of the quadcopter 262 to the other side of the quadcopter 262 in the x direction and is located at an elevation above the rotors of the quadcopter 262.

It further will be appreciated that each of FIGS. 23-26 illustrates the quadcopter 262 in a configuration with the telescoping legs extended for landing. In contrast, FIGS. 27-28 each illustrates the quadcopter 262 in a configuration with the telescoping legs retracted for flight.

Similar to the quadcopter 170, quadcopter 262 also includes an EFA generator in the form of a removable power supply unit 270, perhaps as best seen in the exploded view of FIG. 29. The EFA-generator power supply unit 270 preferably comprises at least a pair of terminals 251,253 and optionally additional terminals such as the pair of terminals 255,257 for electrically connecting the EFA generator with wiring of the conduits.

FIG. 30 is a front schematic view of a main housing 272 that is representative of one or more embodiments of UAVs in accordance with one or more aspects and features of the invention. FIG. 31 is a rear schematic view of the main housing 272 and conduits 274. Wires preferably extend within the conduits 274 representing electrical pathways for connecting electrical components of the UAV with an EFA generator contained within the main housing 272. With respect to this representative example, the EFA generator preferably is integrated with the housing and is not in the form of a removable power supply unit. Of course, in other embodiments of UAVs in accordance with one or more aspects and features of the invention, the EFA generator is in the form of a removable power supply unit.

Figure 32:
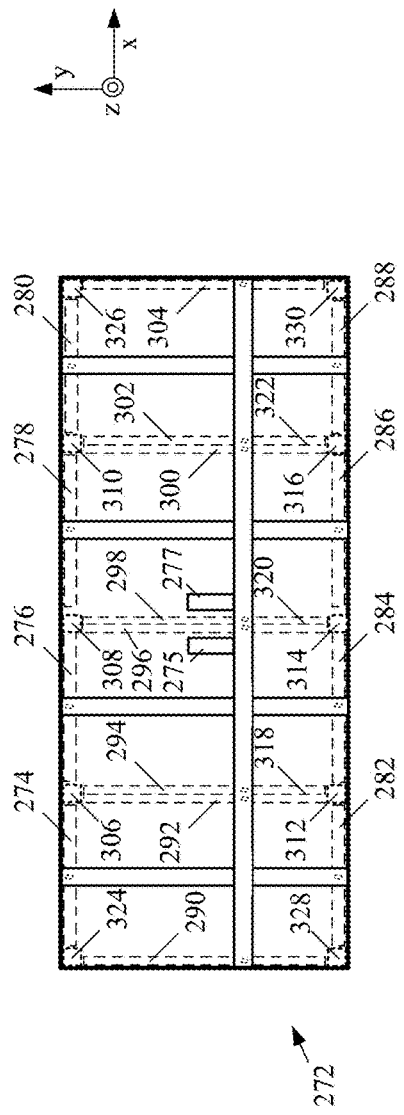
FIG. 32 is another view of that of FIG. 30, wherein both electrodes contained within the main housing and openings between the electrodes and the interior of the conduits are seen in phantom.

Furthermore, no secondary housing is shown for clarity, but one or more secondary housings may be included with the main housing 272 in an embodiment. The electrical components of the UAV connected by the conduits 274 preferably are contained in one or more such secondary housings and are connected therewith through one or more terminals of the EFA generator. One or more front terminals conduits 275,277 of the main housing 272 provide electrical pathways to the terminals of the EFA generator and are schematically illustrated in FIGS. 30 and 32; back terminal conduits 279,281 of the main housing 272 provide electrical pathways to the terminals of the EFA generator, too, and are schematically illustrated in FIG. 31. The electrical pathways of the terminal conduits enable electrical connections with and powering of electrical components that may be located within a secondary housing located at a front or back of the housing. In at least some embodiments, such electrical components also may be contained within the conduits themselves and may be contained on one or more integrated circuit boards. Moreover, any such secondary housing and any or all of the conduits may be insulated to shield the electrical components contained therein and the wiring from the electric fields that are encountered within the vicinity of powerlines. Of course, the main housing containing the EFA generator does not shield the EFA generator from such electric fields.

FIG. 32 is another view of that of FIG. 30, wherein electrodes contained within the main housing 272 are seen in phantom. The EFA generator illustrated in FIG. 32 includes sixteen electrodes comprising upper electrodes 274,276,278,280 each parallel to one another and substantially extending in a common plane; lower electrodes 282, 284,286,288 each parallel to one another and substantially extending in a common plane, and each substantially parallel to each of the upper electrodes 274,276,278,280; side electrodes 290,304; and intermediate electrodes 292,294, 296,298,300,302 spaced apart from one another, each intermediate electrode being oriented in parallel relation to and located between the side electrodes 290,304. The sixteen electrodes are electrically insulated from each other such that a differential in voltage between electrodes is enabled that results from differentials in electric field strength experienced at the electrodes when within the vicinity of the powerlines.

In this regard, insulators 306,308,310 form barriers between the upper electrodes 274,276,278,280; insulators 312,314,316 form barriers between the lower electrodes 282,284,286,288; insulators 318,320,322 form barriers between pairs of the intermediate electrodes 292,294, 296, 298, and 300,302; insulator 324 forms a barrier between the upper electrode 274 and the side electrode 290; insulator 326 forms a barrier between the upper electrode 280 and the side electrode 304; insulator 328 forms a barrier between the lower electrode 282 and the side electrode 290; and insulator 330 forms a barrier between the lower electrode 288 and the side electrode 304. These insulating barriers prevent electrical shorting between electrodes having differing voltages and enable voltage differentials for establishing circuits for driving electrical loads in accordance with one or more aspects and features of the invention. Furthermore, insulators 306,308,310,312,314,316,324,326,328,330 each preferably is in the form of an elongate members having an oval or polygonal cross-sectional profile; and insulators 318,320, 322 preferably are in a planar form and may comprise one or more sheets or films and may include composite materials.

Figure 33:
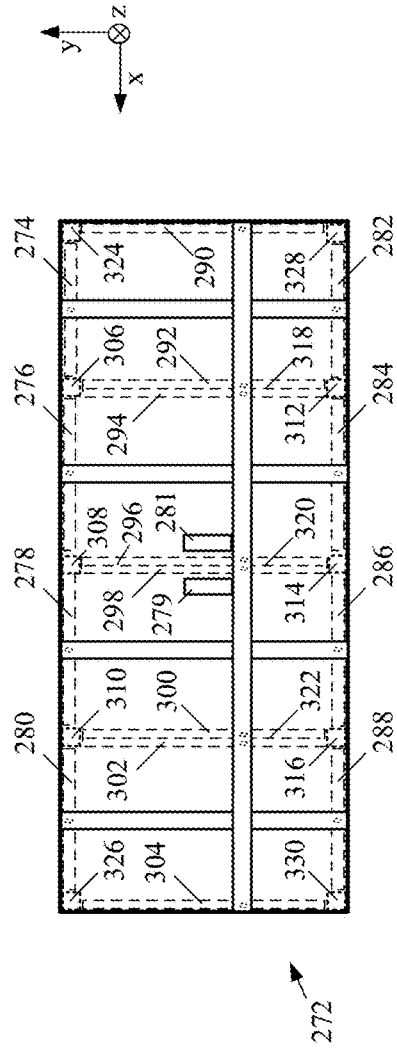
FIG. 33 is another view of that of FIG. 31, wherein both electrodes contained within the main housing and openings between the electrodes and the interior of the conduits are seen in phantom.
Figure 34:
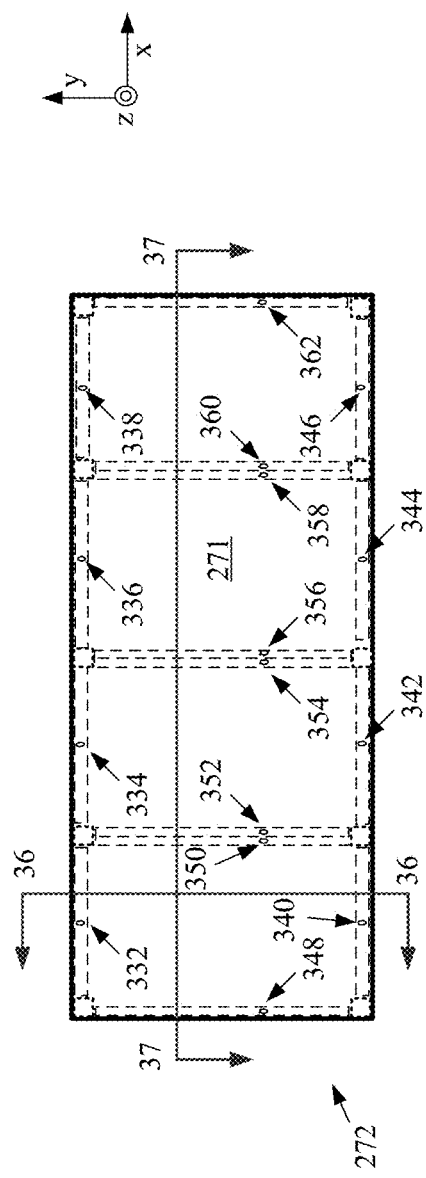
FIG. 34 is another view of that of FIG. 32, but wherein the conduits are omitted.
Figure 35:
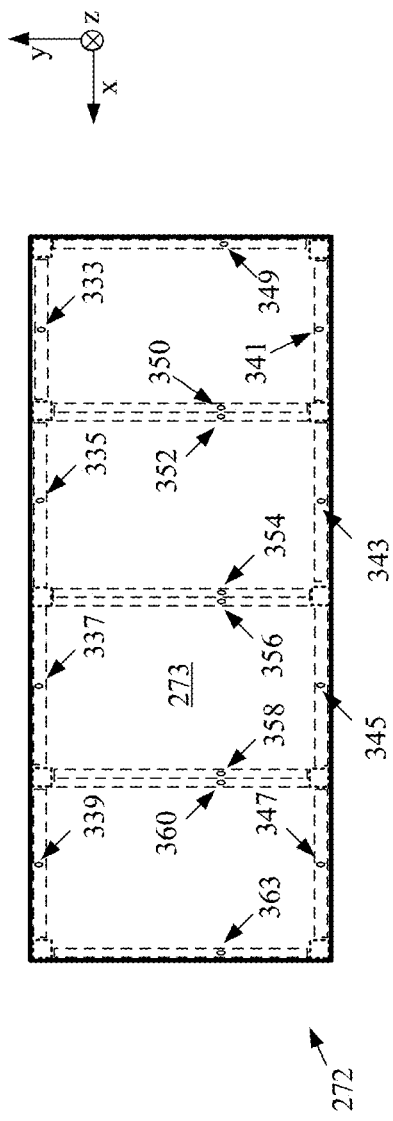
FIG. 35 is another view of that of FIG. 33, but wherein the conduits are omitted.

Sixteen access openings are provided in the front exterior wall 271 of the main housing 272 through which wires of the conduits 274 extend for electrical connection with the sixteen electrodes contained within the main housing 272. Sixteen access openings also preferably are provided in the back exterior wall 273 of the main housing 272 through which wires of the conduits 274 also may extend for electrical connection with the sixteen electrodes contained within the main housing 272. These access openings are illustrated in phantom in FIGS. 32 and 33. These access openings also are seen in FIGS. 34 and 35, in which figures the conduits 274 have been omitted for view of such openings.

The sixteen access openings in the front exterior wall 271 comprise openings 332,334,336,338 for access to the upper electrodes 274,276,278,280; openings 340,342,344,346 for access to the lower electrodes 282,284,286,288; and openings 348,362 for access to the side electrodes 290,304.

The sixteen access openings in the back exterior wall 273 comprise openings 333,335,337,339 for access to the upper electrodes 274,276,278,280; openings 341,343,345,347 for access to the lower electrodes 282,284,286,288; and openings 349,363 for access to the side electrodes 290,304.

Figures 36, 37:
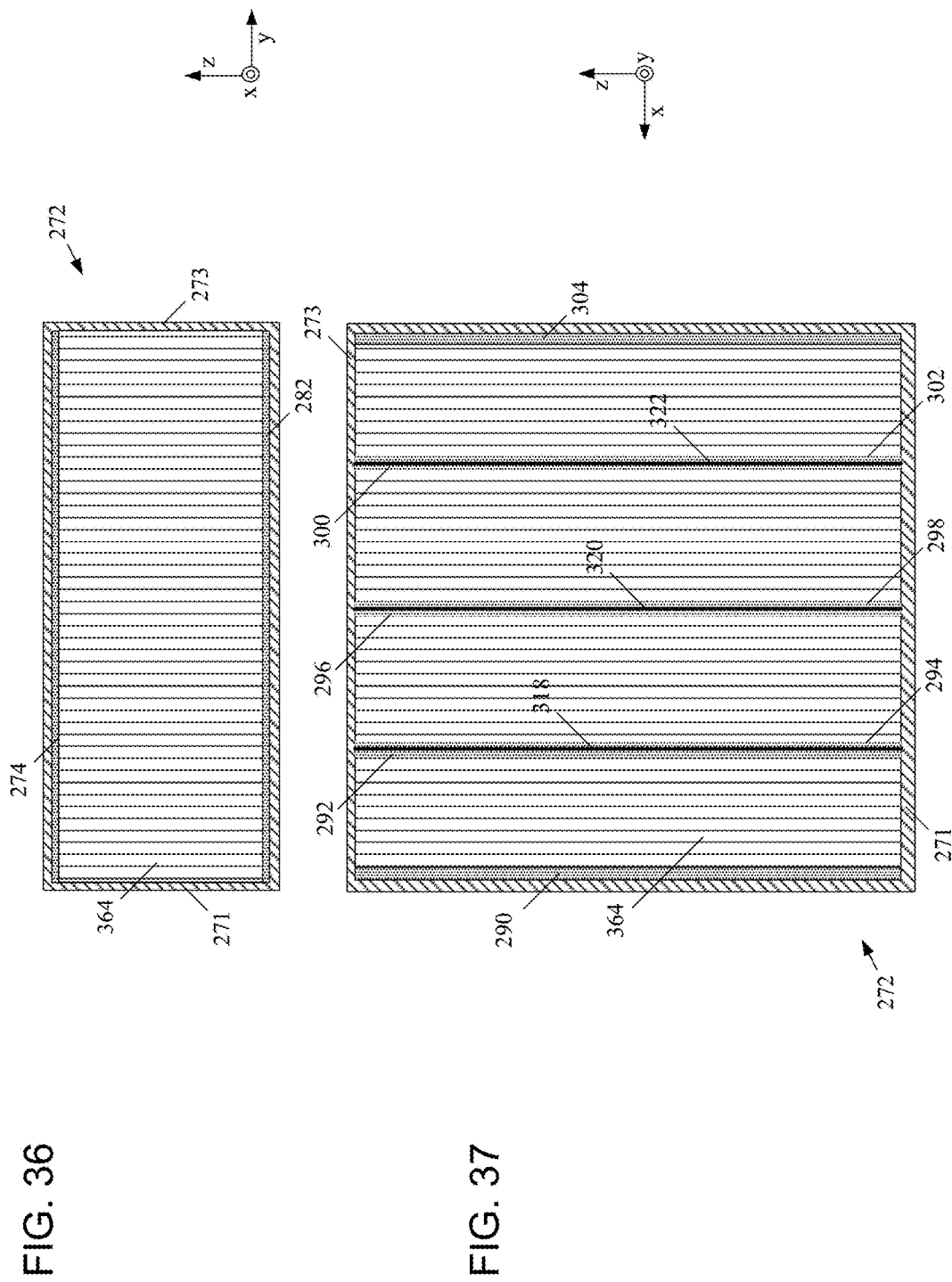
FIG. 36 is a cross-sectional view of the interior of the main housing taken along lines 36-36 in FIG. 34.
FIG. 37 is a cross-sectional view of the interior of the main housing taken along lines 37-37 in FIG. 34.

A cross-sectional view of the main housing 272 along lines 36-36 is seen in FIG. 36. An insulating material 364 is seen contained within the main housing 272, which insulating material extends between the upper electrode 274 and the lower electrode 282. The insulating material 364 preferably comprises a dielectric material in at least some embodiments.

Another cross-sectional view of the main housing 272 along lines 37-37 is seen in FIG. 37. In this view, side electrodes 290,304 are seen to be positioned at opposite ends of the sequence of spaced apart electrode pairs 292,294; 296,298; and 300,302, each electrode of each pair being arranged in parallel with the side electrodes 290,304. Furthermore, as seen in FIG. 37, the insulating material 364 preferably comprising a dielectric material extends between electrodes 290,292; 294,296; 298,300; and 302,304. Additionally, the insulators 318,320,322 forming the electrical barriers between the intermediate electrodes 292,294; 296,298; and 300,302 are seen in FIG. 37.

In at least some alternative embodiments, the insulating material 364 is replaced with a gas that is contained within containment spaces 365 located between opposing electrodes, as seen in FIGS. 36a and 37a. In some preferred embodiments, the gas is hydrogen. Use of hydrogen gas is beneficial insofar as the hydrogen gas—in additional to being an insulator—will provide a degree of lift, thereby reducing the weight of the UAV. This buoyancy-assisted lift provided by the hydrogen gas thus will lessen the power requirements for operating the UAV. The hydrogen gas also may be pressurized in some embodiments, thereby buttressing the structural integrity of the walls of the containment spaces 365. It further is contemplated that, in at least some preferred embodiments, helium gas is utilized instead of hydrogen gas and that, in some embodiments, the helium is pressurized for buttressing the structural integrity of the walls of the containment spaces 365. In still yet other preferred embodiments, a vacuum is created and maintained within the containment spaces of the housing 272. In other preferred embodiments, the gas whether helium or hydrogen is heated. Such heating may be accomplished through spark gaps or resistive heaters utilizing voltage differentials and current flow between electrodes. Of course, no oxygen is introduced especially when hydrogen is utilized so as to eliminate risks of potential explosions or fires.

It will be appreciated that each electrode in FIGS. 36 and 37 has at least two overall substantial dimensions, i.e., length and height, a first of which is at least 80% of at least one of an overall heightwise extent, an overall lengthwise extent, and an overall widthwise extent of the UAV, and a second of which is at least 80% of at least one of the overall heightwise extent, the overall lengthwise extent, and the overall widthwise extent of the UAV. Such specified percentages apply only in some and not all embodiments of the invention and are set forth herein as preferred only in some contemplated scenarios; the percentages are different in other embodiments and may be extremely small, as will be apparent from a review of FIG. 41, for example.

The electrodes in FIGS. 36 and 37 are separated and electrically insulated from each other for enabling a differential in voltage resulting from a differential in electric field strength experienced at the electrodes when within the vicinity of the powerlines. Furthermore, the UAV comprises electrical components electrically connected with the electrodes that establish an electric circuit, with the differential in voltage between the electrodes causing a current to flow through the circuit for powering an electrical load of the electric circuit. A representative arrangement of such electrical components is discussed next with reference to FIG. 38.

Figure 38:
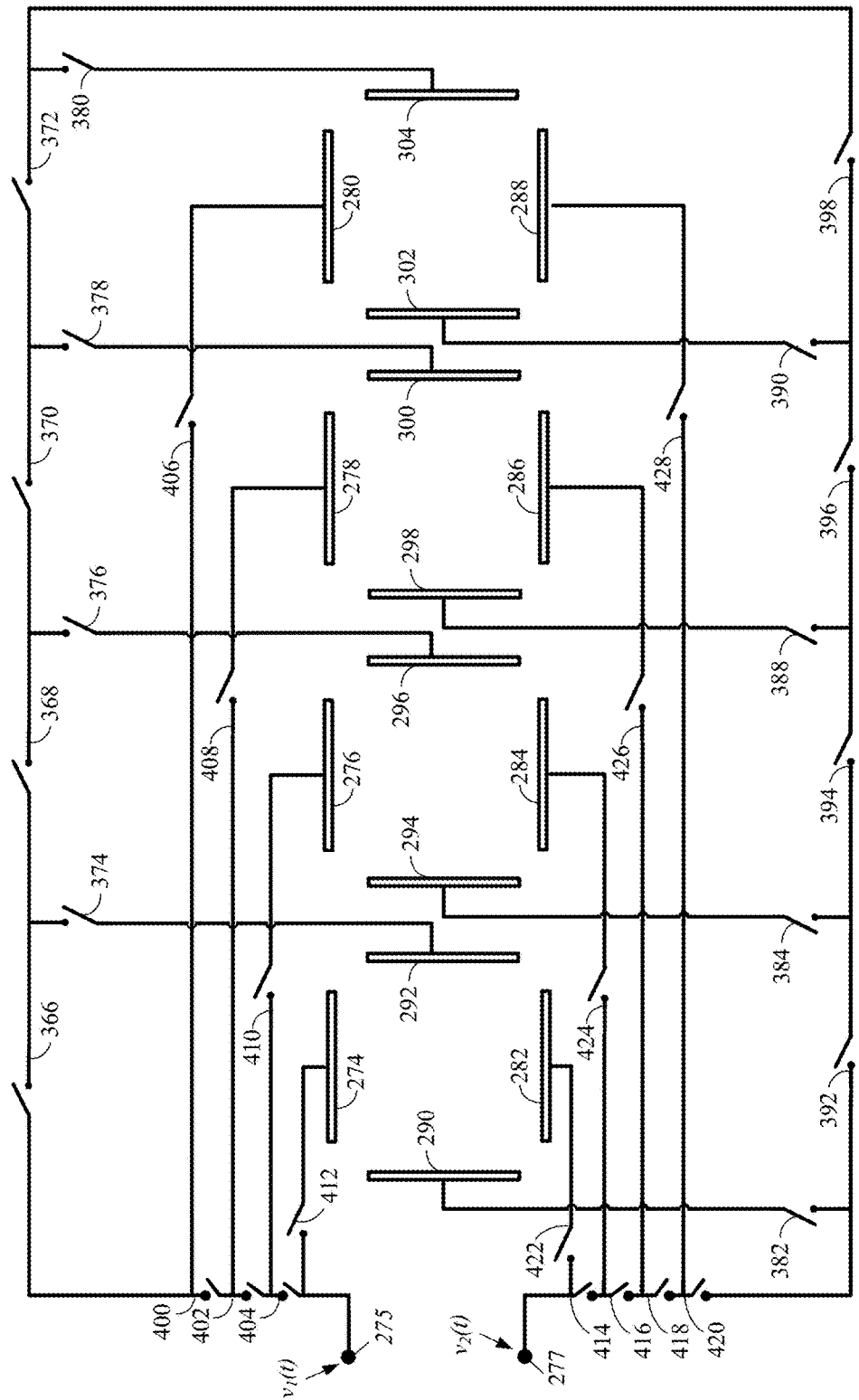
FIG. 38 is a schematic illustration of a plurality of electrodes and a plurality of electrical components for circuit-switching in establishing electric circuits in accordance with one or more embodiments of the invention.

FIG. 38 is a schematic illustration of a plurality of electrodes and a plurality of electrical components for circuit-switching in establishing electric circuits in accordance with one or more embodiments of the invention. Indeed, the schematic illustration is considered to be representative of what may be utilized in connection with an EFA generator similar to that of FIGS. 30-37 but wherein the back terminal conduits are omitted and, as such, numbering in FIGS. 30-37 has been carried forward into FIG. 38, where applicable. In this regard, FIG. 38 schematically illustrates the sixteen electrodes including the upper electrodes 274, 276,278,280; the lower electrodes 282,284,286,288; the side electrodes 290,304; and the intermediate electrodes 292,294, 296,298,300,302. Terminals 275,277 also are schematically illustrated.

In order to provide the ability to establish the plurality of different electric circuits, a set of switches 366,368,370,372, 374,376,378,380,382,384,386,388,390,392,394,396,398, 400,402,404,406, 408,410,412,414,416,418,420,422,424, 426,428 are provided for opening and closing electrical pathways. Broadly as used herein, "switch" is used in the electrical engineering context to indicate an electrical component that can make or break an electric circuit, interrupting the current or diverting it from one pathway to another. It is contemplated that each switch may take one of a plurality of conventional forms and equivalents thereof that are apparent to the Ordinary Artisan.

Additionally, each switch preferably is controlled by a controller in accordance with one or more "circuit-switching" algorithms contained within machine-executable instructions stored in non-transitory machine-readable medium. The controller may comprise a processor, a microcontroller, or an integrated circuit including an application specific integrated circuit (ASIC), or equivalents thereof. The controller may be located in the EFA generator and form part of the illustrated circuit of FIG. 38. Alternatively, the controller may be located external to the EFA generator such as, for example, when the EFA generator is in the form of a removable power supply unit. In the latter scenario, the controller may be included in a secondary housing, or within a portion of the conduits of the main housing. Moreover, the controller may be connected by wire with each switch for controlling the state of the switch or may be connected wirelessly with each switch for controlling the state of the switch. The controller, in accordance with the one or more algorithms, performs circuit switching in order to optimize the power harness of the electric field differentials and the powering of the electrical load. A preferred such algorithm results in the controller selecting and configuring the switches to establish an electric circuit that best matches voltage and current specifications of an electrical load of the electric circuit to be powered.

Broadly speaking, such specifications may be preprogrammed for access by the controller or communicated to and stored by the controller from time-to-time as the object to be powered changes. In some embodiments, the controller determines the power requirements based on detection of an identification of the object to be powered, and in some other embodiments determines the power requirements based on a connection port or outlet to which the object is electrically connected for being powered. One or more sensors also preferably are included for detecting voltages of the electrodes, whereby the controller may determine appropriate electrodes for establishing an electric circuit for powering a particular object.

The switches can be configured by the controller such that a subset of two or more electrodes of the set of electrodes are joined in parallel such that all have a common voltage, which subset is connected through the terminals to another subset of one or more of the electrodes. An example of this would be where switches 400,402,404,406,412 are closed to join in parallel electrodes 274,280, and similarly switches 414,416,418,420,428,392,394,396,382,390 are closed to join in parallel electrodes 288,290,302, while opening all of the other switches illustrated in FIG. 38 and electrically separating electrodes 274,280 joined in parallel from electrodes 288,290,302 joined in parallel. Voltage differentials between the subset of electrodes 274,280 and the subset of electrodes 288,290,302 thus can be used to power an electrical load connected to the terminals.

Figure 4:
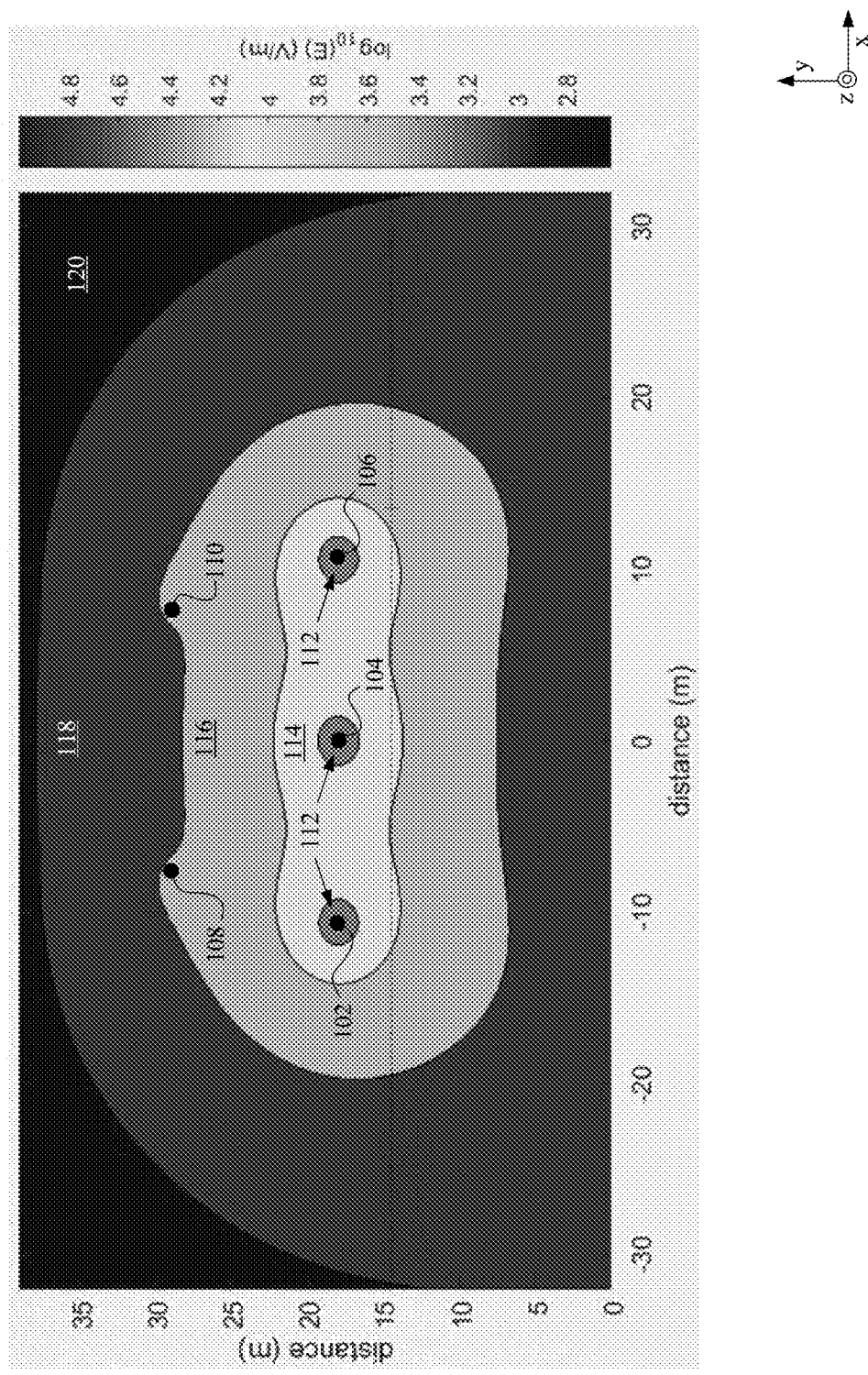
FIG. 4 illustrates a model of electric field strengths within a vicinity of the powerlines.
Figure 5:
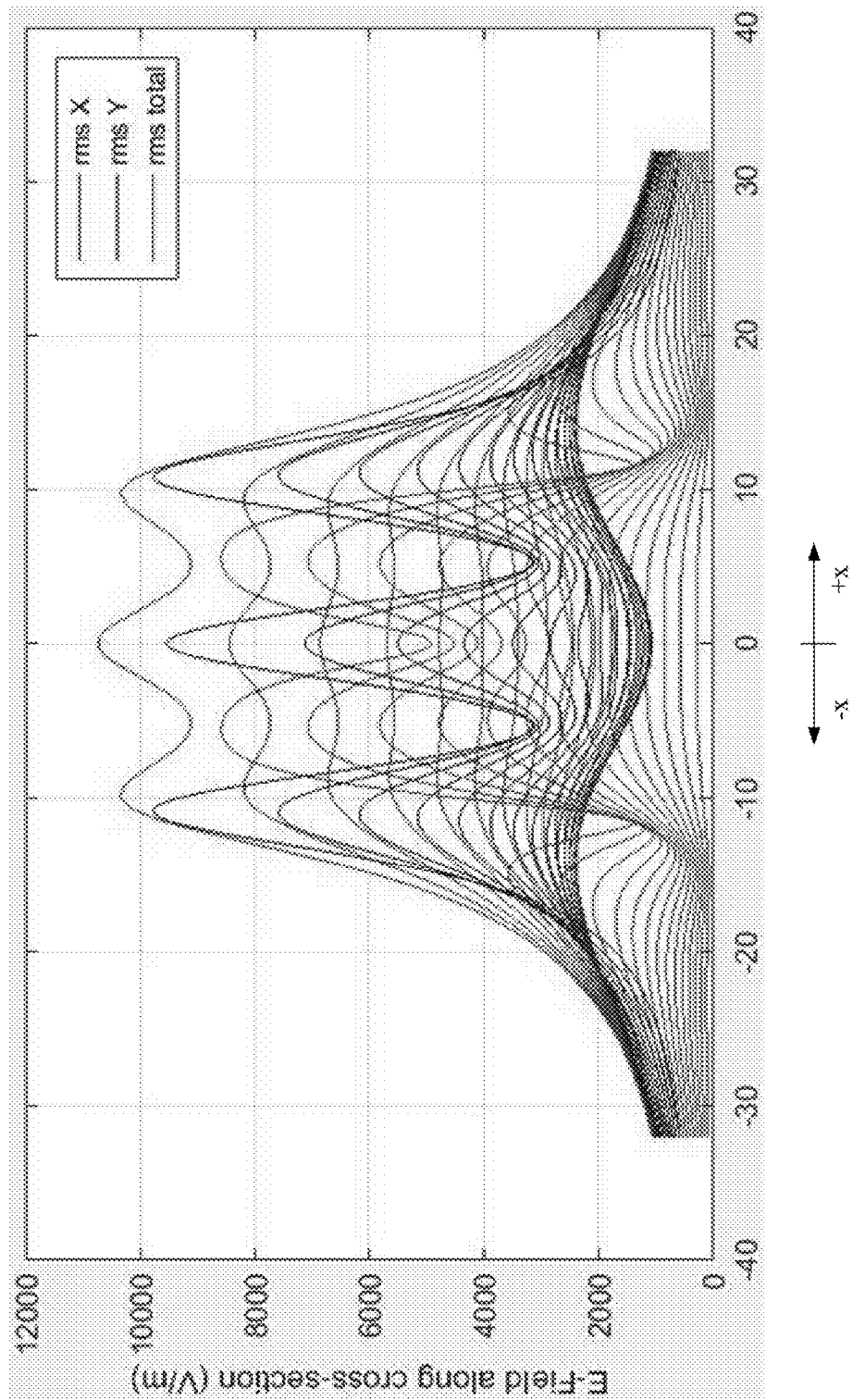
FIG. 5 illustrates another modeling of electric field strengths within a vicinity of the powerlines.

Further, it should be appreciated that the electrodes of a subset need not be in a common or parallel orientation; and that the subsets of electrodes need not be in a common or parallel orientation. Moreover, it should be appreciated that an increase in spacing between electrically separated electrodes also does not necessarily result in a greater voltage differential between the electrodes. This is because, as indicated in FIGS. 4 and 5, the electric fields at any particular point within the vicinity of powerlines represent the combined electric fields of each powerline of the arrangement of powerlines; when three powerlines form part of the arrangement, the electric field strength varies greatly and not necessarily based on separation of or orientation of the electrodes. Hence, the capability of the controller to identify the voltages of the electrodes and establish circuits by including, via the switches, those electrodes having suitable voltages resulting in desired voltage differentials and currents enables the EFA generator to better harvest power from the electrical fields of the powerlines.

This ability is advantageous whether the EFA generator is moving through a vicinity of powerlines or is stationary within the vicinity of powerlines. In the former scenario, establishing different electric circuits by interconnecting different electrodes can yield a desired voltage and/or current for powering the same object, whereas in the second scenario various objects having different voltage and/or current requirements each can individually be accommodated by establishing different electric circuits by interconnecting different electrodes.

Moreover, application of this algorithm preferably is repeatedly done over regular intervals, including intervals less than one second, where the EFA generator moves through electric fields or otherwise experiences varying electric field strengths at the electrodes with resulting varying voltage differentials. This results in varying voltages over time relative to a constant reference voltage and is represented in FIG. 38 by $v_1(t)$ at terminal 275 and $v_2(t)$ at terminal 277. When $v_1(t)$ at terminal 275 and $v_2(t)$ at terminal 277 are different and terminals 275,277 are connected to a load for powering the load, a current as a function of time results.

Due to the varying voltages, the current will vary as well, including reversing in direction so as to result in an alternating current. One or more rectifiers may form part of the electrical pathway between the terminals 275,277 or may be included in the EFA generator and form part of the illustrated circuit of FIG. 38 for converting an alternating current to direct current, as desired. Moreover, any such rectifier can be included as part of a normalizer, which is discussed above.

Furthermore, a plurality of capacitors arranged in series, in parallel, or a combination thereof may form part of the electrical pathway between the terminals 275,277 or may be included in the EFA generator and form part of the illustrated circuit of FIG. 38 for altering the voltage and current characteristics, as desired. Moreover, any such arrangement can be included as part of a normalizer, discussed above. If such an arrangement of capacitors is included, the arrangement preferably is located within an area shielded from the external electric fields actuating the EFA generator. For example, such arrangement may be included in a secondary housing having an interior area that is shielded from the effects of the external electric fields, or within a portion of the conduits that similarly is shielded from the effects of the external electric fields, or even within an area of the main housing that is shielded from the effects of the external electric fields but which area does not include one of the electrodes having the voltage arising from the external electric fields. The use of one or more such capacitor arrangements is believed to be beneficial, for example, when there is a large differential in voltage between electrodes of an established electric circuit.

Figure 39:
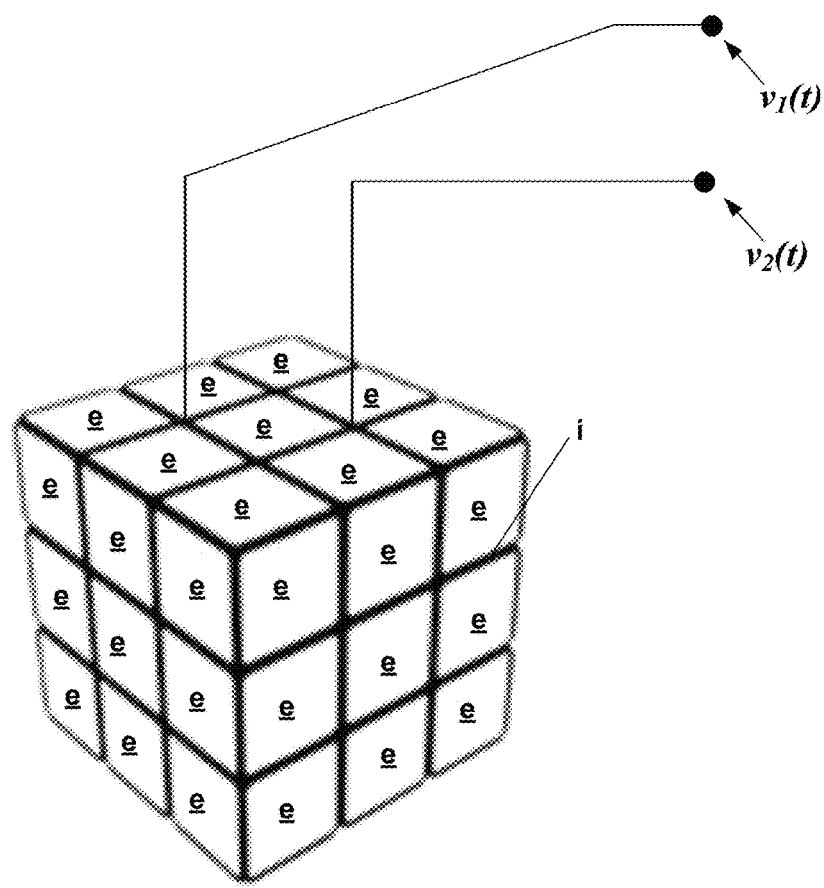
FIG. 39 illustrates an arrangement of electrodes in the shape of a cube.
Figure 40B:
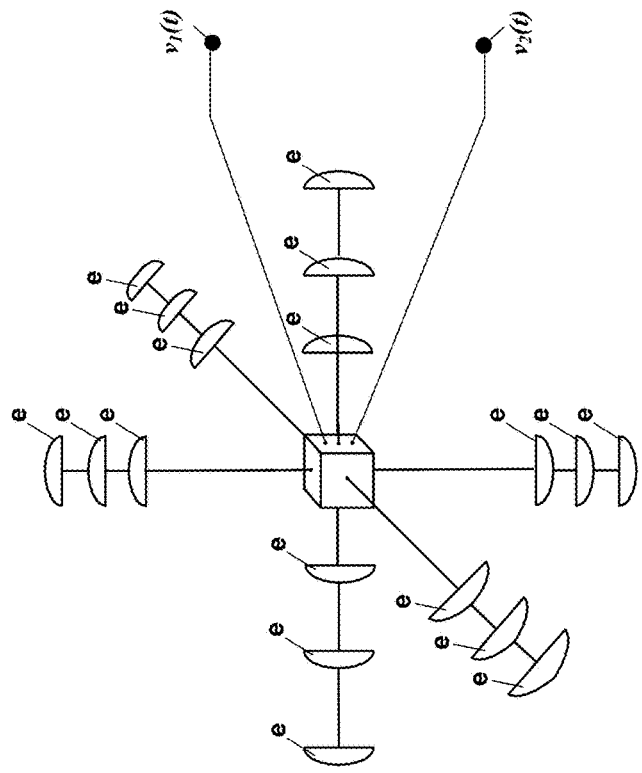
FIG. 40b illustrates another arrangement of electrodes along three orthogonal axes in a nested "jacks" configuration.
Figure 40A:
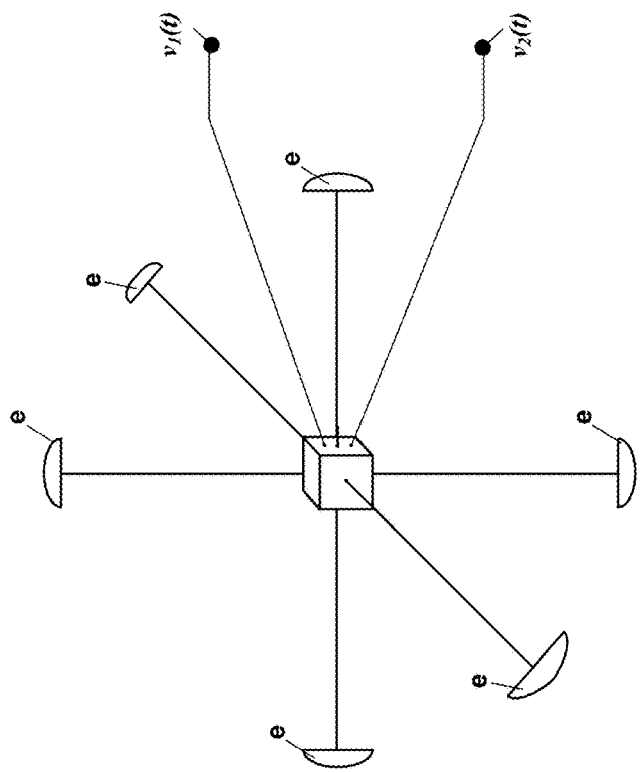
FIG. 40a illustrates another arrangement of electrodes along three orthogonal axes in a "jacks" configuration.
Figure 41:
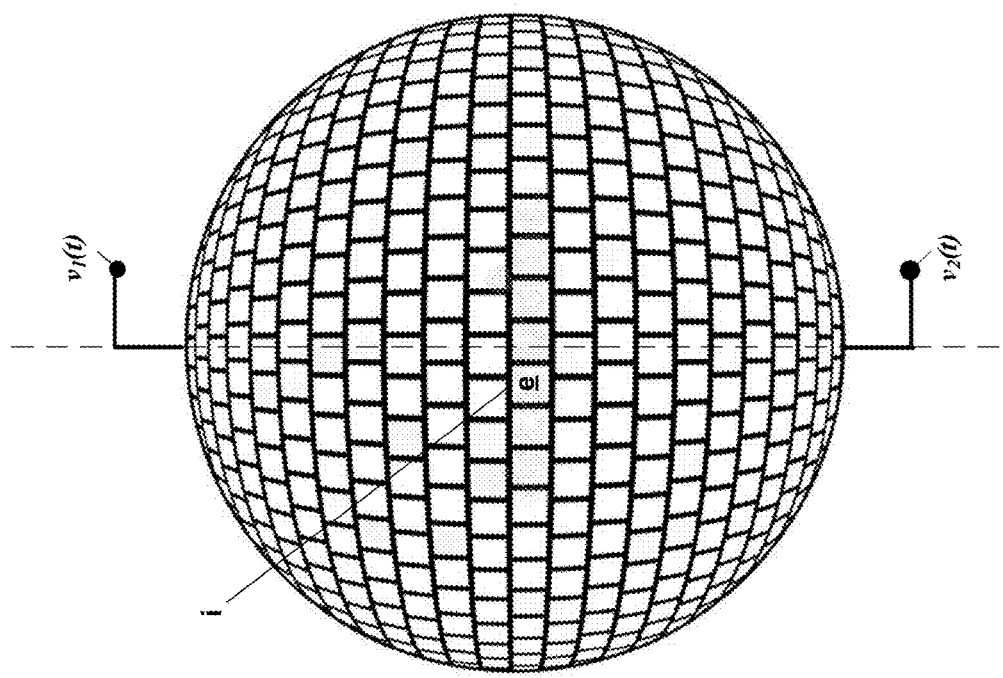
FIG. 41 illustrates another arrangement of electrodes in the shape of a disco ball.

Turning to FIGS. 39-41, it will be appreciated that arrangements of the electrodes may form various shapes.

Furthermore, it will be appreciated that in each arrangement, an area of the plurality of electrodes in at least one of a plurality of different electric circuits that may be established may be less than or equal to a percentage of an area of a set of electrodes in at least one other of the plurality of different electric circuits that may be established. The percentage may be 50%, 25%, or 10%, for example. The area of a plurality of electrodes is calculated by adding the individual area of each electrode of the circuit, which is calculated with reference to the greatest surface area of the electrode without regard to the thickness or width of the electrode.

As seen in FIG. 39, wherein electrodes are identified by the letter "e", the arrangement of electrodes forms a cube having the appearance of a "Rubik's" cube, with the electrodes being located on the outer surface of the cube and electrically insulated from one another. As seen in FIG. 39, nine electrodes form a side of the cube. Additionally, the electrodes are electrically insulated from one another by insulator "i" which outlines the rectangular profile of the electrodes.

While nine electrodes are seen forming each surface of the cube, other matrices of electrodes may be used, including 1×1; 2×2; 4×4; 5×5; 6×6; 7×7; 8×8; 9×9; and 10×10, for example. In an arrangement in which a 10×10 electrode matrix is utilized for each of the six faces, it will be appreciated that, as examples, a first circuit may be established using all of the electrodes; a second circuit may be established using 50% of the electrodes; a third circuit may be established using 25% of the electrodes; and a fourth circuit may be established using 10% of the electrodes. In such scenarios the area of the plurality of electrodes forming part of the second electric circuit is 50% of the area of the plurality of electrodes forming part of the first electric circuit; the area of the plurality of electrodes forming part of the third electric circuit is 25% of the area of the plurality of electrodes forming part of the first electric circuit; and the area of the plurality of electrodes forming part of the fourth electric circuit is 10% of the area of the plurality of electrodes forming part of the first electric circuit.

Additionally, electrodes may be arranged in multiple cube arrangements to form a nested grouping of cubes, wherein each cube is formed by a plurality of electrically insulated electrodes.

FIG. 40a illustrates yet another example of an arrangement of electrodes, wherein six electrodes "e" are located along each of three orthogonal axes in a "jacks" configuration. Additionally, electrodes may be arranged along three orthogonal axes to form a nested jacks arrangement, as seen in FIG. 40b.

FIG. 41 illustrates another example of an arrangement of electrodes (a representative one of which is identified by the letter "e"), wherein the electrodes are located on the outer surface of a sphere so as to resemble a disco ball, with each electrode being located where a mirror would be found in the disco ball. Additionally, the electrodes are electrically insulated from one another by insulator "i" which outlines the quadrilateral-shaped electrodes. Additionally, electrodes may be arranged in multiple sphere arrangements to form a nested grouping of spheres, wherein each sphere is formed by a plurality of electrically insulated electrodes.

It further will be appreciated that within such arrangements as represented by FIGS. 39-41, the controller, switches, sensors, and electrical pathways preferably are contained within an interior of the arrangement of the electrodes, and electrical pathways for the terminals extend from an interior to an exterior of the arrangements, as schematically represented in these figures by the terminals respectively having voltages $v_1(t)$ and $v_2(t)$.

Returning back now to the specific context of UAVs in discussing implementations having one or more aspects and features of the invention, UAVs that are box-like in shape— or at least having a main housing that is box-like in shape— have been described; however, it is contemplated that UAVs may have fixed wings for lift rather than rotors or may have a combination of one or more rotors and one or more fixed wings. Exemplary fixed-wing aircraft representing additional embodiments of UAVs in accordance with one or more aspects and features of the invention are schematically illustrated in FIGS. 42-70, wherein electrodes are identified by the letter "e". Furthermore, it will be appreciated that the schematic illustrations in these figures are intended to show locations of the electrodes, and other elements are omitted for clarity, including the controller, sensor, and switches, and in most cases, landing wheels. Each of FIGS. 42-70 now is specifically discussed.

FIG. 42 schematically illustrates a fixed-wing aircraft 502 having eight electrically separated electrodes indicated by the letter "e", with four electrodes forming a forward box-wing and four electrodes forming a smaller, rear box-wing of the vehicle. In at least some embodiments the main body 503 comprises an interior airtight space that contains helium or hydrogen; in other embodiments, a vacuum is created and maintained within the interior space of the main body. In other preferred embodiments in which a gas is utilized— such as helium or hydrogen, the gas is heated. Such heating may be accomplished through spark gaps or resistive heaters utilizing voltage differentials and current flow between electrodes. Of course, no oxygen is introduced especially when hydrogen is utilized so as to eliminate risks of potential explosions or fires.

FIG. 43 schematically illustrates a fixed-wing aircraft 504 having four electrically separated electrodes indicated by the letter "e", with two electrodes forming a forward annular box-wing and two electrodes forming a smaller, rear annular box-wing of the vehicle. In at least some embodiments the main body 505 comprises an interior airtight space that contains helium or hydrogen; in other embodiments, a vacuum is created and maintained within the interior space of the main body. In other preferred embodiments in which a gas is utilized—such as helium or hydrogen, the gas is heated. Such heating may be accomplished through spark gaps or resistive heaters utilizing voltage differentials and current flow between electrodes. Of course, no oxygen is introduced especially when hydrogen is utilized so as to eliminate risks of potential explosions or fires.

FIG. 44 schematically illustrates a fixed-wing aircraft 506 having a plurality of electrically separated electrodes indicated by the letter "e", with the plurality of electrodes forming a single cylindrical wing. In at least some embodiments the main body 507 comprises an interior airtight space that contains helium or hydrogen; in other embodiments, a vacuum is created and maintained within the interior space of the main body. In other preferred embodiments in which a gas is utilized—such as helium or hydrogen, the gas is heated. Such heating may be accomplished through spark gaps or resistive heaters utilizing voltage differentials and current flow between electrodes. Of course, no oxygen is introduced especially when hydrogen is utilized so as to eliminate risks of potential explosions or fires.

FIG. 45 schematically illustrates a fixed-wing aircraft 508 having a plurality of electrically separated electrodes indicated by the letter "e", with the plurality of electrodes forming a joined wing and each separated from immediately adjacent electrodes by an insulator. In at least some embodiments the main body 509 comprises an interior airtight space that contains helium or hydrogen; in other embodiments, a vacuum is created and maintained within the interior space of the main body.

FIG. 46 schematically illustrates a fixed-wing aircraft 510 having a plurality of electrically separated electrodes indicated by the letter "e", with the plurality of electrodes forming a flat annular wing. In at least some embodiments the main body 511 comprises an interior airtight space that contains helium or hydrogen; in other embodiments, a vacuum is created and maintained within the interior space of the main body. In other preferred embodiments in which a gas is utilized—such as helium or hydrogen, the gas is heated. Such heating may be accomplished through spark gaps or resistive heaters utilizing voltage differentials and current flow between electrodes. Of course, no oxygen is introduced especially when hydrogen is utilized so as to eliminate risks of potential explosions or fires.

FIG. 47 schematically illustrates a fixed-wing aircraft 512 having a plurality of electrically separated electrodes indicated by the letter "e", with the plurality of electrodes forming a rhombodial wing. In at least some embodiments the main body 513 comprises an interior airtight space that contains helium or hydrogen; in other embodiments, a vacuum is created and maintained within the interior space of the main body. In other preferred embodiments in which a gas is utilized—such as helium or hydrogen, the gas is heated. Such heating may be accomplished through spark gaps or resistive heaters utilizing voltage differentials and current flow between electrodes. Of course, no oxygen is introduced especially when hydrogen is utilized so as to eliminate risks of potential explosions or fires.

FIG. 48 schematically illustrates a fixed-wing aircraft 514 having two electrically separated electrodes indicated by the letter "e", with one electrode forming a forward annual box-wing and another electrode forming a smaller, rear annular box-wing of the vehicle. In at least some embodiments the main body 515 comprises an interior airtight space that contains helium or hydrogen; in other embodiments, a vacuum is created and maintained within the interior space of the main body. In other preferred embodiments in which a gas is utilized—such as helium or hydrogen, the gas is heated. Such heating may be accomplished through spark gaps or resistive heaters utilizing voltage differentials and current flow between electrodes. Of course, no oxygen is introduced especially when hydrogen is utilized so as to eliminate risks of potential explosions or fires.

FIG. 49 schematically illustrates a fixed-wing aircraft 516 in the form of a triplane, wherein each of the three wings comprises a respective electrode indicated by the letter "e". Insofar as there are three electrically separated electrodes, in at least some embodiments the combination of electric circuits that can be established are mutually exclusive and, as seen here, may comprise three possible combinations, i.e., (1) a top wing-middle wing combination; (2) a top wing-bottom wing combination; and (3) a middle wing-bottom wing combination. Alternatively, if electrodes are joined in parallel, then the possible combinations further comprise: (1) a top wing plus middle wing-bottom wing combination; (2) a top wing plus bottom wing-middle wing combination; and (3) a middle wing plus bottom wing-top wing combination.

FIG. 50 schematically illustrates a fixed-wing aircraft 518 in the form of a quadruplane, wherein each of the wings comprises a respective electrically separated electrode indicated by the letter "e".

FIG. 51 schematically illustrates a fixed-wing aircraft 520 in the form of a multiplane having eight wings, wherein each of the eight wings comprises a respective electrically separated electrode indicated by the letter "e".

FIG. 52 schematically illustrates a fixed-wing aircraft 522 in the form of a biplane, wherein each of the two wings comprises a respective electrically separated electrode indicated by the letter "e".

FIG. 53 schematically illustrates a fixed-wing aircraft 524 in the form of an unequal-span biplane, wherein each of the two wings comprises a respective electrically separated electrode indicated by the letter "e".

FIG. 54 schematically illustrates a fixed-wing aircraft 526 in the form of a sesquiplane, wherein each of the two wings comprises a respective electrically separated electrode indicated by the letter "e".

FIG. 55 schematically illustrates a fixed-wing aircraft 528 in the form of an inverted sesquiplane, wherein each of the two wings comprises a respective electrically separated electrode indicated by the letter "e".

FIG. 56 schematically illustrates a fixed-wing aircraft 530 in the form of an unstaggered biplane, wherein each of the two wings, supports extending therebetween, and tail wings comprises a respective electrically separated electrode indicated by the letter "e". In at least some embodiments the main body 531 comprises an interior airtight space that contains helium or hydrogen; in other embodiments, a vacuum is created and maintained within the interior space of the main body. In other preferred embodiments in which a gas is utilized—such as helium or hydrogen, the gas is heated. Such heating may be accomplished through spark gaps or resistive heaters utilizing voltage differentials and current flow between electrodes. Of course, no oxygen is introduced especially when hydrogen is utilized so as to eliminate risks of potential explosions or fires.

FIG. 57 schematically illustrates a fixed-wing aircraft 532 in the form of a forwards stagger biplane, wherein each of the two wings, supports extending therebetween, and tail wings comprises a respective electrically separated electrode indicated by the letter "e". In at least some embodiments the main body 533 comprises an interior airtight space that contains helium or hydrogen; in other embodiments, a vacuum is created and maintained within the interior space of the main body. In other preferred embodiments in which a gas is utilized—such as helium or hydrogen, the gas is heated. Such heating may be accomplished through spark gaps or resistive heaters utilizing voltage differentials and current flow between electrodes. Of course, no oxygen is introduced especially when hydrogen is utilized so as to eliminate risks of potential explosions or fires.

FIG. 58 schematically illustrates a fixed-wing aircraft 534 in the form of a backwards stagger biplane, wherein each of the two wings, supports extending therebetween, and tail wings comprises a respective electrically separated electrode indicated by the letter "e". In at least some embodiments the main body 535 comprises an interior airtight space that contains helium or hydrogen; in other embodiments, a vacuum is created and maintained within the interior space of the main body. In other preferred embodiments in which a gas is utilized—such as helium or hydrogen, the gas is heated. Such heating may be accomplished through spark gaps or resistive heaters utilizing voltage differentials and current flow between electrodes. Of course, no oxygen is introduced especially when hydrogen is utilized so as to eliminate risks of potential explosions or fires.

Figure 59:
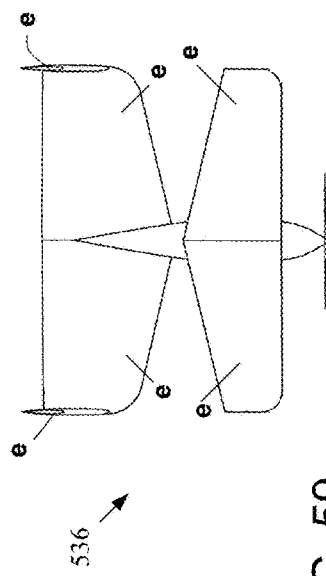
FIGS. 59-61 schematically illustrate another fixed-wing UAV in accordance with one or more embodiments of the invention.
Figure 60:
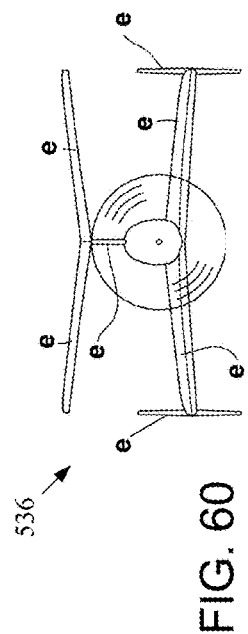
Figure 61:
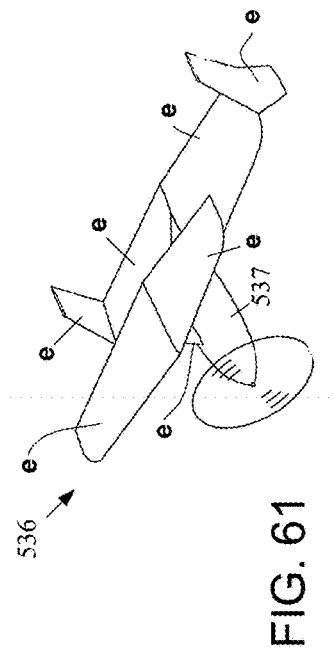

FIGS. 59-61 schematically illustrate another fixed-wing aircraft 536 comprising seven electrically separated electrodes, each indicated by the letter "e". In at least some embodiments the main body 537 (FIG. 61) comprises an interior airtight space that contains helium or hydrogen; in other embodiments, a vacuum is created and maintained within the interior space of the main body. In other preferred embodiments in which a gas is utilized—such as helium or hydrogen, the gas is heated. Such heating may be accomplished through spark gaps or resistive heaters utilizing voltage differentials and current flow between electrodes. Of course, no oxygen is introduced especially when hydrogen is utilized so as to eliminate risks of potential explosions or fires.

Figure 62:
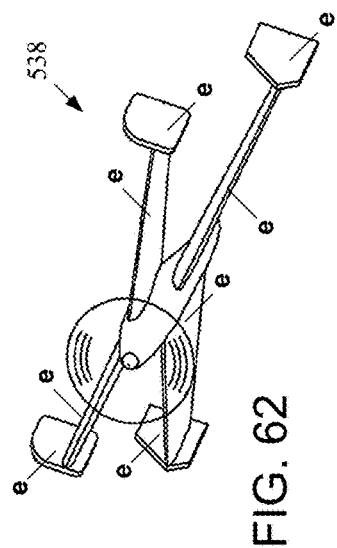
FIGS. 62-64 schematically illustrate another fixed-wing UAV in accordance with one or more embodiments of the invention.
Figure 63:
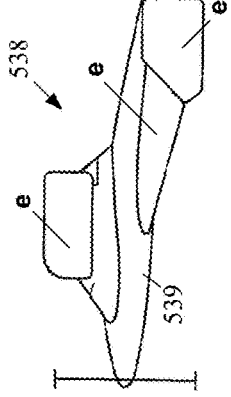
Figure 64:
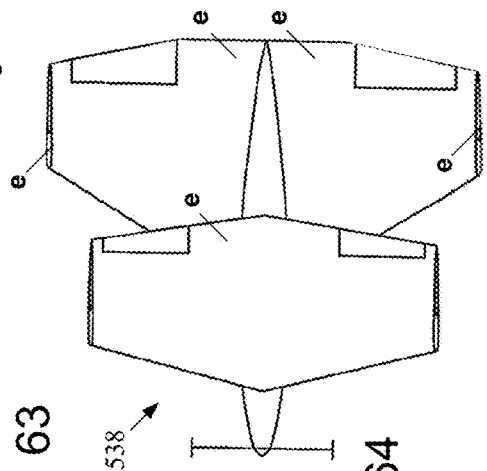

FIGS. 62-64 schematically illustrate another fixed-wing aircraft 538 comprising eight electrically separated electrodes, each indicated by the letter "e". In at least some embodiments the main body 539 (FIG. 63) comprises an interior airtight space that contains helium or hydrogen; in other embodiments, a vacuum is created and maintained within the interior space of the main body. In other preferred embodiments in which a gas is utilized—such as helium or hydrogen, the gas is heated. Such heating may be accomplished through spark gaps or resistive heaters utilizing voltage differentials and current flow between electrodes. Of course, no oxygen is introduced especially when hydrogen is utilized so as to eliminate risks of potential explosions or fires.

Figure 65:
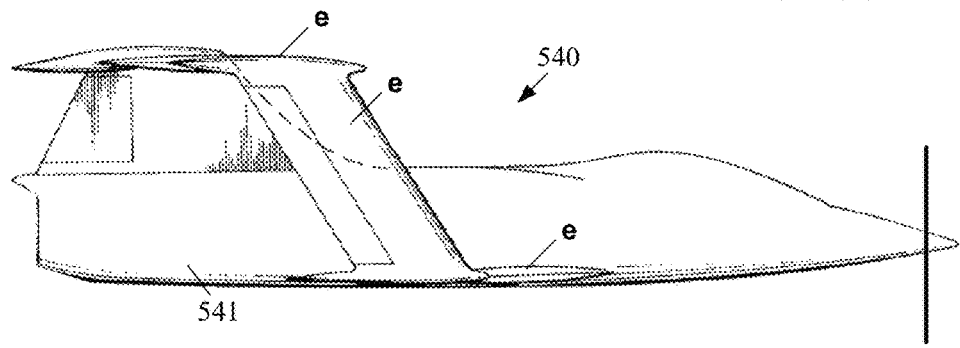
FIGS. 65-67 schematically illustrate another fixed-wing UAV in accordance with one or more embodiments of the invention.
Figure 66:
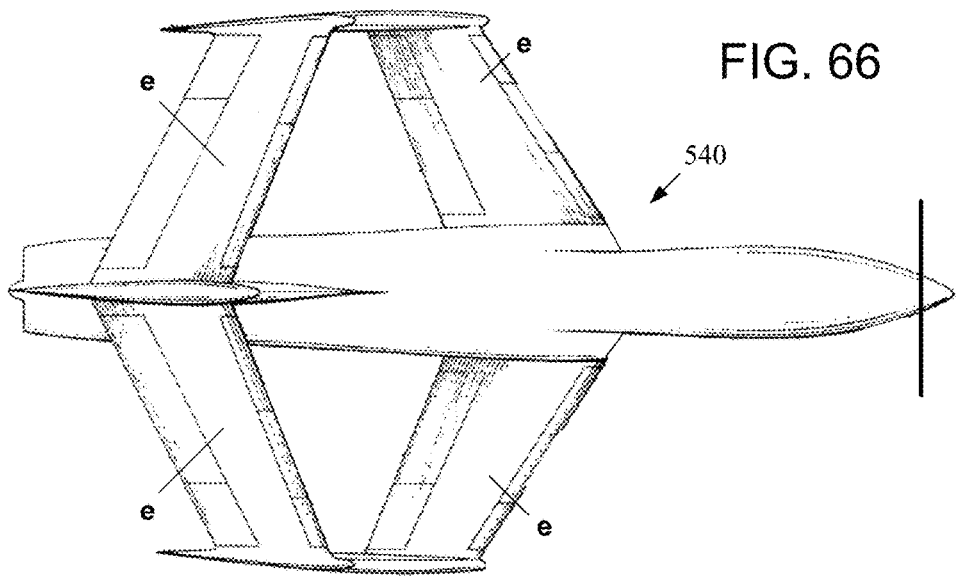
Figure 67:
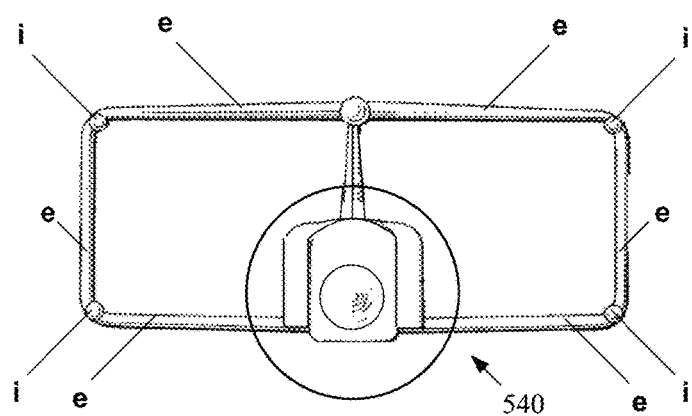

FIGS. 65-67 schematically illustrate another fixed-wing aircraft 540 comprising six electrically separated electrodes, each indicated by the letter "e". In at least some embodiments the main body 541 (FIG. 65) comprises an interior airtight space that contains helium or hydrogen; in other embodiments, a vacuum is created and maintained within the interior space of the main body. In other preferred embodiments in which a gas is utilized—such as helium or hydrogen, the gas is heated. Such heating may be accomplished through spark gaps or resistive heaters utilizing voltage differentials and current flow between electrodes. Of course, no oxygen is introduced especially when hydrogen is utilized so as to eliminate risks of potential explosions or fires.

FIGS. 68-70 schematically illustrate another fixed-wing aircraft 542 comprising six electrically separated electrodes, each indicated by the letter "e". In at least some embodiments the wings 543,545 (FIG. 68) each comprises an interior airtight space that contains helium or hydrogen; in other embodiments, a vacuum is created and maintained within these interior spaces. In other preferred embodiments in which a gas is utilized—such as helium or hydrogen, the gas is heated. Such heating may be accomplished through spark gaps or resistive heaters utilizing voltage differentials and current flow between electrodes. Of course, no oxygen is introduced especially when hydrogen is utilized so as to eliminate risks of potential explosions or fires.

FIGS. 71-74 illustrate another rotorcraft 544 comprising two rotors assemblies 546,548 located at opposite ends of the rotorcraft, with a camera 550 located on an intermediate housing 552 spaced equidistant to the two rotor assemblies. Preferably, rotor assembly 546 comprises a top electrode 558 comprising an annular shape and a bottom electrode 560 comprising a generally hemispherical shape; and rotor assembly 548 comprises a top electrode 562 comprising an annular shape and a bottom electrode 564 comprising a generally hemispherical shape.

Figure 73:
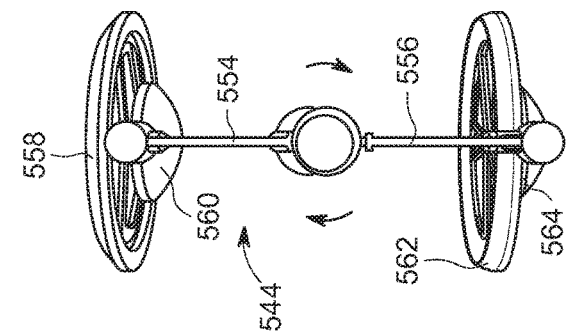
FIGS. 71-74 illustrate another UAV comprising a rotorcraft in accordance with one or more embodiments of the invention.
Figure 72:
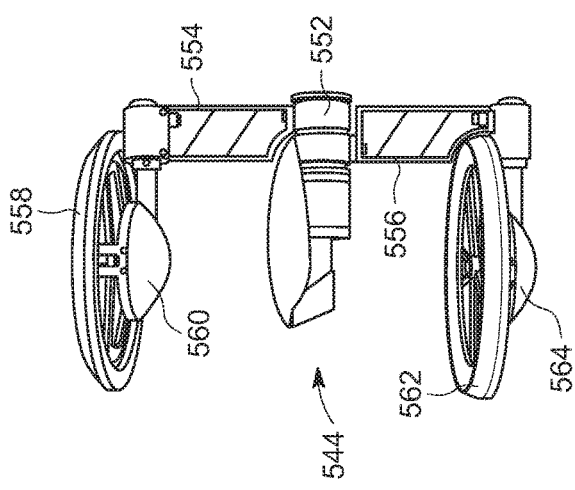
Figure 74:
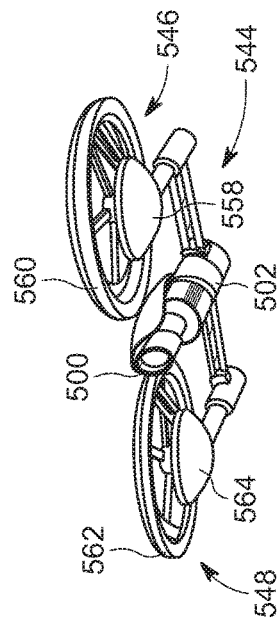
Figure 71:
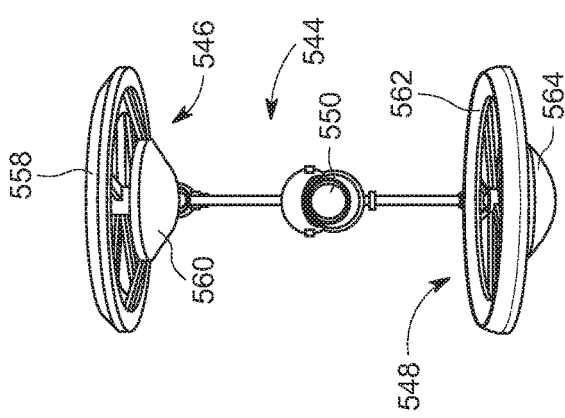

As schematically illustrated in FIG. 73, each of the rotor assemblies is rotationally connected by a respective frame 554,556 that rotates about the intermediate housing 552. This enables the rotorcraft to operate with the rotor assemblies located 180 degrees from each other at any desired orientation about the intermediate housing 552. For example, the rotor assemblies are seen in a generally vertical position in each of FIGS. 71, 72, and 73, and in a generally horizontal position in FIG. 74. Advantageously, such flexibility in orientation during operation permits the rotor assemblies—and specifically electrodes thereof—to be positioned within varying electric field strengths within the vicinity of powerlines so as to create a desired voltage differential.

Figure 75:
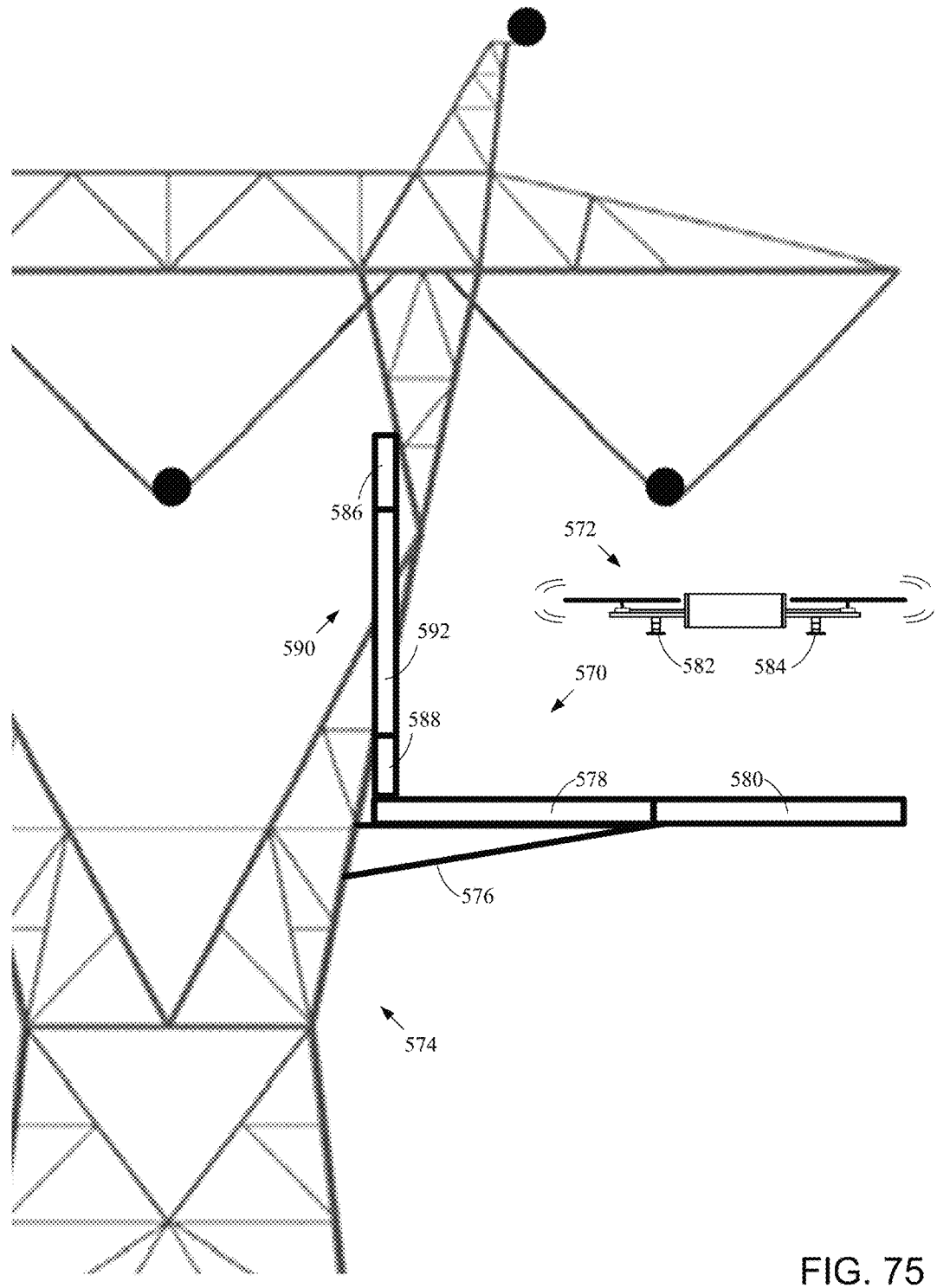
FIG. 75 schematically illustrates a charging station utilizing an EFA generator for charging of a UAV within a vicinity of powerlines in accordance with one or more embodiments of one or more aspects and features of the invention.

Another context of use of the invention comprises charging (or recharging) of devices. In this context, FIG. 75 illustrates a charging station 570 utilizing an EFA generator for charging of a UAV 572 within a vicinity of powerlines. The charging station 570 is mounted to a support structure of the powerlines, which is in the form of a tower 574. The mounting is accomplished with one or more brackets 576.

Figure 76:
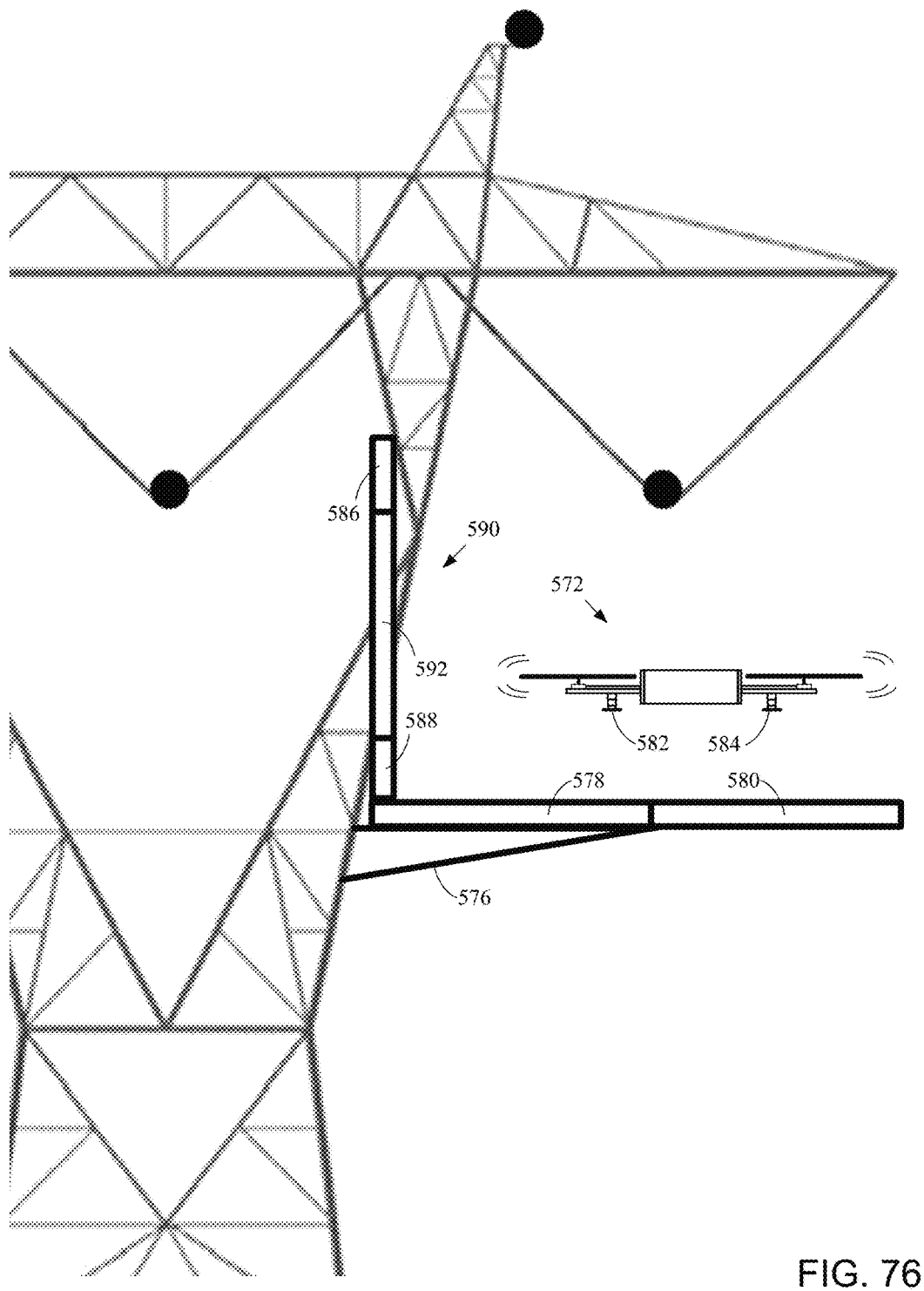
FIGS. 76-77 further schematically illustrate a landing by the UAV onto a platform of the charging station of FIG. 75 in accordance with one or more embodiments of one or more aspects and features of the invention.
Figure 77:
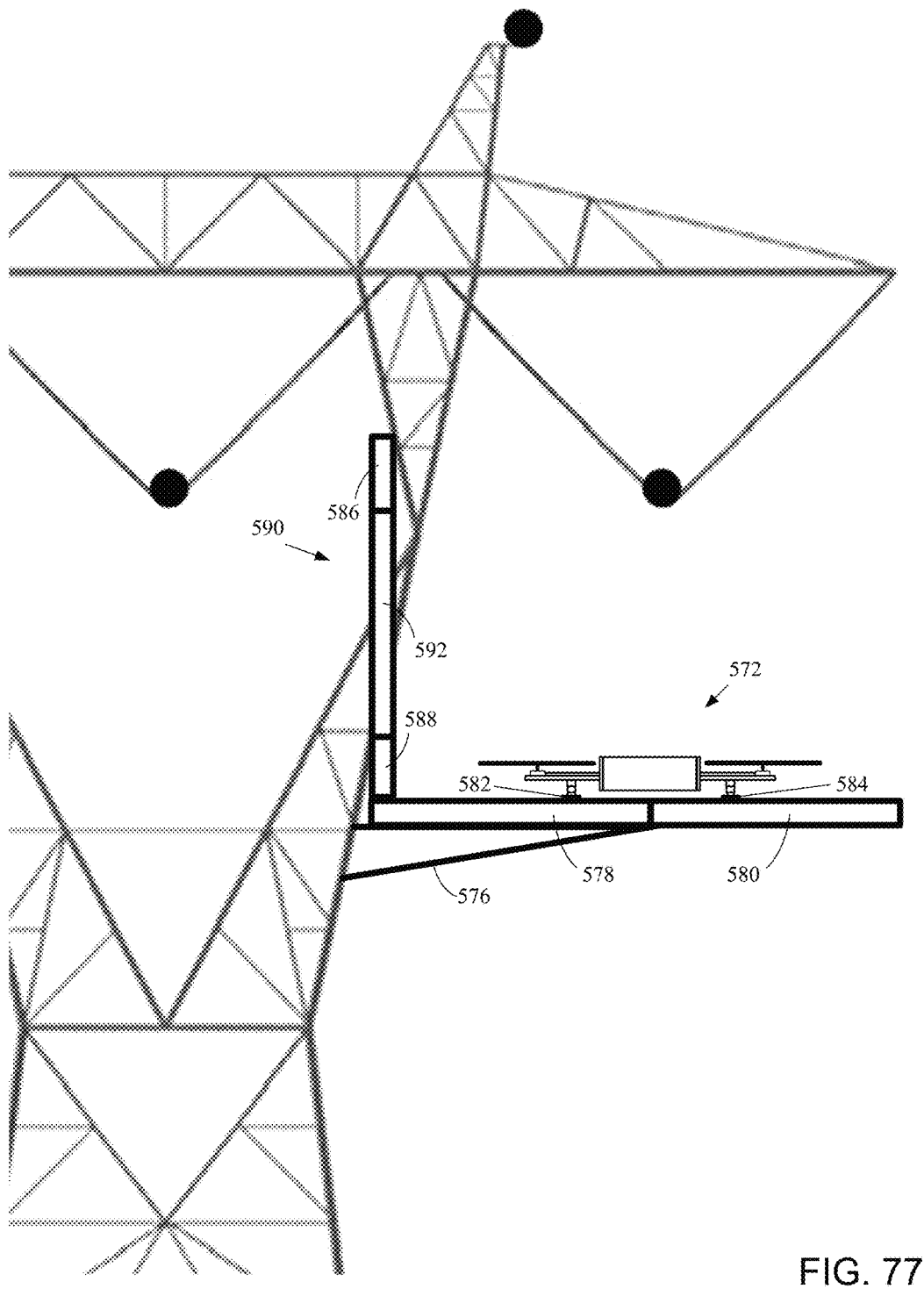

The charging station 570 comprises an interface for electric coupling with the UAV for charging of a rechargeable battery of the UAV. The interface schematically illustrated in FIG. 75 comprises a landing platform for a UAV that is formed by two electrically insulated conducting plates preferably in the form of metallic plates 578,580 that serve as electric terminals upon which the UAV 572 lands. A landing by the UAV 572 is illustrated collectively by FIGS. 75-77. In this scenario, the feet 582,584 of the UAV 572 each preferably includes an electric terminal for electrically coupling with the metallic plates 578,580, and the UAV 572 lands such that each of the feet 582,584 contacts only a respective one of the metallic plates 578,580.

Figure 78:
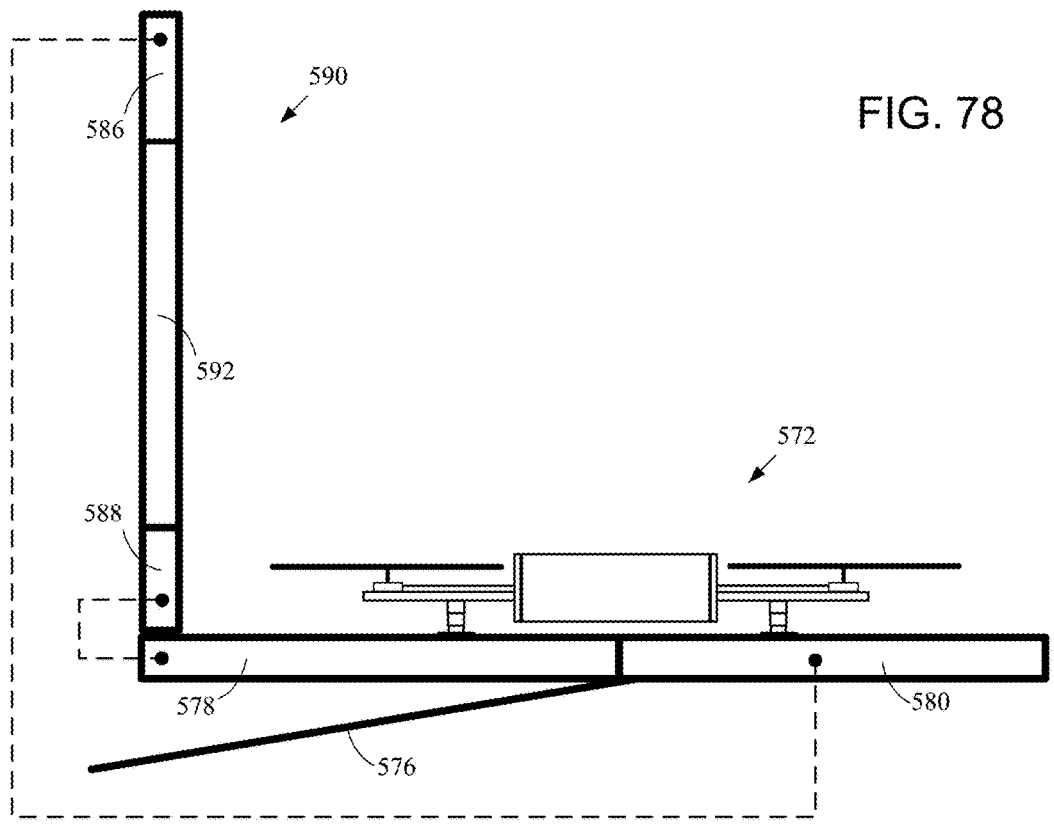
FIG. 78 schematically illustrates the UAV supported on the platform of the charging station of FIG. 75 in a position for charging in accordance with one or more embodiments of one or more aspects and features of the invention.
Figure 79:
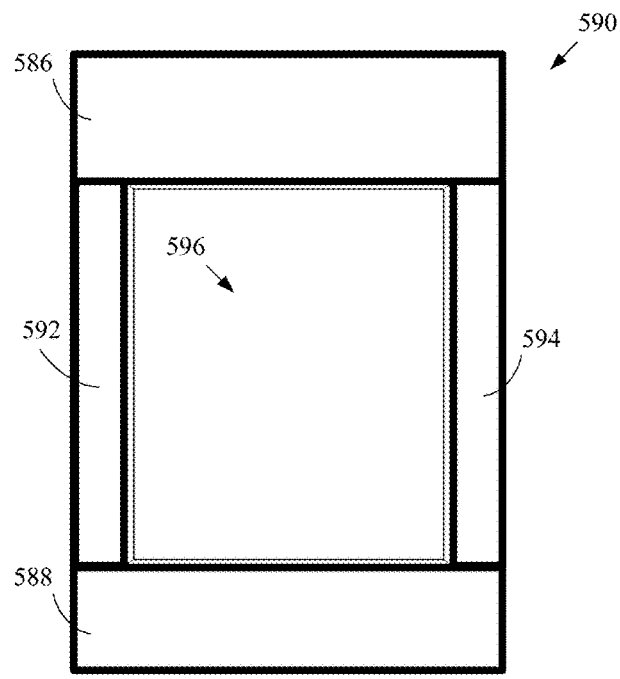
FIG. 79 schematically illustrates a front view of the EFA generator of the charging station of FIG. 75 in accordance with one or more embodiments of one or more aspects and features of the invention.

The charging station 570 further comprise an EFA generator 590 for powering the UAV 572 through the interface. While the EFA generator is seen in side plan view in FIGS. 75-78, a front view of just the EFA generator 590 is seen in FIG. 79. The EFA generator comprises first and second housings 586,588 and a set of electrodes contained therein. A first subset of the set comprises one or more electrodes and is contained within the first housing 586, and a second subset of the set comprises one or more electrodes and is contained within the second housing 588. The first housing 586 is mounted an at elevation above the first housing with a first column 592 and a second column 594 extending between the first and second housings 586,588. The columns preferably serve as conduits for containing electrical wiring and electrical components of the EFA generator. Additionally, the first and second housings and the first and second columns define an opening 596 through the EFA generator 590 for allowing wind to pass therethrough.

The first subset of electrodes and the second subset of electrodes are electrically insulated from one another for enabling a differential in voltage therebetween resulting from a differential in electric field strength experienced there at in the vicinity of the powerlines. The first subset is electrically connected with the first metallic plate 578 and the second subset is electrically connected with the second metallic plate 580 through electrical components (omitted for clarity) such that an electric circuit is completed when the feet of a UAV are supported on the metallic plates 578,580, as schematically illustrated in FIG. 78.

In particular, electrical components of the EFA generator are electrically connected with the first and second subsets of one or more electrodes and are configured to establish a circuit therewith for charging of a rechargeable battery of the UAV when electronically coupled through the interface. Voltage differentials between the first and second sets cause electric current flows through the electric circuit for charging the battery of the UAV.

It will be appreciated that the current and voltage may be normalized within the EFA generator, within the UAV, or at a location of the charging station between the EFA generator and the UAV. Normalization as used herein is intended to mean converted, reduced, filtered, or otherwise put into a form for consumption by the object being powered. Such normalization may comprise utilization of one or more of: conventional technologies for converting alternating current to direct current; conventional technologies for providing from a varying voltage source a range of voltage, a minimum voltage, or a maximum voltage; and conventional technologies for providing from a varying current source a range of voltage, a minimum voltage, or a maximum current voltage. A normalizer preferably is included, an example of which component is described above with reference to FIGS. 7 and 8.

In some embodiments, the EFA generator further comprises a controller and sensors such as voltage detectors for causing different circuits to be established, by which different voltage and current specifications of UAVs may be met. Additionally, the EFA generator includes components for identifying the voltage and current specification to be met, which components may comprise for example: a transceiver for wirelessly communicating with a UAV, whereby an identification of the UAV is received for lookup of the voltage and electric current specification, or whereby the voltage and electric current specification is received directly from the UAV; and a camera and/or microphone whereby the UAV is identified by analysis of audio or visual data that is acquired from the camera or microphone.

In other embodiments, the charging platforms comprises a plurality of interfaces in the form of outlets, and the act of a UAV plugging into one of the plurality of outlets indicates the voltage and power specification to be provided, with each interface having a particular voltage and power specification. Moreover, each interface may have a physical port configuration corresponding to a particular voltage and power specification. It further is contemplated that a particular voltage and power specification may identify a specific voltage and current, or may specify a range of voltage, a range of current, or ranges of voltage and current. Additionally, it is contemplated that a UAV may plug into one of the plurality of outlets either when landed or while hovering.

Figure 80:
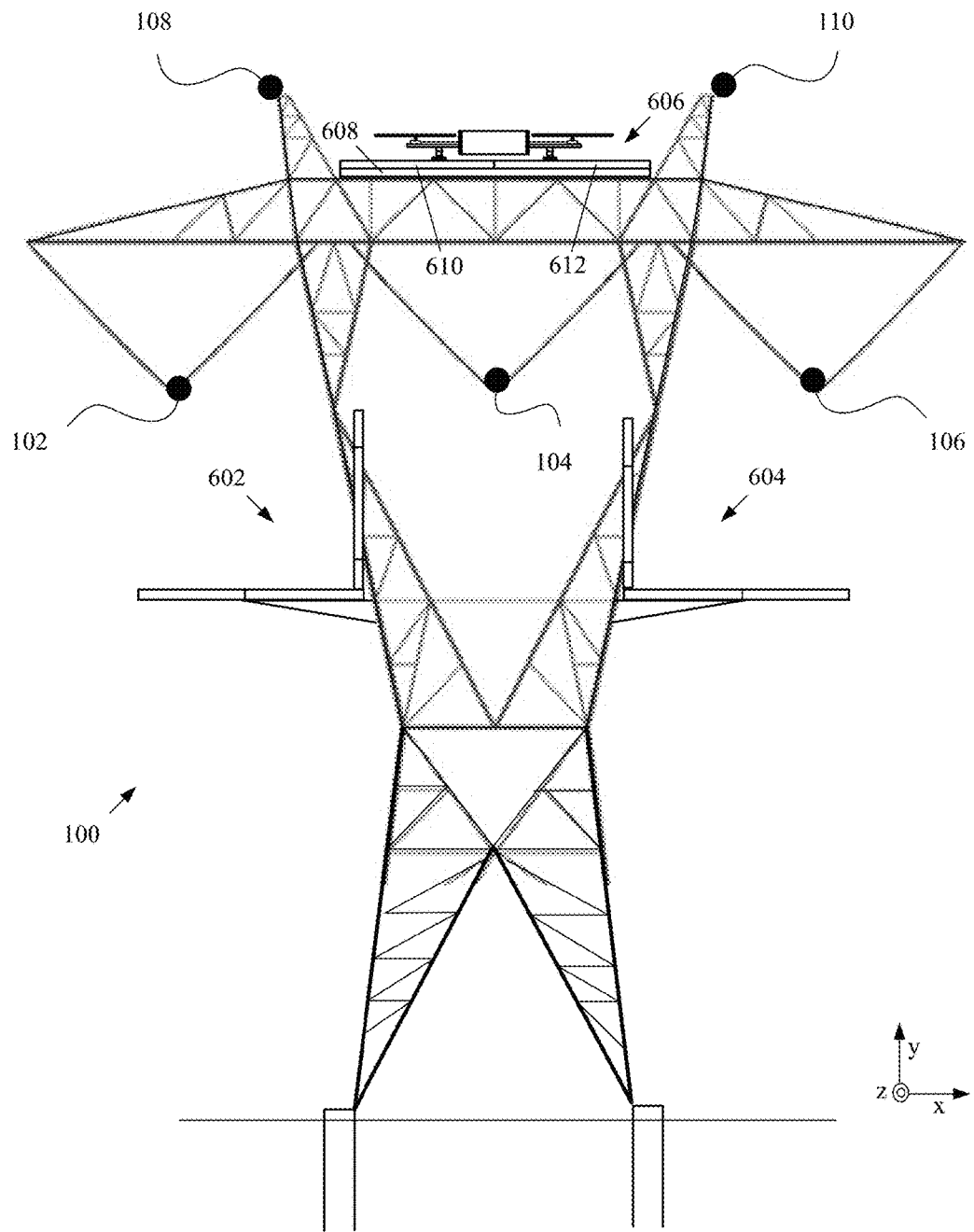
FIG. 80 schematically illustrates charging stations in accordance with one or more embodiments of one or more aspects and features of the invention mounted to the exemplary powerline transmission tower of FIG. 1.

Additional charging stations 602,604 are similar to that of FIGS. 75-79 and are illustrated in FIG. 80 as being mounted to the exemplary powerline transmission tower 100 of FIG. 1. Another charging station 606 is shown being mounted to a top of the tower 100. This other charging station 606 is similar, but different in certain respects from charging stations 570,602,604.

In particular, the EFA generator of charging station 606 comprises a set of one or more electrodes contained within the main housing 608, which housing is seen located under the metallic plates 610,612 of the landing platform. If a plurality of electrodes is included in the set, then the plurality of electrodes preferably is configurable such that two or more of the electrodes are electrically connected so that a voltage differential is not maintained between them, thereby joining and functioning as a larger electrode. The set is connected to one of the metallic plates—for example plate 610—of the landing platform, and unlike the other charging stations described above, the second metallic plate 612 is connected to a ground of the tower 100. In such scenario, the EFA generator preferably includes electrical components arranged to handle significantly large voltage differentials.

In variations of the charging stations 570,602,604, one of the subsets of electrodes can be grounded by electrical connection to the ground of the tower, thereby functioning in manner similar to charging station 606 when the electrical pathway to ground is configured as part of the established circuit.

Figure 2:
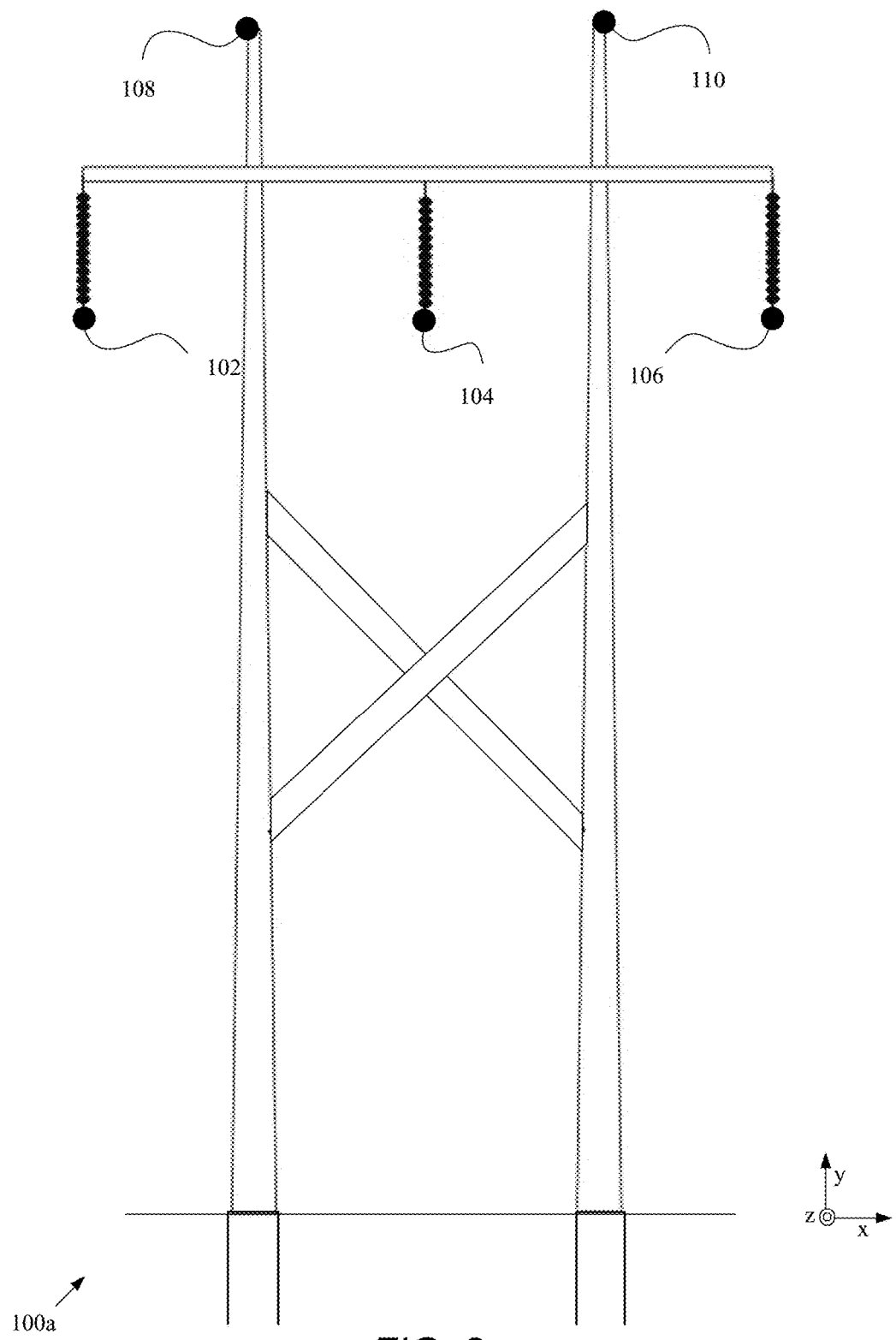
FIG. 2 is a schematic illustration of another exemplary powerline transmission tower of a power transmission system.
Figure 3:
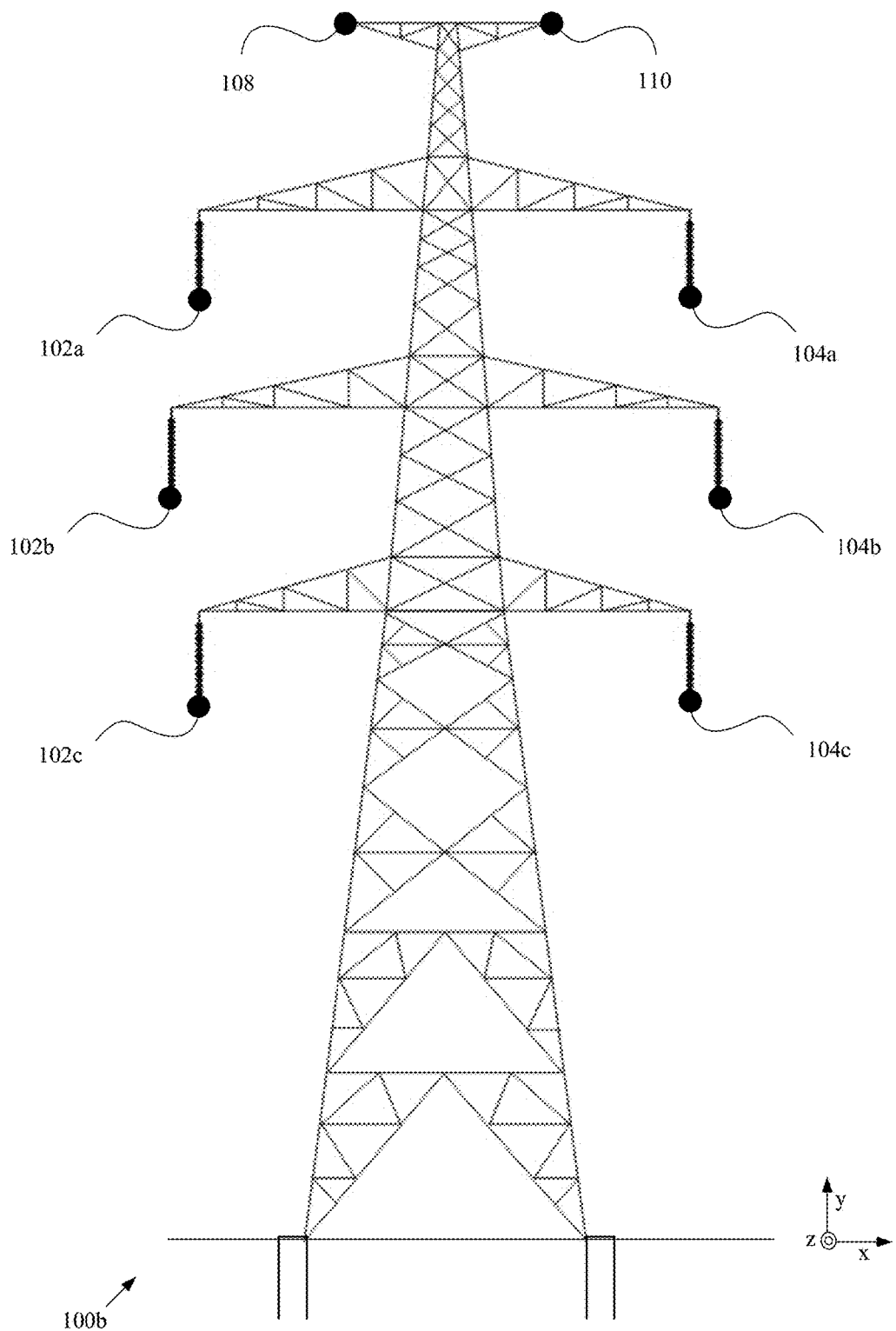
FIG. 3 is a schematic illustration of another exemplary powerline transmission tower of a power transmission system.
Figure 81:
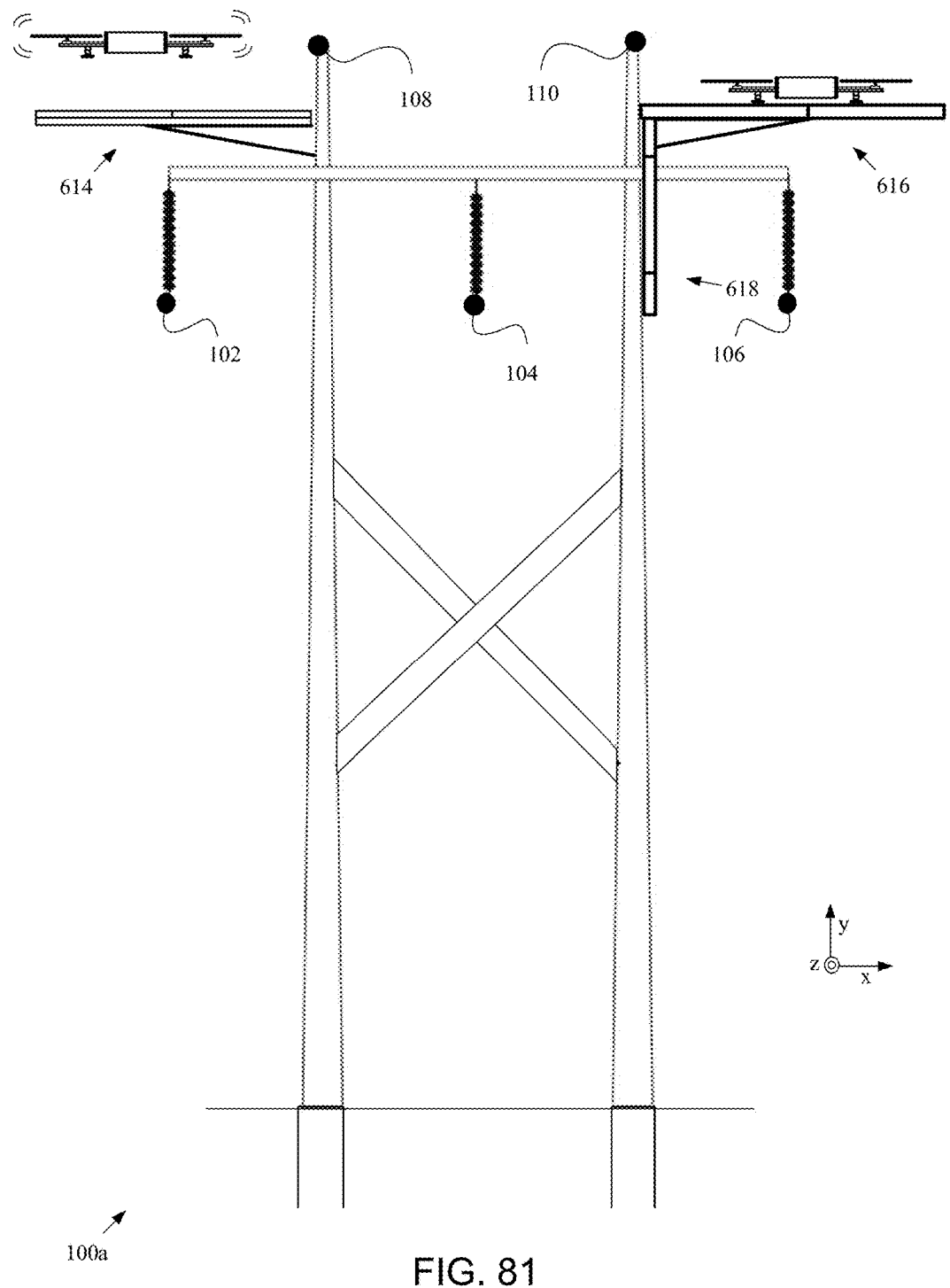
FIG. 81 schematically illustrates charging stations in accordance with one or more embodiments of one or more aspects and features of the invention mounted to the exemplary powerline transmission tower of FIG. 2.
Figure 82:
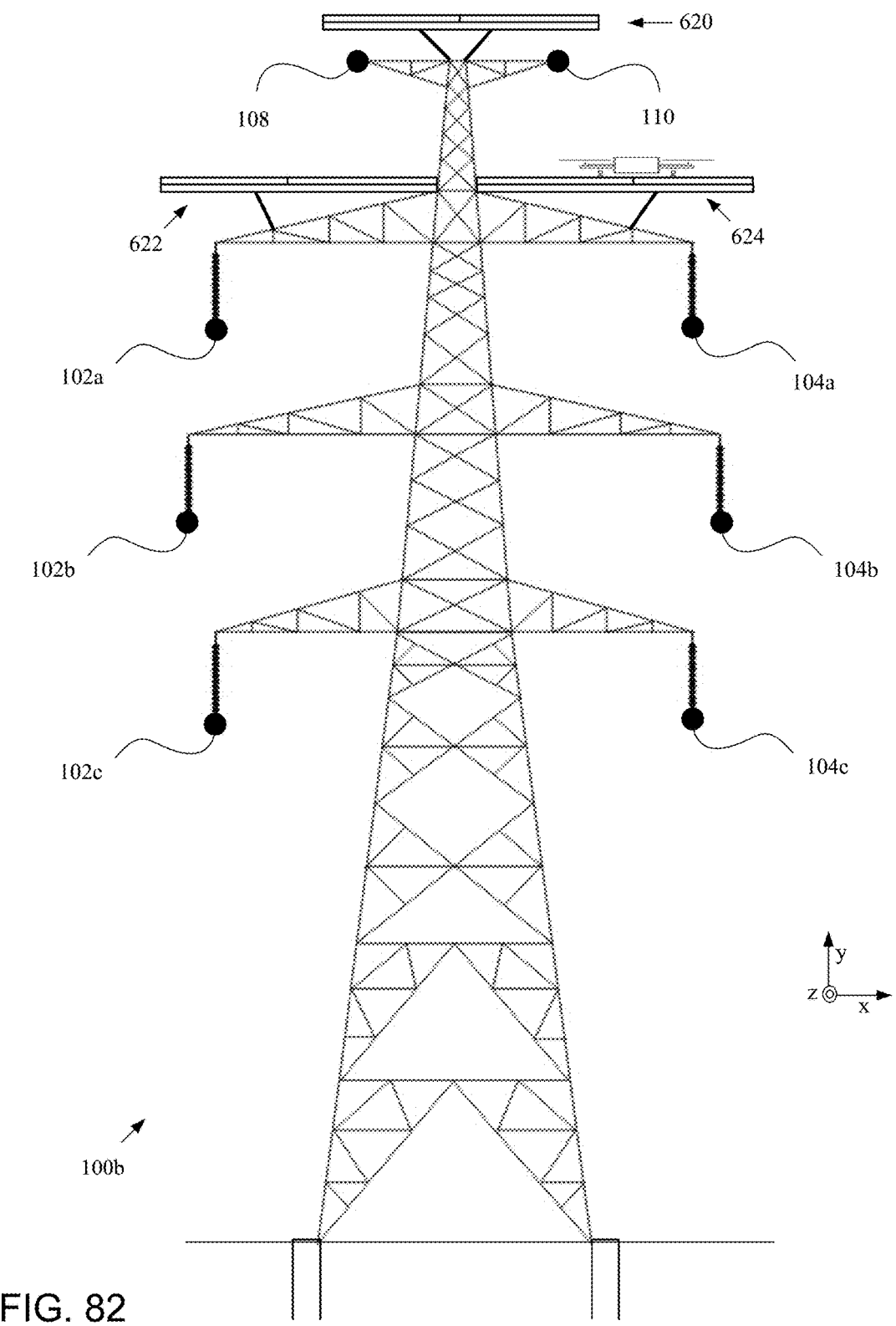
FIG. 82 schematically illustrates charging stations in accordance with one or more embodiments of one or more aspects and features of the invention mounted to the exemplary powerline transmission tower of FIG. 3.
Figure 83:
FIGS. 83-86 schematically illustrate a UAV in which an electrical pathway to ground is provided by utilizing an electrical pathway of the UAV to a shield wire typically found with powerlines, which preferably is accessible by a flying UAV when between powerline transmission towers, all in accordance with one or more embodiments of one or more aspects and features of the invention.
Figure 84:
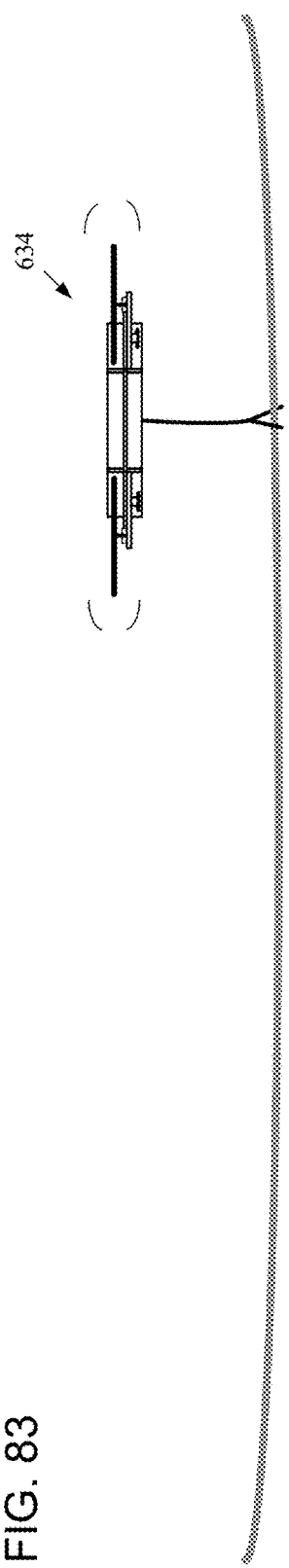
Figure 85:
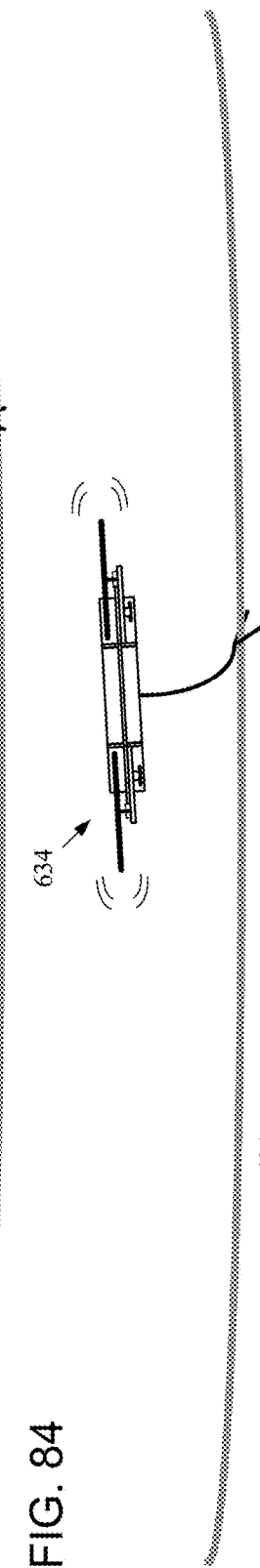
Figure 86:
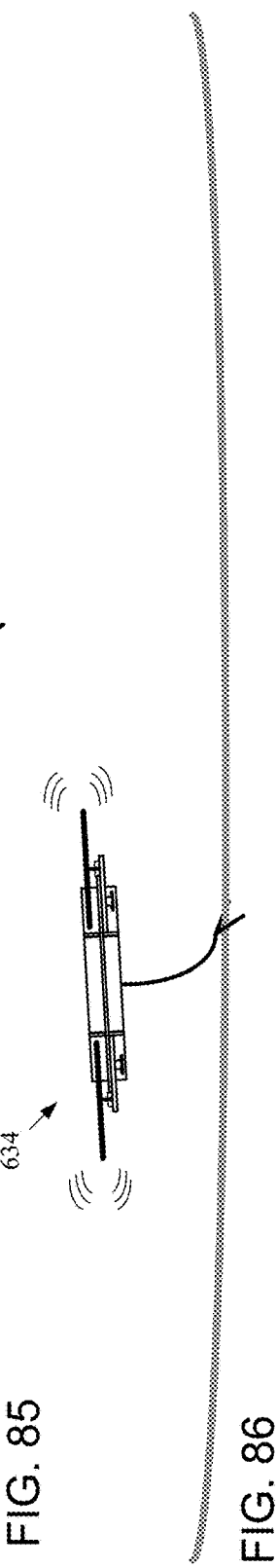

The above-disclosed charging stations are illustrated being used with the exemplary powerline transmission tower 100a of FIG. 2 in FIG. 81; and are illustrated as being used with the exemplary transmission tower 100b of FIG. 3 in FIG. 82. In particular, charging station 614 of FIG. 81 is like charging station 606 of FIG. 80; charging station 616 of FIG. 81 is like charging station 590 except that the EFA generator 618 is oriented downwardly rather than upwardly; and each of charging stations 620,622,624 of FIG. 82 is like charging station 606 of FIG. 80.

It will be appreciated that by utilizing an electrical pathway to ground, as done in charging stations 606,614,620, 622,624, an EFA generator will be able to realize greater voltage differentials between ground and electrodes of the EFA generator. FIGS. 83-86 schematically illustrate a UAV 634 having an EFA generator that likewise utilizes a pathway to ground by utilizing an electrical pathway of the UAV to a shield wire typically found with powerlines. The electrical pathway to ground (i.e., to the shield wire) comprises a forked line 626 that is connected at one end to the main housing of the UAV and that includes a fork defined by two sublines 628,630 at the other end thereof. While the line 626 preferably is electrically insulated, the sublines 628,630 of the fork preferably comprise exposed conductors for physical engagement with the shield wire 632. The UAV navigates to lower the fork onto the shield wire for continued engagement therewith, and then proceeds to travel long the shield wire. During engagement with the shield wire, the UAV is powered by and represents an electrical load of an established circuit that includes electrodes of the EFA generator and the shield wire. Alternatively, or additionally, a rechargeable power source is charged during engagement with the shield wire. Both before and after engagement with the shield wire, the UAV is powered by a rechargeable power source or the UAV is powered by the EFA generator based on voltage differentials arising from the varying electric field strengths.

Figure 87:
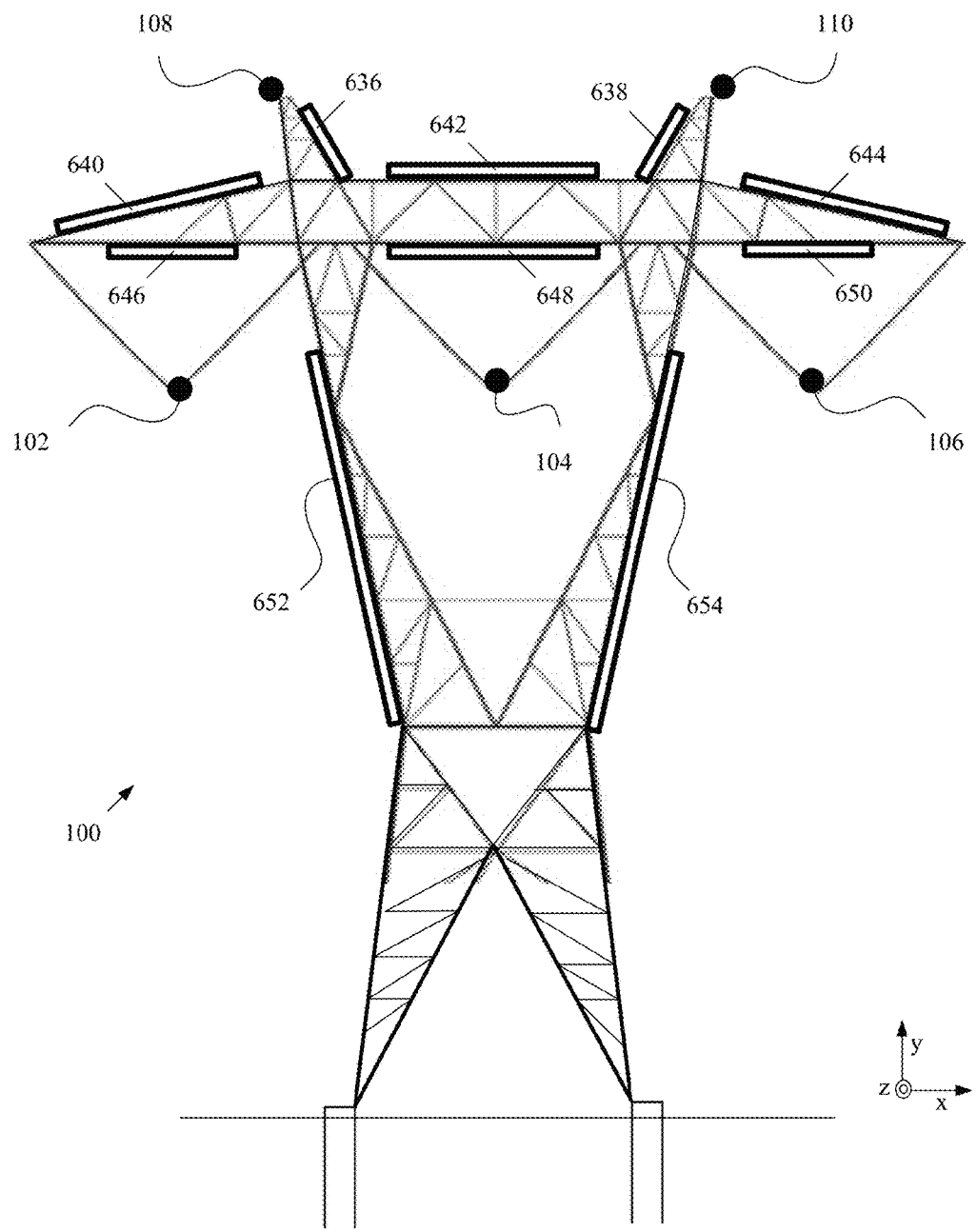
FIG. 87 schematically illustrates power strips in accordance with one or more embodiments of one or more aspects and features of the invention mounted to the exemplary powerline transmission tower of FIG. 1.

It further will be appreciated that EFA generators may be mounted to towers of powerlines and utilized in applications other than charging stations. Moreover, the EFA generators preferably include electrical pathways to ground, which ground is provided by the towers. Such EFA generators may thus take the form of "power strips" for use in powering objects that are configured to couple therewith. Such power strips—each including an EFA generator with one or more interfaces—are schematically illustrated in FIG. 87 and include power strips 636,638,640,642,644,646,648,650. In other embodiments, no pathway to ground may be provided and such power strips preferably are longer so as to be able to select a wider variety of voltage differentials; power strips 652,654 are exemplary of such power strips, in which no pathway to ground is utilized. These power strips 652,654 preferably include circuit switching, discussed above with regard to FIG. 38. Furthermore, when utilizing power strips 652,654, no electrical connection to the ground of the tower 100 is required; power strips 652,654 may simply be mounted to the frame of the tower. Such mounting may be by straps or even zip ties.

Figure 88:
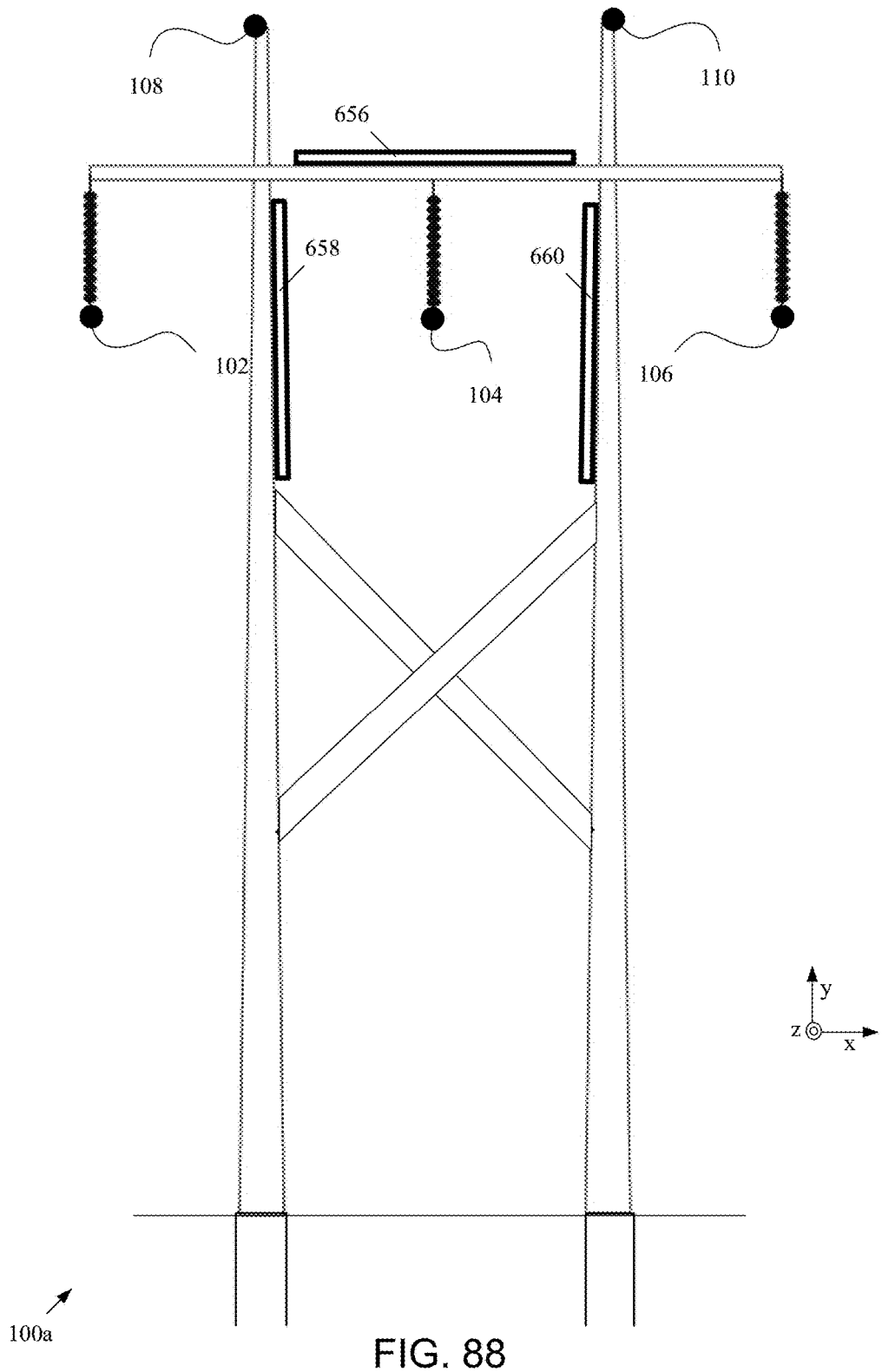
FIG. 88 schematically illustrates power strips in accordance with one or more embodiments of one or more aspects and features of the invention mounted to the exemplary powerline transmission tower of FIG. 2.
Figure 89:
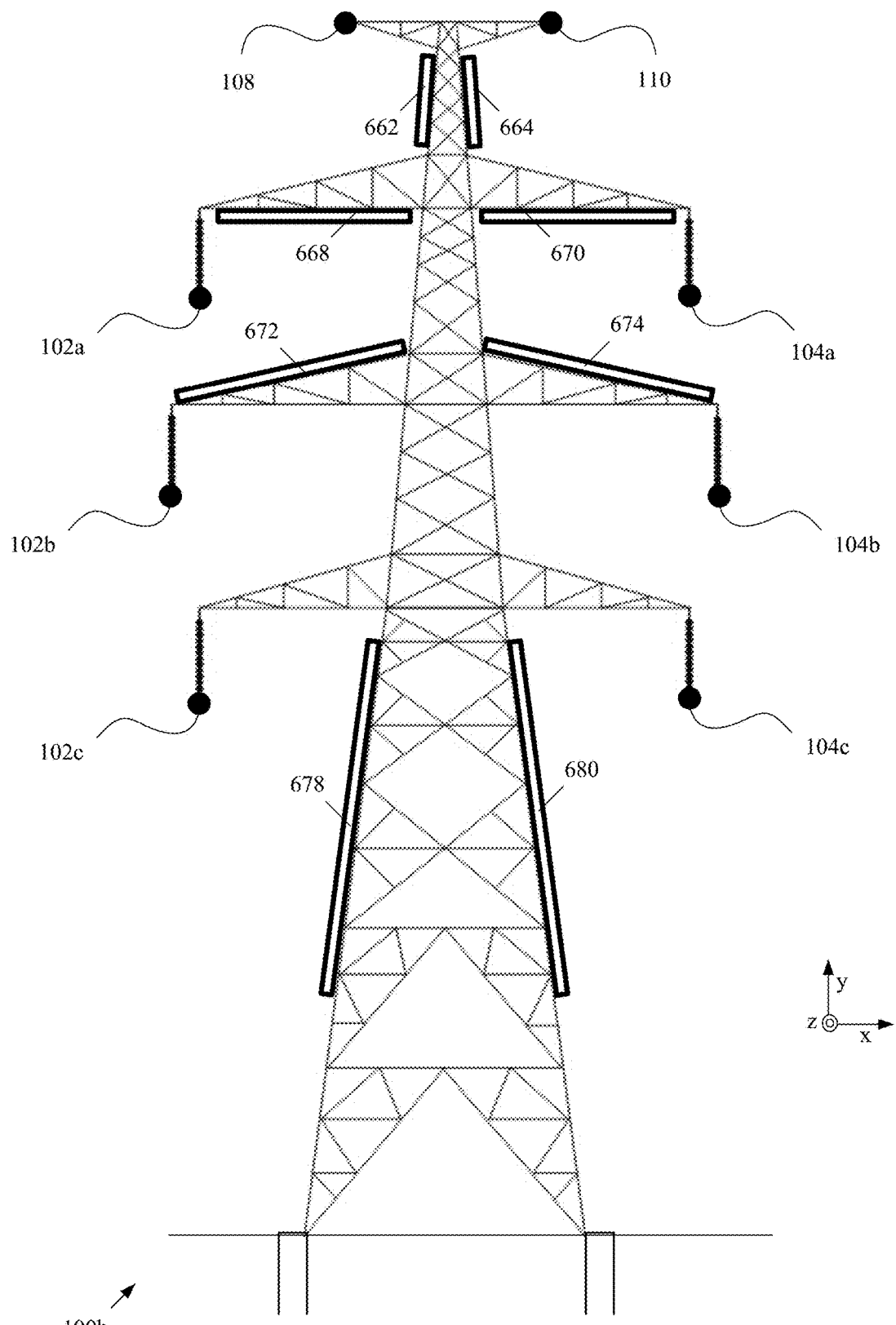
FIG. 89 schematically illustrates power strips in accordance with one or more embodiments of one or more aspects and features of the invention mounted to the exemplary powerline transmission tower of FIG. 3.

The power strips are illustrated as mounted to exemplary tower 100 in FIG. 87. Use of such power strips further is illustrated with tower 100a in FIG. 88 and with tower 100b in FIG. 89. In FIG. 88, power strip 656 is like power strip 642 in FIG. 87, and power strips 658,660 are like power strips 652,654 in FIG. 87. In FIG. 89, power strips 662,664 each is like power strips 636,638,640,642,644,646,648,650 in FIG. 87 and power strip 656 in FIG. 88; and power strips 668,670,672,674,678,680 in FIG. 89 each is like power strips 652,654 in FIG. 87 and power strips 658,660 in FIG. 88.

It further will be appreciated that an EFA generator may be integrated into an object to be powered such that an external interface is omitted, and that the object with integrated EFA generator may be mounted to a support tower of powerlines. Such apparatus may include, for example, one or more sensors and a transmitter for wirelessly transmitting data acquired from the one or more sensors. Such sensors may comprise, for example, an accelerometer, a gyroscope, a barometer, a light sensor, a compass, a microphone, an inclinometer, a magnetometer, and a camera. The transmitter may form part of a transceiver, such that wireless communications may be sent to and received from the apparatus. It is further contemplated that messages may be communicated along powerlines by communicating between such apparatus when mounted to towers along the powerlines, thereby hopping the message over long distances.

In one such apparatus, one or more sensors such as those found in an iPhone are included. Such sensors may be arranged to detect an abnormal position in a normal range of movement of a tower as well as an abnormal rate of such change. In some commercial embodiments currently contemplated, such apparatus include an iPhone for not only detecting one or more such abnormal changes, but for also communicating such detection, whether via email or text message, and whether over cellular, Bluetooth, or WiFi communications. Such sensors may comprise, for example, accelerometers, gyroscopes, and one or more cameras. Outdated iPhones no longer desired or used for their intended purposes may be utilized in such implementations.

Figure 90:
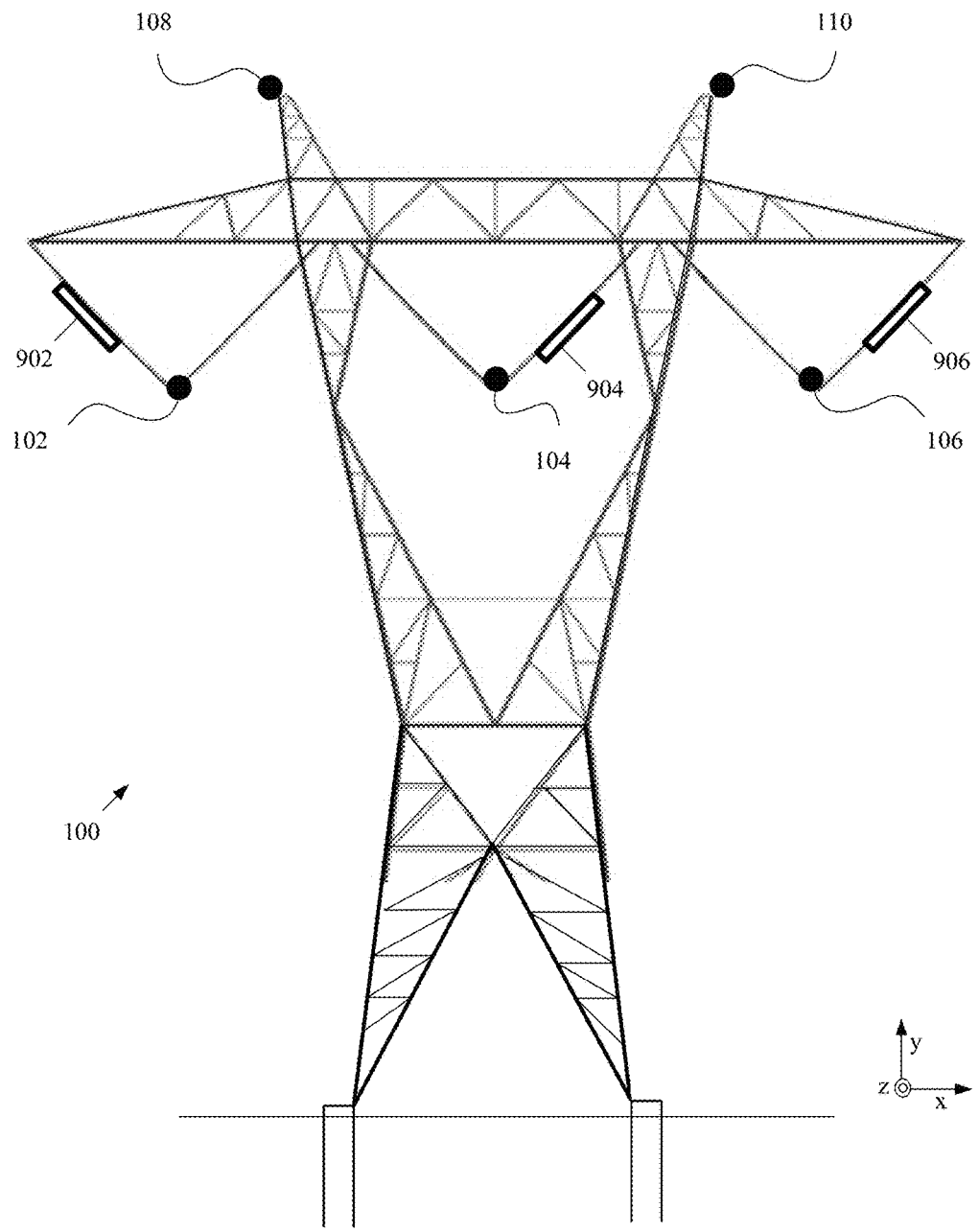
FIGS. 90-92 respectively illustrate various exemplary towers with apparatus mounted thereon for measuring positional data relating to the towers and, preferably, for measuring positional data relating to powerline suspension insulators.
Figure 91:
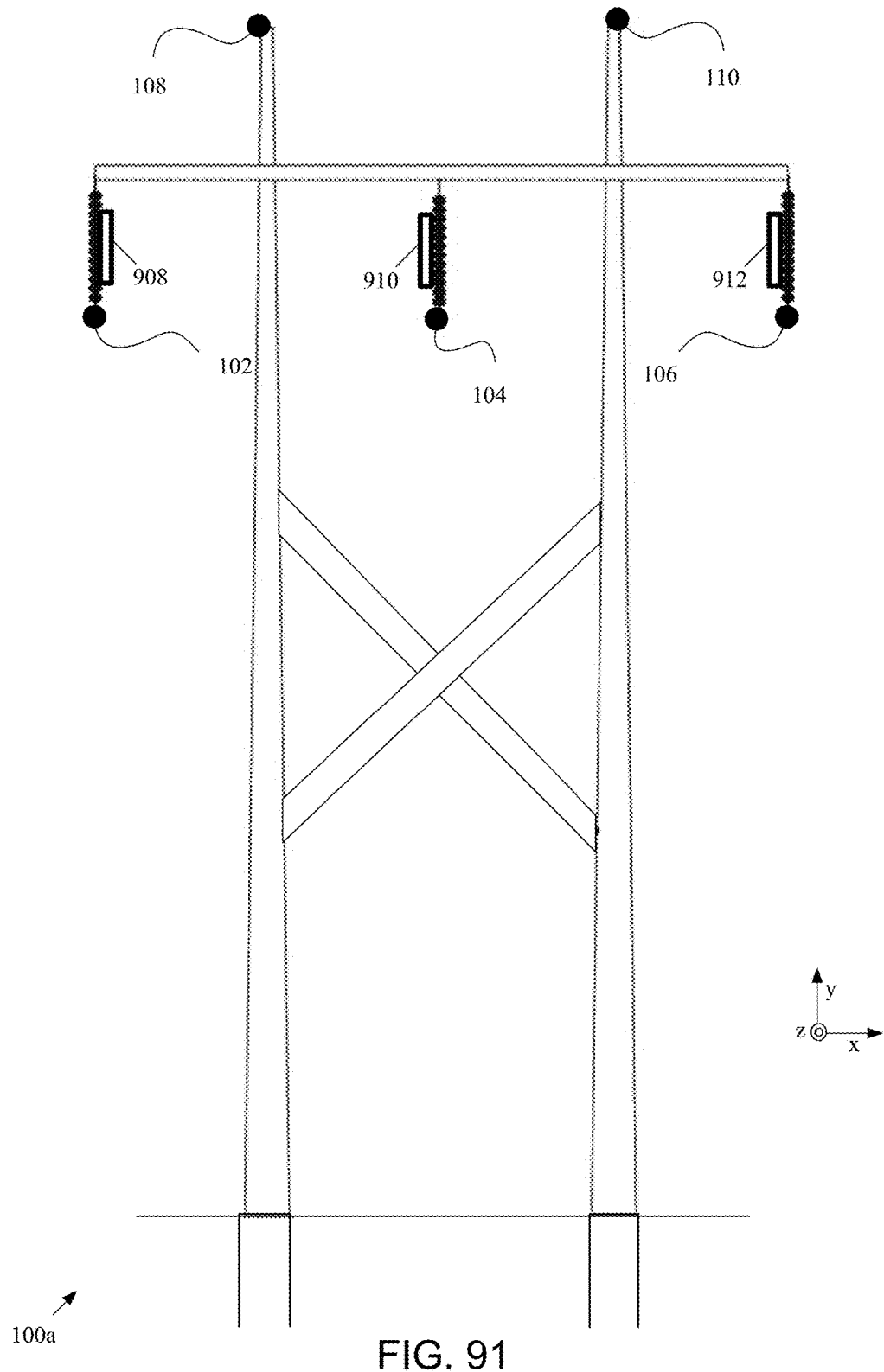
Figure 92:
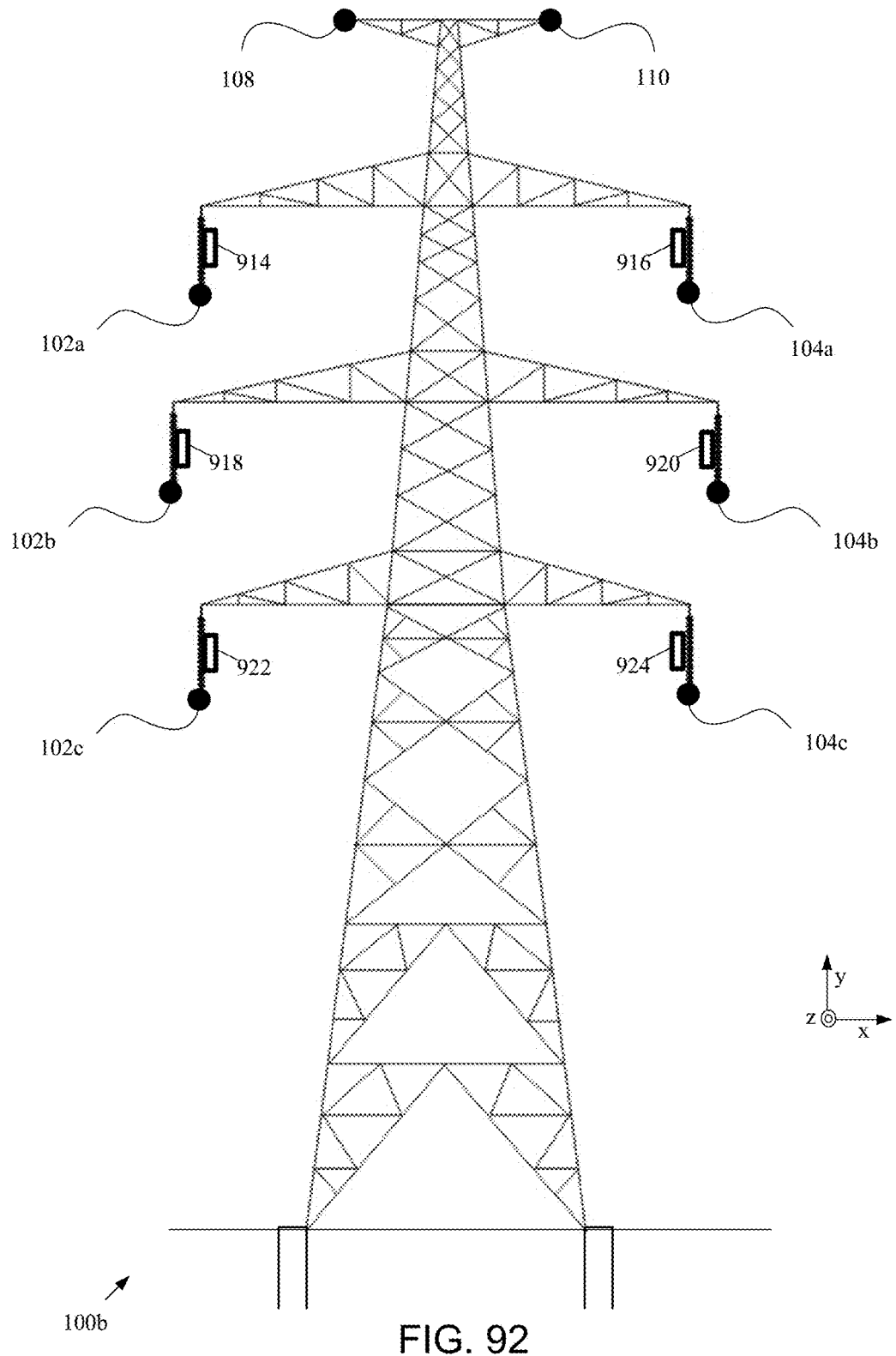

FIGS. 90-92 respectively illustrate the various exemplary towers 100,100a,100b with apparatus mounted thereon for measuring positional data relating to the towers and, preferably, for measuring positional data relating to powerline suspension insulators.

It will be appreciated that, when mounted on the towers, such apparatus are sensitive to movements, motion, position, direction, inclination, acceleration, and rotation caused by structural changes in the tower, such as fatigue, corrosion, and foundation/footing/caisson changes. Such changes may be caused by earth/ground subsidence, movement, flooding, and earthquake-driven motion/movement. Such changes also may be caused by structural and/or mechanical changes produced by physical damage or intentional tampering or sabotage, and in such scenarios the sensors may form part of a physical grid security and integrity sensing and reporting system. In mounting the sensors, higher up is preferred as opposed to at or near the base. Indeed, it is believed that the higher, the better.

When mounted on a high-voltage suspension insulator, the device is sensitive to movement, motion, position, direction, inclination, acceleration, and rotations caused by the above, but also caused/produced uniquely by physical transmission conductor temperature, and changes in temperature, and produced by the various effects of wind, and wind loading, on conductors (i.e., wind induced oscillation, blowout, and Galloping). This has physical grid/infrastructure security and integrity sensing and reporting applications, value, features, and benefits. This further allows for accurate, real-time knowledge of conductor physical characteristics and behavior—which are important to transmission system owners and operators, line design engineers, transmission planners, transmission structural and civil engineers, and to real-rime transmission system operation, optimization, economic efficiency and economic dispatch, system stability, transmission capacity, transmission transfer capability, and other high-voltage electric power transmission system operating parameters and limits.

Furthermore, it is believed that by measuring inclination of a high-voltage suspension insulator, tension and thus temperature may be determined to a meaningful extent in the powerline to which the suspension insulator is attached. Mounting of apparatus within sensors for measuring positional data regarding suspension insulators is illustrated in FIGS. 90-92 and includes devices 902,904,906 in FIG. 90; devices 908,910,912 in FIG. 91; and devices 914,916,918, 920,922,924 in FIG. 92.

Based on the foregoing, it will be readily understood by those persons skilled in the art that the invention has broad utility. Embodiments and adaptations of the invention other than those specifically described herein, as well as many variations, modifications, and equivalent arrangements, will be apparent from or reasonably suggested by the foregoing, without departing from the substance or scope of the invention. Accordingly, while the invention has been described in detail in relation to one or more preferred embodiments, this disclosure is only illustrative and exemplary of the invention and is made merely for the purpose of providing a full and enabling disclosure of the invention. This disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. An apparatus in which electric power is generated for an electrical load from one or more differentials in electric field strength in a vicinity of powerlines, the apparatus comprising:
   (a) a plurality of separated electrodes;
   (b) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced when the apparatus is within the vicinity of the powerlines, wherein the subsets of the set are interconnected such that the one or more voltage differentials between the subsets causes a current to flow through the electric circuit of the set for powering the electrical load; and
   (c) a control assembly comprising
      (i) one or more voltage-detector components configured to detect voltage differentials of the sets; and
      (ii) a processor enabled to process the detected voltage differentials and based thereon and based on voltage and electric current specifications for powering the electrical load—configure one or more of the electrical components in order to establish one of the plurality of different electric circuits for powering the electrical load.

2. The apparatus of claim 1, wherein the electrodes of the plurality of electrodes are symmetrically arranged about an axis of the apparatus.

3. The apparatus of claim 2, wherein the electrical components comprise a plurality of electric-field shielded capacitors configurable in different arrangements in the electric circuit for selectively changing current and voltage characteristics of the electric circuit for powering the electrical load of the electric circuit, and wherein the electric-field shielded capacitors are configurable through switches.

4. The apparatus of claim 2, wherein the electrical components comprise a plurality of electric-field shielded capacitors configurable in different arrangements in the electric circuit for selectively changing current and voltage characteristics of the electric circuit for powering the electrical load of the electric circuit, and wherein one of the different arrangements of the electric-field shielded capacitors comprises capacitors arranged in series; another one of the different arrangements of the electric-field shielded capacitors comprises capacitors arranged in parallel; and another one of the different arrangements of the electric-field shielded capacitors comprises capacitors arranged both in series and in parallel.

5. The apparatus of claim 1, wherein the electrodes of the plurality of electrodes are symmetrically arranged about a center of the apparatus.

6. The apparatus of claim 1, wherein each electrode comprises a conducting plate.

7. The apparatus of claim 1, wherein each electrode comprises a thin, wide-area electrode.

8. The apparatus of claim 1, further comprising a battery by which the control assembly is powered.

9. The apparatus of claim 8, wherein the battery powers only the control assembly.

10. The apparatus of claim 8, wherein the battery does not power the electrical load of the electric circuit.

11. The apparatus of claim 8, wherein the battery is rechargeable and wherein the electrical load of the electric circuit comprises the battery for recharging the battery.

12. A method for generating electric power for an electrical load from one or more differentials in electric field strength within a vicinity of powerlines, the method comprising the steps of:
(a) positioning a plurality of separated electrodes within the vicinity of powerlines such that the electrodes experience differentials in electric field strength with resulting differentials in voltage at the electrodes; and
(b) establishing a particular one of a plurality of different electric circuits, each of the different electric circuits comprising a set of two or more mutually exclusive subsets of the plurality of electrodes, the electrodes in each subset that have more than one electrode being electrically connected with each other for avoiding any voltage differential therebetween, and the one or more electrodes of each subset being electrically insulated from each electrode of any other subset of the set for enabling one or more voltage differentials between the subsets of the set, wherein the subsets are interconnected in each electric circuit such that the one or more voltage differentials therebetween causes a current to flow through the electric circuit for powering the electrical load; and
(c) further comprising detecting voltage differentials of the sets, wherein the particular one of the plurality of different electric circuits is established as a function of the detected voltage differentials and electric current specifications for powering the electrical load.

13. The method of claim 12, further comprising again detecting voltage differentials at the subsets of the plurality of electrodes and—as a function thereof and of the voltage and electric current specifications for powering the electrical load—establishing another particular one of the plurality of different electric circuits.

14. The method of claim 12, further comprising again detecting voltage differentials at the subsets of the plurality of electrodes when moving the subsets of the plurality of electrodes while in the vicinity of the powerlines and—as a function thereof and of the voltage and electric current specifications for powering the electrical load—establishing another particular one of the plurality of different electric circuits.

15. The method of claim 12, wherein the powerlines carry alternating electric current.

16. A device, comprising:
(a) one or more electrical components; and
(b) a power supply unit;
(c) wherein the device defines a bay configured to removably receive the power supply unit for electrical coupling with the device, by which electrical coupling electric current is provided to the device by the power supply unit;
(d) wherein the power supply unit is configured to generate electric power from a differential in electric field strength when the power supply unit is received in the bay, electrically coupled with the device, and within a vicinity of powerlines;
(e) wherein the power supply unit comprises a plurality of separated electrodes; and
(f) wherein the device further comprises, when the power supply unit is electrically coupled with the device,
(i) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced when the device is within the vicinity of the powerlines, wherein the subsets of the set are interconnected such that the one or more voltage differentials between the subsets causes a current to flow through the electric circuit of the set for powering the device;
(ii) one or more sensors configured to sense data regarding voltage differentials of the sets; and
(iii) a processor configured to process the sensed data and, based thereon and based on voltage and electric current specifications for powering the device, configure one or more of the electrical components to establish one of the plurality of different electric circuits for powering the device.

17. The device of claim 16, wherein at least one of the at least one or more of the electrical components configurable to establish each of the first, second, and third electric circuits is located within the power supply unit; wherein at least one of the one or more sensors configured to sense data regarding voltage of the first, second, and third electrodes is located within the power supply unit; and wherein the processor configured to process the sensed data and, based thereon and based on voltage and electric current specifications for powering the device, configure one or more of the electrical components to establish one of the first electric circuit, the second electric circuit, and the third electric circuit for powering the device is located within the power supply unit.

18. A device, comprising:
(a) an external enclosure including one or more external walls; and
(b) a power supply configured to generate electric power from a differential in electric field strength when the device is within a vicinity of powerlines, the power supply comprising first, second, and third electrodes;
(c) wherein the one or more external walls comprise the first, second, and third electrodes; and
(d) wherein the first, second, and third electrodes are separated and electrically insulated from each other for enabling
(i) a differential in voltage at the first and second electrodes resulting from a differential in electric field strength experienced at the first and second electrodes when the device is within the vicinity of the powerlines;

(ii) a differential in voltage at the first and third electrodes resulting from a differential in electric field strength experienced at the first and third electrodes when the device is within the vicinity of the powerlines; and
(iii) a differential in voltage at the second and third electrodes resulting from a differential in electric field strength experienced at the second and third electrodes when the device is within the vicinity of the powerlines; and further comprising
(e) electrical components electrically connected with the first, second, and third electrodes and configurable to establish, in the alternative, each of
  (i) a first electric circuit, wherein a differential in voltage between the first and second electrodes causes electric current to flow through the electric circuit for powering the device;
  (ii) a second electric circuit, wherein a differential in voltage between the first and third electrodes causes electric current to flow through the electric circuit for powering the device; and
  (iii) a third electric circuit, wherein a differential in voltage between the second and third electrodes causes electric current to flow through the electric circuit for powering the device;
(f) one or more voltage-detector components configured to detect voltages of the first, second, and third electrodes; and
(g) a controller configured to process the detected voltages data and to configure one or more of the electrical components based thereon and based on voltage and electric current specifications for powering the device, in order to establish one of the first electric circuit, the second electric circuit, and the third electric circuit for powering the device.

19. The device of claim 18, wherein the external enclosure comprises a housing, casing, or chassis.

20. The device of claim 18, wherein the one or more external walls comprise a plurality of surfaces, and wherein the first electrode comprises a first of the surfaces and the second electrode comprises a second of the surfaces.

* * * * *